(12) United States Patent
Okishiro et al.

(10) Patent No.: US 7,027,023 B2
(45) Date of Patent: Apr. 11, 2006

(54) LIQUID CRYSTAL DISPLAY PANEL, LIQUID CRYSTAL DISPLAY DEVICE, AND LIQUID CRYSTAL TELEVISION

(75) Inventors: Kenji Okishiro, Kokubunji (JP); Hitoshi Oaku, Tokyo (JP); Ikuo Hiyama, Hitachinaka (JP); Katsumi Kondou, Mito (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 10/101,172

(22) Filed: Mar. 20, 2002

(65) Prior Publication Data
US 2003/0052847 A1    Mar. 20, 2003

(30) Foreign Application Priority Data
Sep. 19, 2001    (JP) ............................. 2001-284356

(51) Int. Cl.
*G09G 3/36*    (2006.01)
(52) U.S. Cl. .......................................... 345/94; 349/33
(58) Field of Classification Search .......... 345/87–102; 349/19–55
See application file for complete search history.

(56) References Cited

U.S. PATENT DOCUMENTS

| | | | | |
|---|---|---|---|---|
| 5,648,793 A | * | 7/1997 | Chen | 345/96 |
| 5,847,687 A | * | 12/1998 | Hirakata et al. | 345/96 |
| 6,111,559 A | * | 8/2000 | Motomura et al. | 345/102 |
| 6,414,729 B1 | * | 7/2002 | Akiyama et al. | 349/38 |
| 6,456,269 B1 | * | 9/2002 | Hirakata | 345/92 |
| 2001/0005252 A1 | * | 6/2001 | Lee et al. | 349/141 |
| 2002/0063835 A1 | * | 5/2002 | Kim | 349/141 |

* cited by examiner

*Primary Examiner*—Alexander Eisen
(74) *Attorney, Agent, or Firm*—Antonelli, Terry, Stout and Kraus, LLP

(57) ABSTRACT

To provide a high-quality liquid crystal display device that does not produce image sticking and that can realize high response speed, a third electrode is provided that is different from a common electrode or a pixel electrode, and a voltage applied to the third electrode is varied within one frame period to drive a liquid crystal using a strong electric field and a uniform horizontal electric field in an initial stage within one frame period, while driving the liquid crystal only with the uniform horizontal electric field in a latter stage within one frame period.

59 Claims, 34 Drawing Sheets

FIG. 1A (1)
TIME: $t_0 < t < t_1$
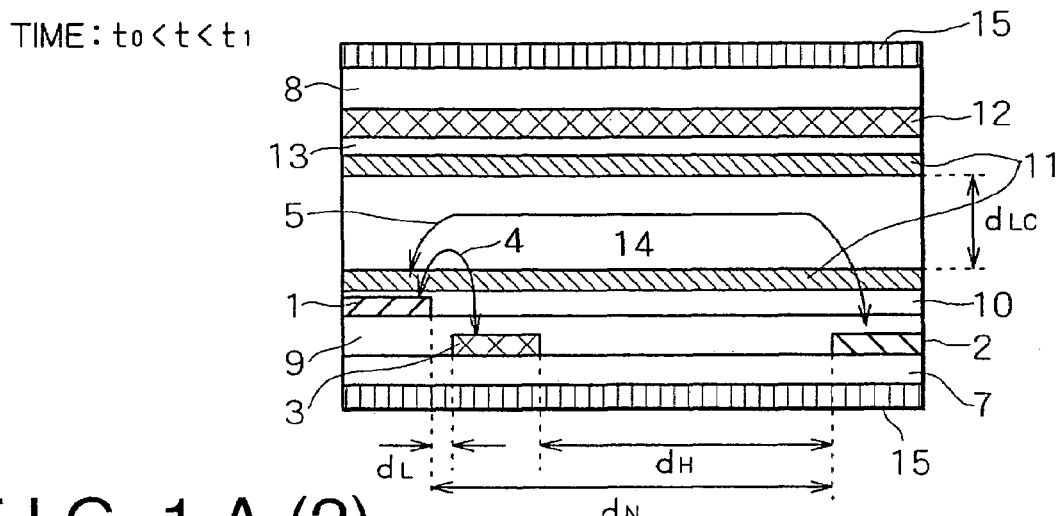
FIG. 1A (2)
TIME: $t_1 < t < t_2$
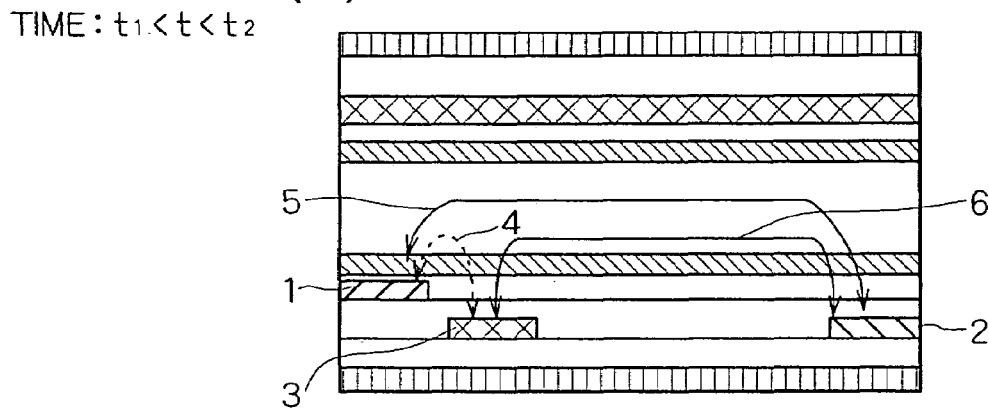
FIG. 1B
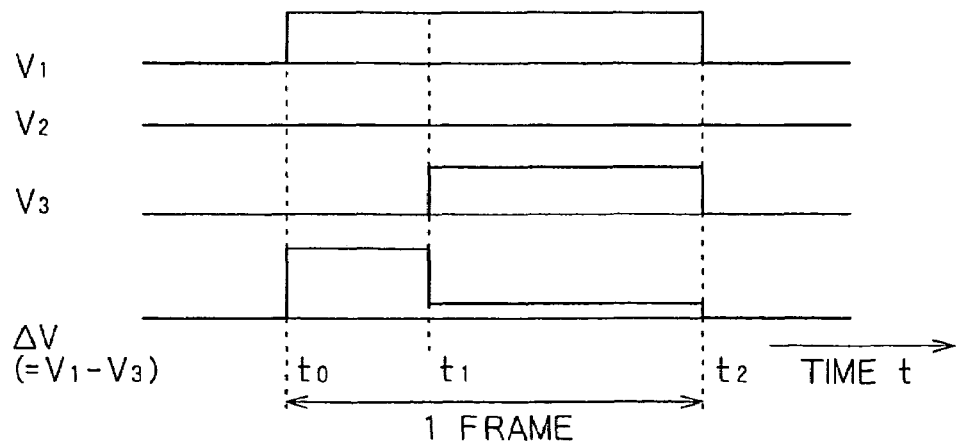

FIG. 10
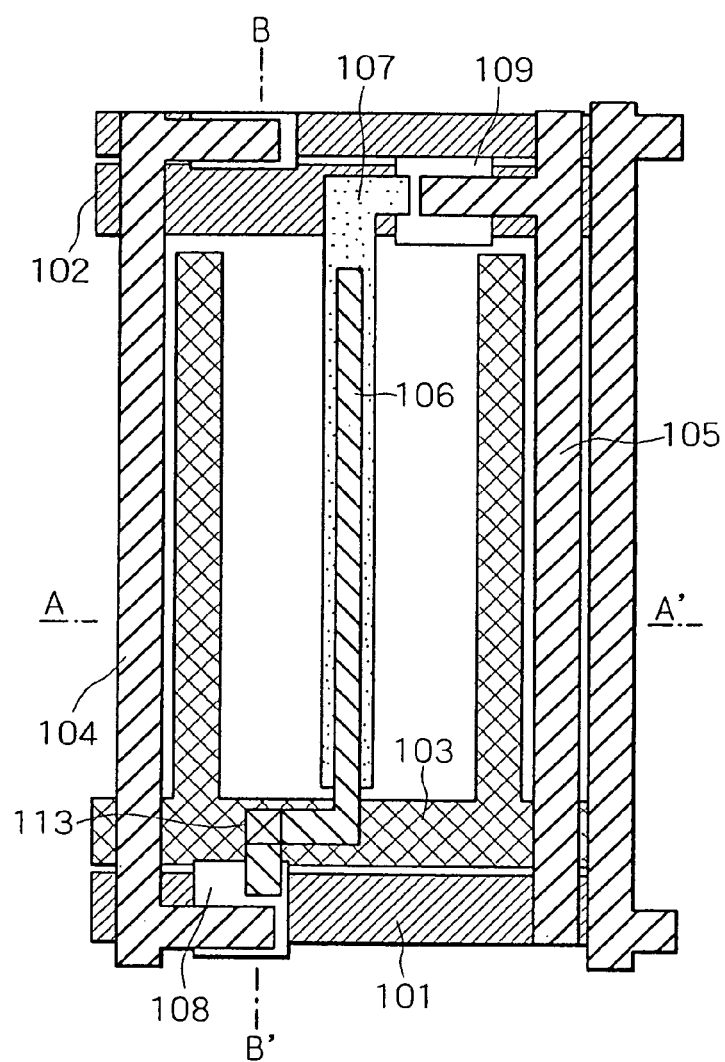
FIG. 10
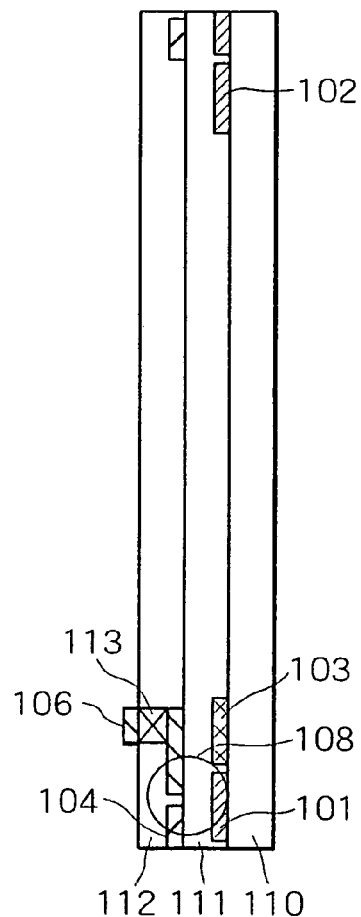
FIG. 10B
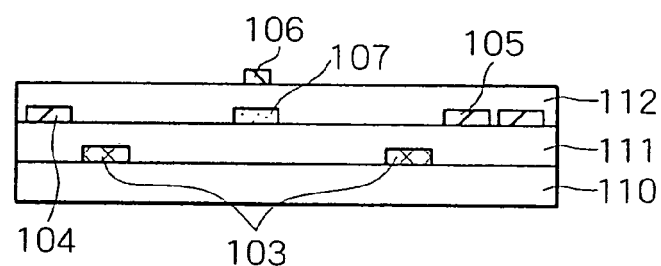
FIG. 10A

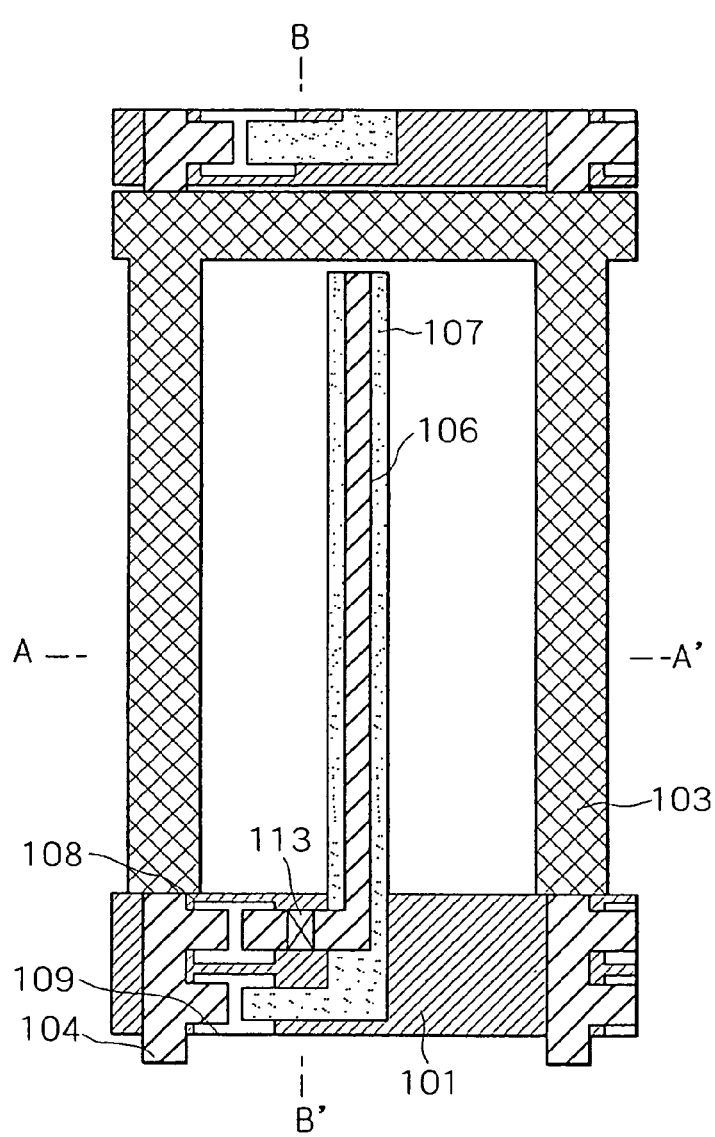
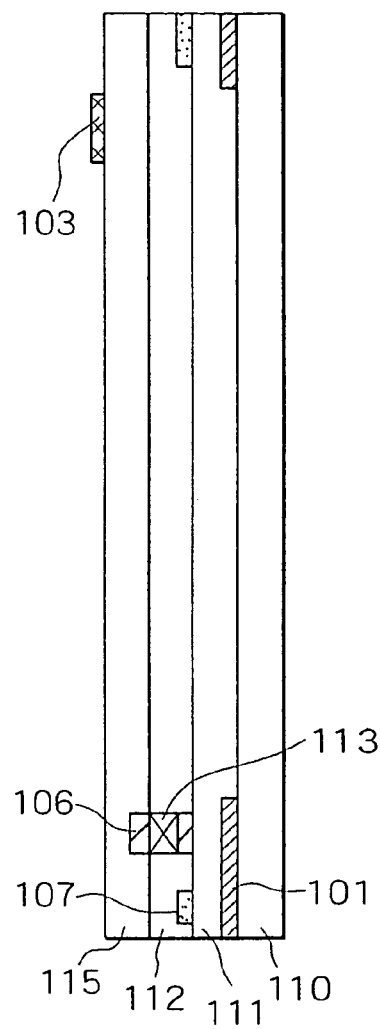
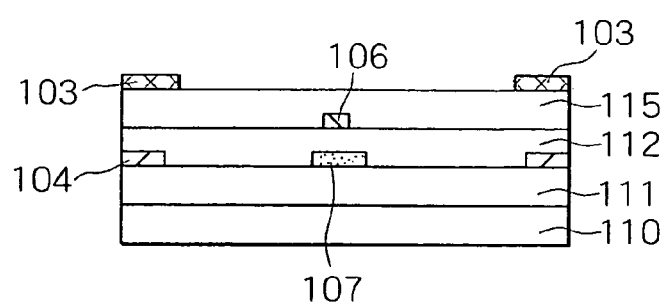

FIG. 31
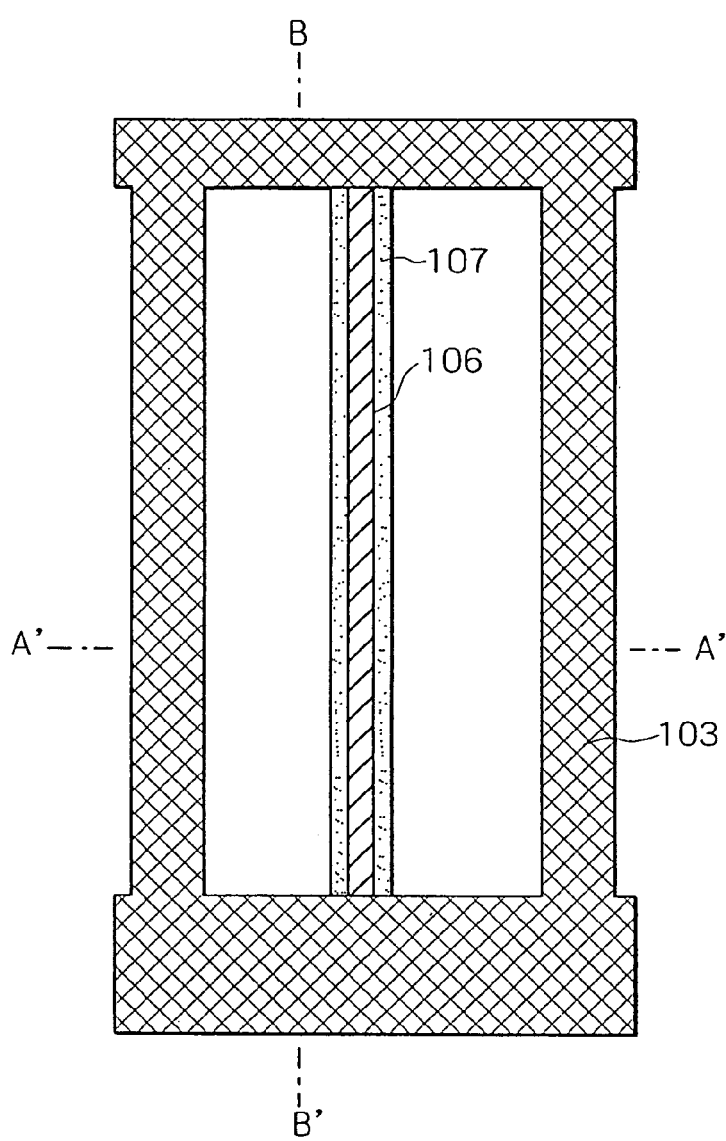
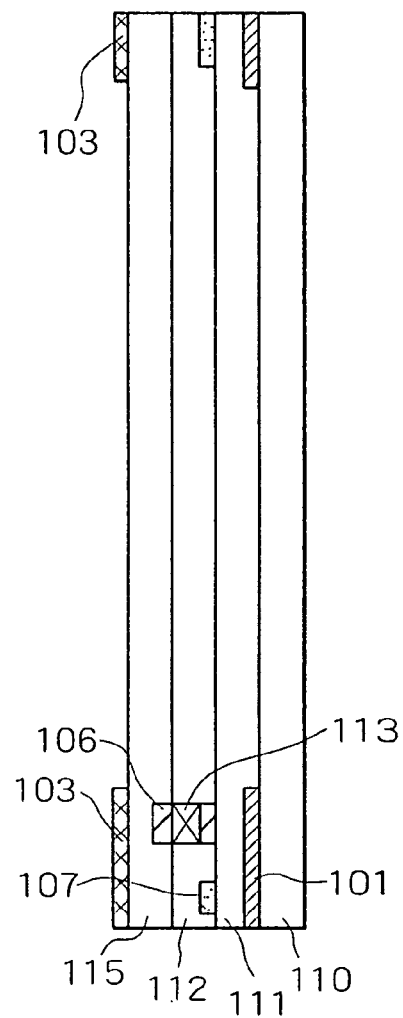
FIG. 31B
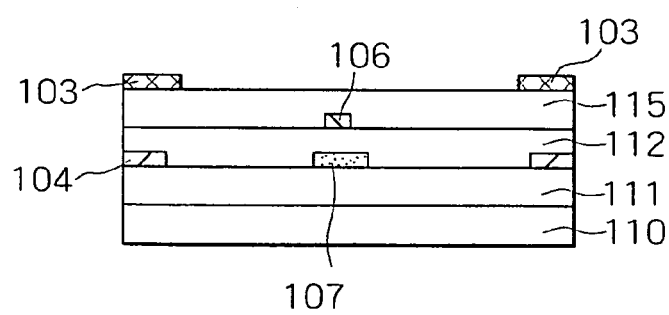
FIG. 31A

LIQUID CRYSTAL DISPLAY PANEL, LIQUID CRYSTAL DISPLAY DEVICE, AND LIQUID CRYSTAL TELEVISION

BACKGROUND OF THE INVENTION

The present invention relates to an active matrix type liquid crystal display panel, an active matrix type liquid crystal display device, and a liquid crystal television.

A liquid crystal display device is composed essentially of two glass substrates that are separated to form a predetermined space into which a layer of liquid crystal is injected. A polymer thin film, called an alignment film, is disposed between the glass substrate and the liquid crystal layer, and the alignment film is processed for aligning the liquid crystal molecules. Displays are produced by such liquid crystal display devices as follows. That is, when an electric field is applied to the orderly arrangement of liquid crystal molecules, it changes the alignment direction of the molecules, which, in turn, results in a change in the optical characteristics in the liquid crystal layer.

In the conventional active drive type liquid crystal display device, a transparent electrode is disposed on an inner side of each of the pair of substrates that sandwich the liquid crystal material, and the liquid crystal molecules are driven by an electric field that is generated between these electrodes in a direction perpendicular to the substrate plane, as represented by the TN system. That is, optical switching is performed when the liquid crystal molecules stand upright in response to the electric field developed perpendicular to the substrates. In such a system, a tone of color can be inverted depending on the direction in which the viewer watches the screen of a liquid crystal panel, particularly in the case of a halftone, presenting a big problem of allowing only a narrow viewing angle range.

Japanese Patent Publication No. 63-21907 discloses an IPS system as a solution to this problem. FIGS. 32, 32A, 32B and 33 show an electrode structure in the form of a cross-sectional view of a pixel portion of a liquid crystal display device using the IPS system. The electrode structure shown in these figures represents particularly a structure having two divisions within one pixel. FIG. 34 is a schematic diagram showing a system that drives the liquid crystal display device. According to this system, two different types of electrodes, namely a pixel electrode 106 and a common electrode 103, are formed on one of a pair of substrates that sandwich the liquid crystal material, and optical switching is performed by rotating the liquid crystal molecules through a plane that is substantially parallel with a substrate plane using a uniform electric field 5 that is produced across these two electrodes and is disposed substantially in parallel with the substrate plane. This eliminates the possibility of inversion of gradation and a tone that otherwise occurs depending on the angle at which the viewer watches the screen (viewing angle), thus offering a wider viewing angle as compared with the conventional TN system.

The industry expects much of the IPS system, which has superior viewing angle characteristics, as explained in the foregoing discussion, as a new liquid crystal display device supplanting the conventional TN system, and it involves a kind of technology that is indispensable to large-scale screen liquid crystal monitors and liquid crystal televisions to be provided in the years to come. The biggest problem with the existing IPS liquid crystal display device is to determine how the response speed can be increased, considering its future applications in display devices supporting moving pictures, such as liquid crystal televisions and DVD video reproducing monitors.

Various approaches have so far been taken with respect to the need to make the IPS system liquid crystal display device faster in response in terms mainly of liquid crystal materials. Among them, efforts have been made to develop new liquid crystal materials along two major approaches. That is, the major approaches have been toward greater polarization (greater $\Delta\epsilon$) and lower viscosity of the liquid crystal material. Generally speaking, however, the greater the polarity, the higher the viscosity with liquid crystal materials. This tradeoff relationship, coupled with the fact that the characteristics of a liquid crystal material directly affect the display characteristics of, as well as the reliability in, the liquid crystal display device, imposes restrictions on the latitude allowed in material development; and, thus, there is a limit to achievement of a higher speed response merely from the approach of material development. In addition to the effort made to develop such liquid crystal materials, an approach is also being taken toward achieving higher response speeds from the viewpoints of driving method and pixel structure.

Japanese Patent Laid-open No. 2001-34238 discloses a new approach toward higher response speed by means of an improved driving method. The method is concerned with an approach, in which display data exceeding variations in gradation (an overdrive voltage) is applied to the pixel to augment the amount of voltage change, thereby increasing the response speed. Generally called overdrive driving, the method reduces the time it takes the device to reach a target transmittance (response time) by temporarily applying, immediately after there is a change in gradation, a voltage higher than that required for achieving the target transmittance. This method is effective only in the case of a halftone, which will be described later.

Japanese Patent Laid-open Nos. 11-231344 and 11-316383 disclose means for realizing a higher response speed by changing the pixel structure. What is disclosed in Japanese Patent Laid-open No. 11-231344 is a structure in which, in the conventional IPS system liquid crystal display device, a second common electrode is formed on the substrate opposite the array substrate (electrode substrate), on which a pixel electrode and a common electrode are formed. This structure is concerned with a method in which an electric field generated across the pixel electrode and the second common electrode is used to effectively drive liquid crystal molecules near the opposing substrate, thereby increasing the response speed. Japanese Patent Laid-open No. 11-316383 discloses a method for increasing the response speed in which a structure is employed, wherein the electrode spacing between the pixel electrode and the common electrode is made narrower than a cell gap (liquid crystal layer thickness), or the pixel electrode is superposed over the common electrode, thereby generating a particularly strong electric field on electrode end portions.

Each of the foregoing approaches has the following problems.

Overdrive driving is a means effective only in the case of a halftone, and the biggest problem with this method is that it is unable to improve the response speed throughout all gradations. The voltage applied to the liquid crystal layer of the liquid crystal display device is usually an ac voltage, and there is no such thing as a voltage that is lower than no applied voltage (V=0V) on the low voltage side. This means that the method is unable to increase the response speed, with which gradations are rendered by the no voltage condition. Moreover, on the high voltage side, too, the voltage to be applied to the pixel is limited because of the electrical withstand voltage of the signal line driver, and it is generally equivalent to one that sufficiently drives the liquid crystal (operating voltage). As a result, since there is substantially no voltage range available for use in making the response speed faster on the high voltage side (ΔV: overdrive voltage), the method is unable to make the response speed faster, with which gradations are rendered by the high voltage side. That is, overdrive driving can increase the response speed in the case of a halftone and flattens out the dependency of the response speed on gradations, but it is unable to improve the response speed particularly on the high voltage side because of the restrictions imposed by the withstand voltage of the driver.

High-speed response technology by means of pixel structure has a problem of degraded display performance. According to the technique disclosed in Japanese Patent Laid-open No. 11-231344, in which the second common electrode is formed on the opposing substrate, the perpendicular electric field component increases, in addition to a horizontal electric field component, which causes the liquid crystal molecules having a property of positive permittivity anisotropy to stand up with respect to the substrate plane, thus presenting a problem in color reproduction.

In the structure disclosed in Japanese Patent Laid-open No. 11-316383, in which the electrode spacing is made narrower than the cell gap (liquid crystal layer thickness), an image sticking phenomenon that is counted among the factors seriously degrading display performance occurs. As found through examinations made by the inventors, a strong electric field that is produced on the electrode end portions, and that functions effectively for increasing the response speed, is the major reason contributing to this image sticking phenomenon. The liquid crystal molecules twist through a plane parallel with the substrate plane according to the electric field strength. If the electrode spacing is extremely narrow due to the electrodes being superposed one on top of another, however, the strong electric field generated as a result of electric field concentration on the electrode end portion causes the liquid crystal molecules in the liquid crystal layer to twist about a twisting angle several-fold greater than the average. To produce a white display, for example, the average longer axes of liquid crystal molecules in the liquid crystal layer must be twisted by about 45° with respect to the transmission axis of a polarizer. There is a distribution of this twisting angle of the liquid crystal molecules; and, in areas near the electrode end portions where the electric field is extremely strong, the molecules are twisted by more than 45°. Particularly in areas near the electrode end portions, a torque generated by this excessively great twist of liquid crystal molecules is transmitted at this time as a load on the surface of the alignment film; and, as a result, the image sticking or seizure phenomenon probably occurs mainly due to plastic deformation of the alignment film surface. This image sticking phenomenon has a strong correlation with the period of time through which the strong electric field is held. The longer the retention period, the more the phenomenon is aggravated.

SUMMARY OF THE INVENTION

An object of the present invention is to provide a liquid crystal display panel and a liquid crystal display device that is capable of realizing a high-speed response.

Another object of the present invention is to provide a high-quality liquid crystal display panel and a liquid crystal display device that suppresses an image sticking phenomenon that greatly affects display performance.

According to one aspect of the present invention, a liquid crystal display panel comprises a pair of substrates, a liquid crystal layer disposed between the pair of substrates, and a first electrode, a second electrode, and a third electrode each extending in a predetermined direction and being disposed on one of the pair of substrates, wherein at an initial stage and in a middle stage within one frame period, a voltage applied to the first electrode, the second electrode, or the third electrode is varied to control the display.

More specifically, with voltage differences existing among voltages applied to the first electrode, the second electrode, and the third electrode, control is provided to ensure that the relationship between at least two voltage differences may differ between the initial stage and the middle stage within one frame period.

In addition, as a means of providing the above-mentioned control even more effectively, the third electrode may be disposed at a position closer to the first electrode, between the first electrode and the second electrode.

In another specific configuration, preferably, either the first electrode or the second electrode is connected to a first signal line through a first active component; the electrode, either the first or the second electrode, that is not connected to the first active component is connected to a common line; and the third electrode is connected to a second signal line through a second active component.

In addition, preferably, the liquid crystal display panel is provided with a first scanning line, that is disposed so as to intersect the first signal line and is connected to the first active component, and a second scanning line, that is disposed so as to intersect the second signal line and is connected to the second active component, whereby a pixel is formed corresponding to an area enclosed by the first signal line, the first scanning line, the second signal line, and the second scanning line, and a display area is formed by arranging a plurality of these pixels in an array.

In addition, preferably, the liquid crystal display panel is provided, outside this display area, with a first signal driving circuit connected to the first signal line, a second signal driving circuit connected to the second signal line, a first scanning driving circuit connected to the first scanning line, a second scanning driving circuit connected to the second scanning line, and a common line driving circuit connected to the common line.

In addition, preferably, the liquid crystal display panel is further provided, outside this display area, with a display control circuit that is connected to the first signal driving circuit, the second signal driving circuit, the first scanning driving circuit, the second scanning driving circuit, and the common line driving circuit.

In still another specific configuration, preferably, either the first electrode or the second electrode is connected through a first active component, and the third electrode is connected through the second active component, to a signal line; the electrode, either the first or the second electrode, which is not connected to the first active component, is connected to the common line; a scanning line disposed so as to intersect the signal line and connected to the first active component and the second active component is provided; a pixel is formed corresponding to an area enclosed by the signal line and the scanning line; a plurality of these pixels are disposed to form a display area; and the scanning line corresponding to each of these pixels is scanned twice within one frame period. Each of these two scanning cycles is carried out with a unique scanning voltage value. In addition, the first active component and the second active component have threshold characteristics that are different from each other.

According to another aspect of the present invention, a liquid crystal display panel comprises a pair of substrates, at least one of the pair of substrates being a transparent substrate, and a liquid crystal layer disposed between the paired substrates, wherein either one of the pair of substrates is provided with a display area composed of a plurality of pixels, a first electrode, a second electrode, and a third electrode each extending in a predetermined direction being disposed within each pixel, and control is provided to produce a display by changing the voltage applied to each of the first electrode, the second electrode, and the third electrode at an initial stage and a middle stage with one frame period.

Furthermore, preferably, a voltage is independently applied to the first electrode, the second electrode, and the third electrode; and, with voltage differences existing among voltages applied to the first electrode, the second electrode, and the third electrode, the relationship between at least two voltage differences differ between the initial stage and the middle stage within one frame period.

In addition, preferably, the third electrode is disposed at a position closer to the first electrode, between the first electrode and the second electrode, and the voltage difference between the first electrode and the third electrode and the voltage difference between the second electrode and the third electrode differ between the initial stage and the middle stage within one frame period.

According to still another aspect of the present invention, a liquid crystal display panel comprises a pair of substrates, at least one of the pair of substrates being a transparent substrate, and a liquid crystal layer disposed between the substrates, wherein displays are controlled by changing an electric field generated in the liquid crystal layer between an initial stage and a middle stage within one frame period.

Preferably, a strong electric field is generated at the initial stage within one frame period and an electric field weaker than at the initial stage is generated in the middle stage.

According to still another aspect of the present invention, a liquid crystal display device comprises a liquid crystal display panel that is provided with a pair of substrates, a liquid crystal layer disposed therebetween, and a first electrode, a second electrode, and a third electrode disposed on one of the substrates, each extending in a predetermined direction, in which displays are controlled by changing a voltage applied to each of the first electrode, the second electrode, and the third electrode between an initial stage and a middle stage within one frame period, and a light source.

According to a still further aspect of the present invention, a liquid crystal television comprises: a liquid crystal display panel that is provided with a pair of substrates, a liquid crystal layer disposed therebetween, and a first electrode, a second electrode, and a third electrode disposed on one of the substrates, each extending in a predetermined direction, in which displays are controlled by changing a voltage applied to each of the first electrode, the second electrode, and the third electrode between an initial stage and a middle stage within one frame period; a light source; an inverter circuit that controls the light source; and a tuner.

BRIEF DESCRIPTION OF THE DRAWINGS

FIGS. 1A(1) and 1A(2) are cross-sectional views of an electrode structure illustrating schematically the concept of the present invention, and FIG. 1B is a diagram showing the signal waveform at each electrode thereof;

FIG. 10 is a cross-sectional view showing the electrode structure of a pixel portion in a liquid crystal display panel according to the second embodiment of the invention, and FIGS. 10A and 10B are sections taken along lines A–A' and B–B', respectively, in FIG. 10;

FIG. 30 is a cross-sectional view showing the electrode structure of a pixel portion in a liquid crystal display panel according to a ninth embodiment of the invention, and FIGS. 30A and 30B are sections taken along lines A–A' and B–B', respectively, in FIG. 30;

FIG. 31 is a cross-sectional view showing the electrode structure of a pixel portion in a liquid crystal display panel according to a tenth embodiment of the invention, and FIGS. 31A and 31B are sections taken along lines A–A' and B–B', respectively, in FIG. 31;

DETAILED DESCRIPTION OF THE PREFERRED EMBODIMENTS

Figure 2A:
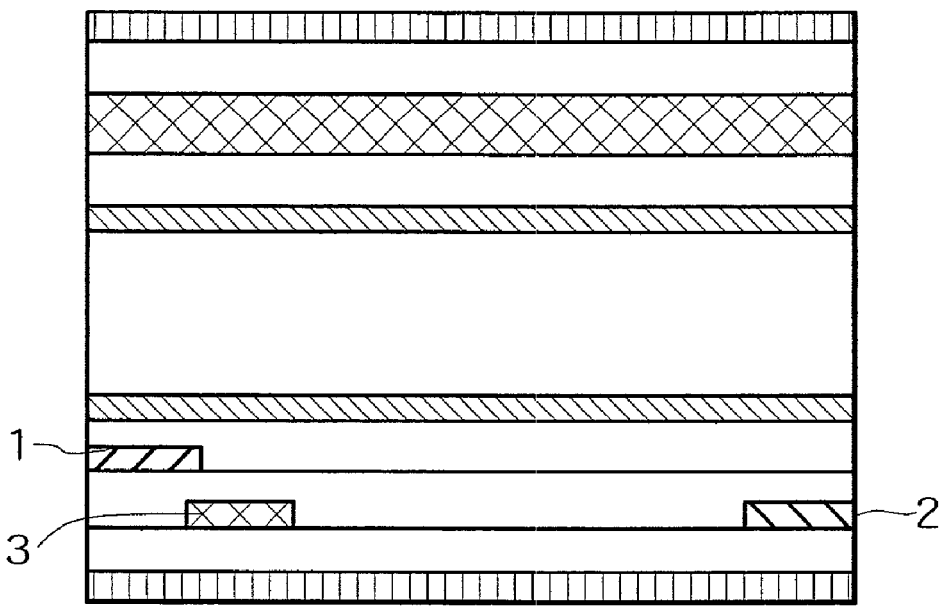
FIGS. 2A and 2B are schematic cross-sectional views of the electrode structure according to the present invention.

Preferred embodiments of the present invention will be described with reference to FIGS. 1A(1), 1A(2) and 1B. FIGS. 1A(1) and 1A(2) are schematic cross-sectional views of a pixel portion of a liquid crystal panel for delineating the present invention. FIG. 1B shows typical changes in voltages at different electrodes shown in FIGS. 1A(1) and 1A(2) within one frame period.

FIG. 1A(1) represents a laminated structure of, for example, a pair of glass substrates or plastic substrates, or a glass substrate and a plastic substrate laminated with each other, namely a pair of substrates 7, 8, at least one of which is transparent, sandwiching a liquid crystal layer 14. A polarizer 15 is disposed on the outer surface of each of the substrates 7, 8. Electrodes to be described later are disposed on the substrate 7, and, in addition, insulating films 9, 10 and an alignment film 11 are formed on these electrodes. A color filter 12, an overcoat film 13 that serves as a protective film for the color filter 12, and the alignment film 11 are formed on the substrate 8. The color filter is not necessarily formed on the substrate 8, and it may be disposed on the substrate 7.

A display area comprising a plurality of pixels is formed on the substrate 7, and FIG. 1A(1) is a cross-sectional view showing a typical example of one of these pixels. That is, the present invention features an electrode structure, in which a first electrode 1, a second electrode 2, and a third electrode 3, each having a line or a comb-like shape, are disposed within each of the pixels making up the display area formed on the substrate 7. Connections are provided so that a voltage can be applied to each of the electrodes (namely, the first electrode 1, the second electrode 2, and the third electrode 3) independently of each other. In addition, displays are controlled by varying the voltage applied to each of the first electrode, the second electrode, and the third electrode between an initial stage and a middle stage within one frame period. That is, an electric field generated in the liquid crystal layer is changed by varying the voltage applied to each electrode within one frame period. More specifically, the electric field is changed by changing the relationship between at least two voltage differences, of the voltage differences between each pair of the first electrode, the second electrode, and the third electrode, between the initial stage and the middle stage within one frame period.

To be more specific, referring to FIG. 1A(1), in the initial stage ($t_0 < t < t_1$) within one frame period, voltages are applied so that an electric field 4 is generated across the first electrode 1 and the third electrode 3 and the electric field 4 is used to control liquid crystal molecules near the first electrode 1 and the third electrode 3 in the liquid crystal layer 14. Referring to FIG. 1B, in the middle stage ($t_1 < t < t_2$) within one frame period, as seen in FIG. 1A(2), voltages are applied so as not to generate the electric field 4 across the first electrode 1 and the third electrode 3, and only an electric field 5 is used to control the liquid crystal molecules in the liquid crystal layer 14.

That is, in the initial stage ($t_0 < t < t_1$) within one frame period, a strong electric field is generated in the liquid crystal layer; and, in the middle stage ($t_1 < t < t_2$) within one frame period, an electric field smaller than that generated in the initial stage is generated.

Considering suppression of an image sticking phenomenon to be described later, it is desirable that switching of the voltage from the initial stage to the middle stage be done within a period of time equal to a half of one frame period ($0 < t < (t_2 - t_0)/2$) at the longest.

The first electrode 1 is either a pixel electrode or a common electrode, and the second electrode 2 is the type of electrode other than that of the first electrode, namely, the common electrode, if the first electrode is the pixel electrode, and the pixel electrode, if the first electrode is the common electrode.

Electric field control within one frame period, as described in the foregoing discussion, can be carried out by applying a specific voltage to each of the first electrode 1, the second electrode 2, and the third electrode 3, and the positional relationship among the first electrode 1, the second electrode 2, and the third electrode 3 does not necessarily present a major problem. Nonetheless, the strength of the electric field depends on the spacing between each pair of electrodes; and, to control the electric field even more effectively, the relationship among the disposed positions of the first electrode 1, the second electrode 2, and the third electrode 3 is important.

To ensure that the above-mentioned electric field control is provided effectively, therefore, in FIGS. 1A(1) and 1A(2), one of the three different electrodes (for example, the third electrode) is disposed closer to either one (for example, the first electrode) of the remaining two electrodes (the first electrode and the second electrode). Such a disposition makes it possible to provide the above-mentioned electric field control even more effectively.

Assuming that the voltage difference between the first electrode 1 and the third electrode 3 is $\Delta V_1$, the spacing between the first electrode 1 and the third electrode 3 is $d_L$, the voltage difference between the second electrode 2 and the third electrode 3 is $\Delta V_2$, and the spacing between the second electrode 2 and the third electrode 3 is $d_H$, the panel is driven so that (Equation 1) shown below is satisfied in the initial stage ($t_0 < t < t_1$) within one frame period and (Equation 2) shown below is satisfied in the middle stage ($t_1 < t < t_2$) within one frame period.

$$\Delta V_2/d_H < \Delta V_1/d_L \quad \text{(Equation 1)}$$

$$\Delta V_2/d_H = \Delta V_1/d_L \quad \text{(Equation 2)}$$

Considering suppression of the image sticking phenomenon to be described later, it is desirable that the panel be driven so that the voltage difference $\Delta V_1$ becomes small within a period of time equal to a half of one frame period ($0 < t < (t_2 - t_0)/2$) at the longest.

This electrode structure, together with varying the voltage at the third electrode within one frame period, makes it possible to realize a liquid crystal display device that suppresses the image sticking phenomenon and permits a high-speed response. The reason why a high-speed response can be realized and why the image sticking phenomenon can be suppressed will be explained in detail in the following.

The following explanation refers to the typical changes in voltages at different electrodes, as shown in FIG. 1B. In the initial stage ($t_0 < t < t_1$) within one frame period, the voltage at the second electrode remains substantially equal to the voltage at the third electrode ($V_2$ substantially equals $V_3$) and the liquid crystal molecules in the liquid crystal layer are driven by the substantially uniform horizontal electric field 5 applied across the first electrode 1 and the second electrode 2 and the electric field 4 applied across the first electrode 1 and the third electrode 3, as seen in FIG. 1A(1). Since the electrode spacing between the second electrode 2 and the first electrode 1 differs from the electrode spacing between the third electrode 3 and the first electrode 1 ($d_L < d_H$), though the voltage at the second electrode 2 is substantially equal to the voltage at the third electrode 3, the strength of the electric field 4 generated across the third electrode and the first electrode is greater than that of the electric field 5 generated across the second electrode and the first electrode.

Liquid crystal molecules are rotated and their orientation is changed by the electric field. The greater the strength of the electric field, the faster and greater the rotation. The liquid crystal molecules existing near the first electrode and the third electrode are rotated at high speed and with greater rotating angles by the greater electric field 4 generated across these electrodes. The liquid crystal molecules existing between the first electrode and the second electrode, on the other hand, are driven basically by the substantially uniform horizontal electric field 5 generated across these electrodes. The liquid crystal is, however, considered as a continuous body and, because of an elastic effect thereof, that part of the liquid crystal molecules driven at high speed by the greater electric field 4 function to drag another part of the liquid crystal molecules driven mildly by the uniform horizontal electric field 5. Therefore, in addition to being rotated according to the strength of the uniform horizontal electric field 5, that part of the liquid crystal molecules existing between the first electrode 1 and the second electrode 2 are dragged by the part of the liquid crystal molecules driven at high speed by the greater electric field 4. This makes it possible to realize a higher-speed response, as compared with the conventional liquid crystal display device working on the horizontal electric field system, in which liquid crystal molecules are driven only by the uniform horizontal electric field.

Considering the effects that would be produced by the strong electric field, the following structures should be effective in realizing liquid crystal molecules that offer a higher response speed.

In one ideal structure, of the first electrode 1 and the second electrode 2, the electrode disposed closer to the third electrode 3 (the first electrode 1 in the drawing) is brought even nearer to the third electrode, making the electrode spacing $d_L$ smaller.

Figure 2B:
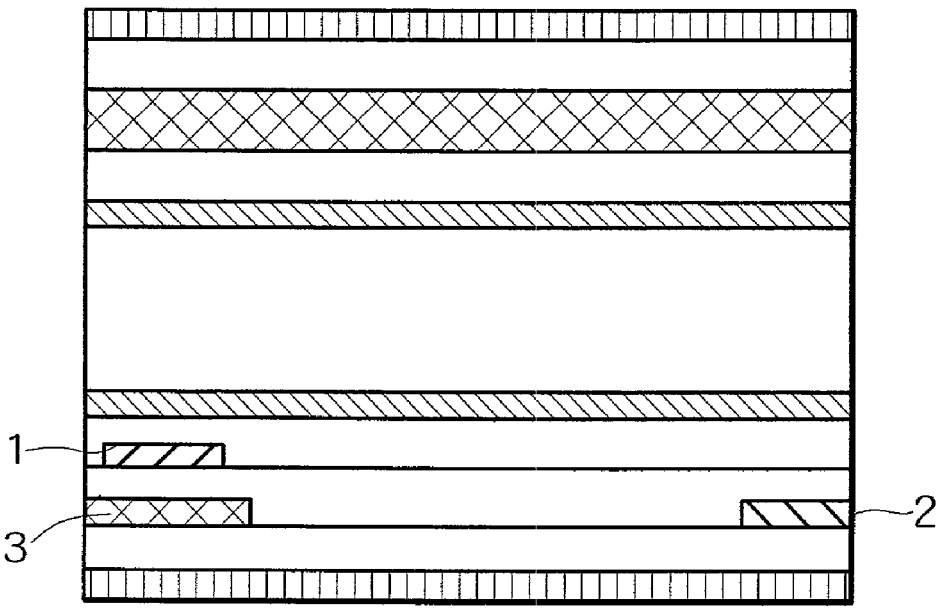

Another ideal structure is one in which, referring to FIG. 2A, of the first electrode 1 and the second electrode 2, at least part of the electrode disposed closer to the third electrode 3 (the first electrode 1 in FIG. 2A) is at least partially superposed above the third electrode 3 within a pixel display area. The structure would further be ideal if one electrode is fully superposed above the other throughout the entire surface thereof, as shown in FIG. 2B, considering an alignment margin of electrodes that are locally superposed on each other. This is because superposing one electrode above the other causes an electric field concentration to tend to occur on edge portions of the superposed electrodes, thus helping generate an even greater electric field. It is therefore extremely effective in satisfying the objects of the present invention. In addition, it is ideal that, of the pair of electrodes superposed each other, the width of the electrode disposed on a lower layer (the third electrode 3 in the figure) be wider than the width of the electrode disposed on an upper layer (the first electrode 1 in the figure). If electrodes are superposed on each other and the one disposed on a lower layer of the two mutually superposed electrodes is made wider, a strong electric field can be effectively generated at edge portions of these electrodes.

Furthermore, if electrodes are superposed on each other, as shown in FIGS. 2A and 2B, it is preferable that at least the electrode disposed on the lower layer be ITO or some other transparent conductive film. As described in the foregoing, liquid crystal molecules are driven at high speed by the strong electric field on the edge portions of the electrodes superposed on each other. As a result, light is first transmitted after the application of voltages has been started, compared with other areas. If the electrode on the lower layer is a transparent electrode, light in such an area can be used, which helps shorten the response time of all pixels. It can therefore be expected that the response time will be shortened in halftone displays, which are said to be particularly slow in response.

When electrodes are superposed, the electrode spacing $d_L$ is substantially equal to the thickness of the insulating film 9 interposed therebetween.

To generate electric fields having different strengths, it is necessary to generate, in addition to an electric field required for producing ordinary displays, another electric field having the same component as the first one. To generate electric fields even more effectively and realize high-speed response, it is desirable that the strength of the electric field 4 generated across the first electrode 1 and the third electrode 3 be made at least greater than the strength of the electric field 5 generated across the first electrode 1 and the second electrode 2 shown in FIG. 1A(1).

Referring to FIG. 1A(1), for the layer on which each of the electrodes is disposed, the first electrode 1 is disposed on a layer that is different from the layer on which the second electrode 2 and the third electrode 3 are disposed. To derive the effect of a higher response speed from the present invention, however, all of these electrodes may be disposed on the same layer, except when electrodes are superposed on each other.

The discussion given heretofore has been directed to a structure and driving method for realizing high-speed response of liquid crystal molecules through consideration of the effect of the strong electric field. However, it has been found that, while a strong electric field is extremely effective for higher response speeds, on the one hand, it has a side effect of producing the image sticking phenomenon that forms one of the factors seriously degrading liquid crystal display performance, on the other hand. This side effect is particularly conspicuous in a structure in which electrodes are superposed on each other, as shown in FIGS. 2A and 2B.

Examinations made by the inventors have revealed that, as noted earlier, when liquid crystal molecules are rotated at a rotating angle several-fold greater than the rotating angle of average liquid crystal molecules in the liquid crystal layer, the torque generated from rotation of the liquid crystal molecules contributes to the image sticking phenomenon that occurs, due probably to plastic deformation of the alignment film surface. Moreover, the image sticking phenomenon is closely correlated to the period of time through which the large torque is retained, that is, the strong electric field is maintained. It has also been found that the longer the retention period, the more the image sticking phenomenon is aggravated. It has therefore been concluded that the image sticking can be suppressed by shortening the period of time through which the strong electric field maintained, should it be applied to the liquid crystal molecules.

Taking notice of these points, the inventors of the present invention have considered the following approaches. That is, in the initial stage ($t_0<t<t_1$) within one frame period, a strong electric field is generated so as to let the liquid crystal molecules respond at high speed. Thereafter, the voltage at the third electrode V3 is changed to substantially reduce the difference thereof from the voltage at the first electrode V1, as shown, for example, in FIG. 1B. More particularly, the strong electric field component is substantially eliminated in a stage within one frame period, during which time t satisfies $t_1<t<t_2$ (that is in the middle stage), thus driving the liquid crystal by way of the uniform horizontal electric field 5 generated across the first electrode 1 and the second electrode 2 and a uniform horizontal electric field 6 generated across the third electrode 3 and the second electrode 2. This arrangement ensures that the strong electric field is applied only for a temporary period of time in the initial stage within one frame period ($t_0<t<t_1$), eliminating the occurrence of the image-sticking phenomenon.

It is possible to provide a liquid crystal display device that offers a higher response speed and, at the same time, suppresses the image sticking by providing an electrode structure and an arrangement for permitting changes of in the voltage applied to an electrode over one frame period, as set forth in the foregoing discussion. Moreover, according to this arrangement, since the electrode spacing is reduced to a degree less than the thickness of the liquid crystal layer so as to augment the strength of the electric field for driving liquid crystal molecules, no restrictions are imposed, such as that imposed by the driver withstand voltage in overdrive driving, thus realizing a higher response speed throughout all gradations.

Preferred embodiments of the present invention will be described in terms of electrode and wiring structures, and signal waveforms supplied to these electrodes and wiring. The pixel structure described with reference to the embodiments represents that having two divisions within one pixel and in which a third electrode is superposed on the common electrode or pixel electrode. However, the invention is not limited to such a pixel structure. It is to be further understood that the signal waveforms supplied to different electrodes and wiring are not limited to those specified in the description of the embodiments.

Embodiment 1

Figure 3:
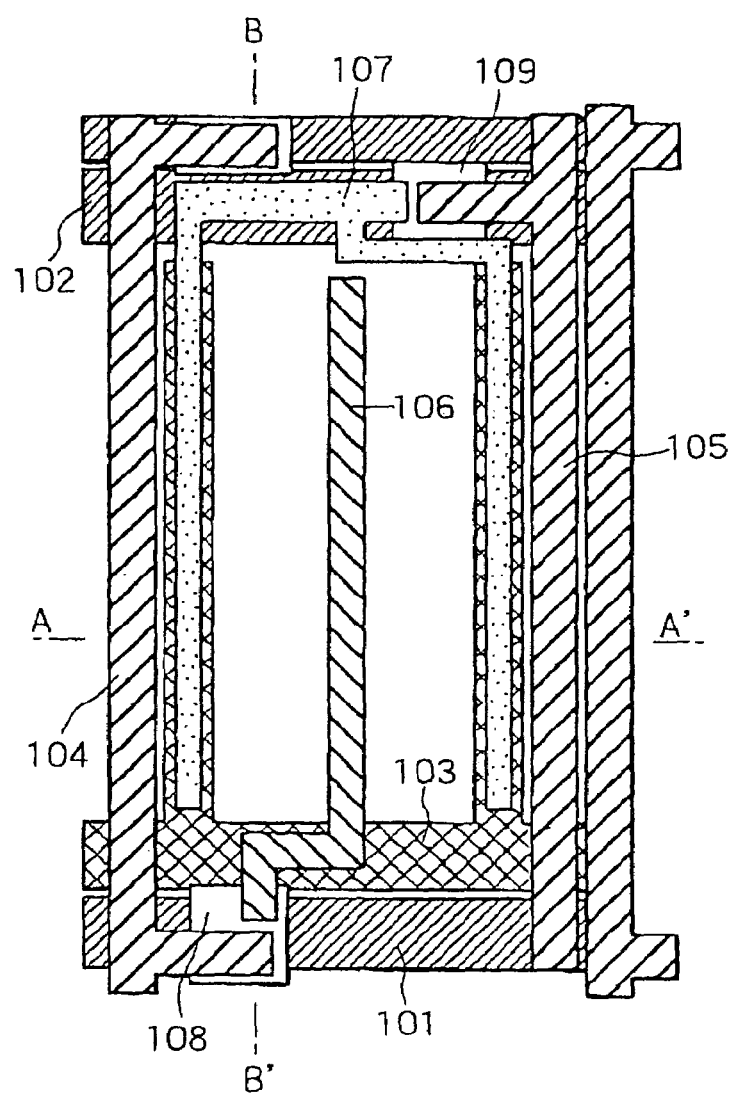
FIG. 3 is a cross-sectional view of the electrode structure of a pixel portion in a liquid crystal display panel according to a first embodiment of the invention.
Figure 3B:
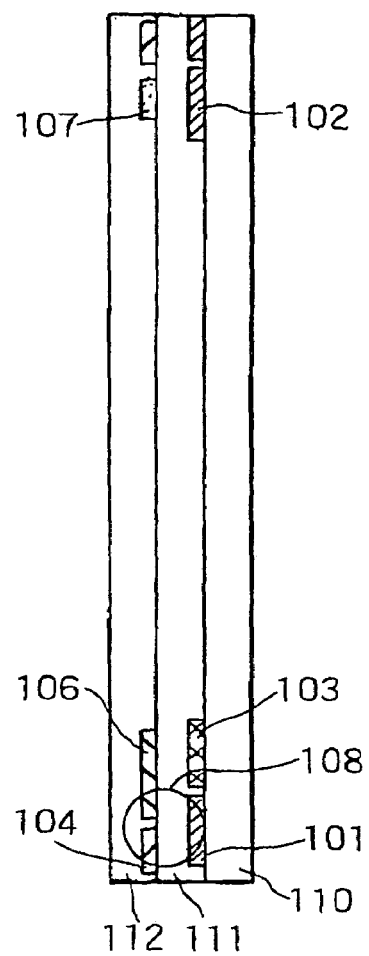
FIGS. 3A and 3B are section views taken along lines A–A' and B–B', respectively, in FIG. 3.
Figure 3A:
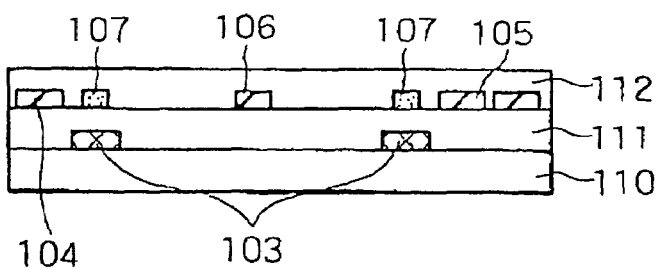
Figure 4:
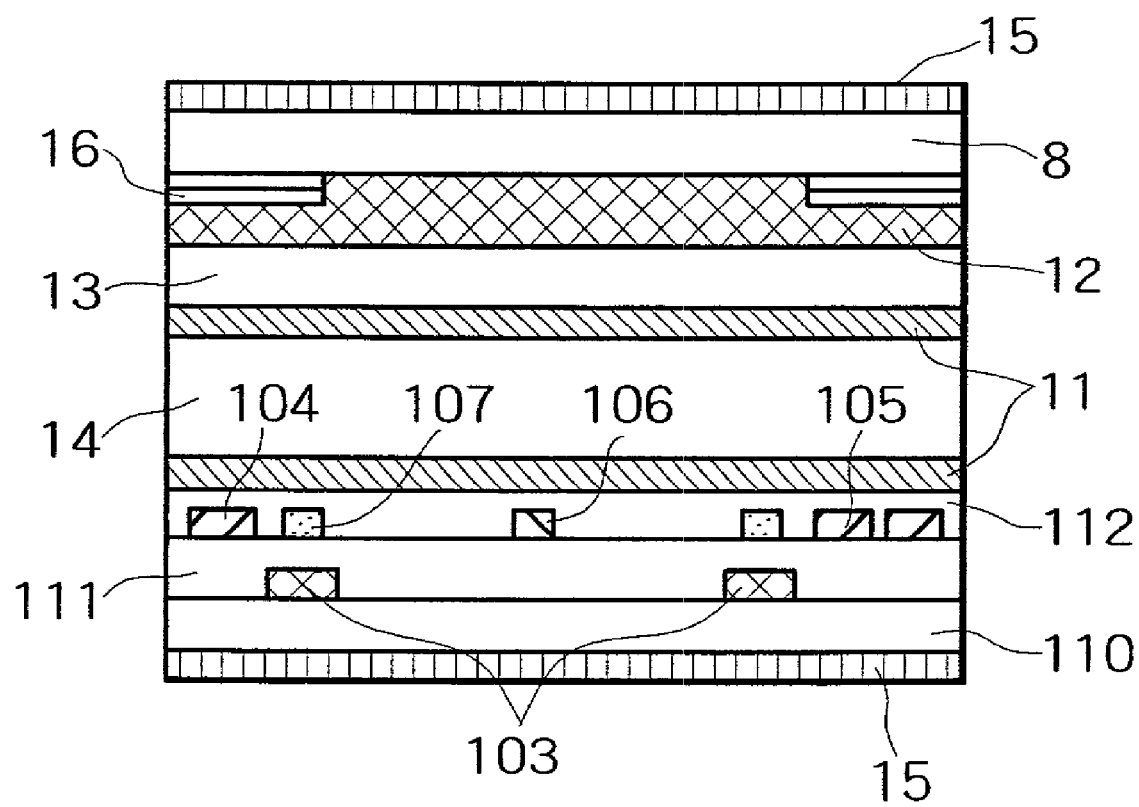
FIG. 4 is a cross-sectional view of the pixel portion in the liquid crystal display panel according to the first embodiment.
Figure 5:
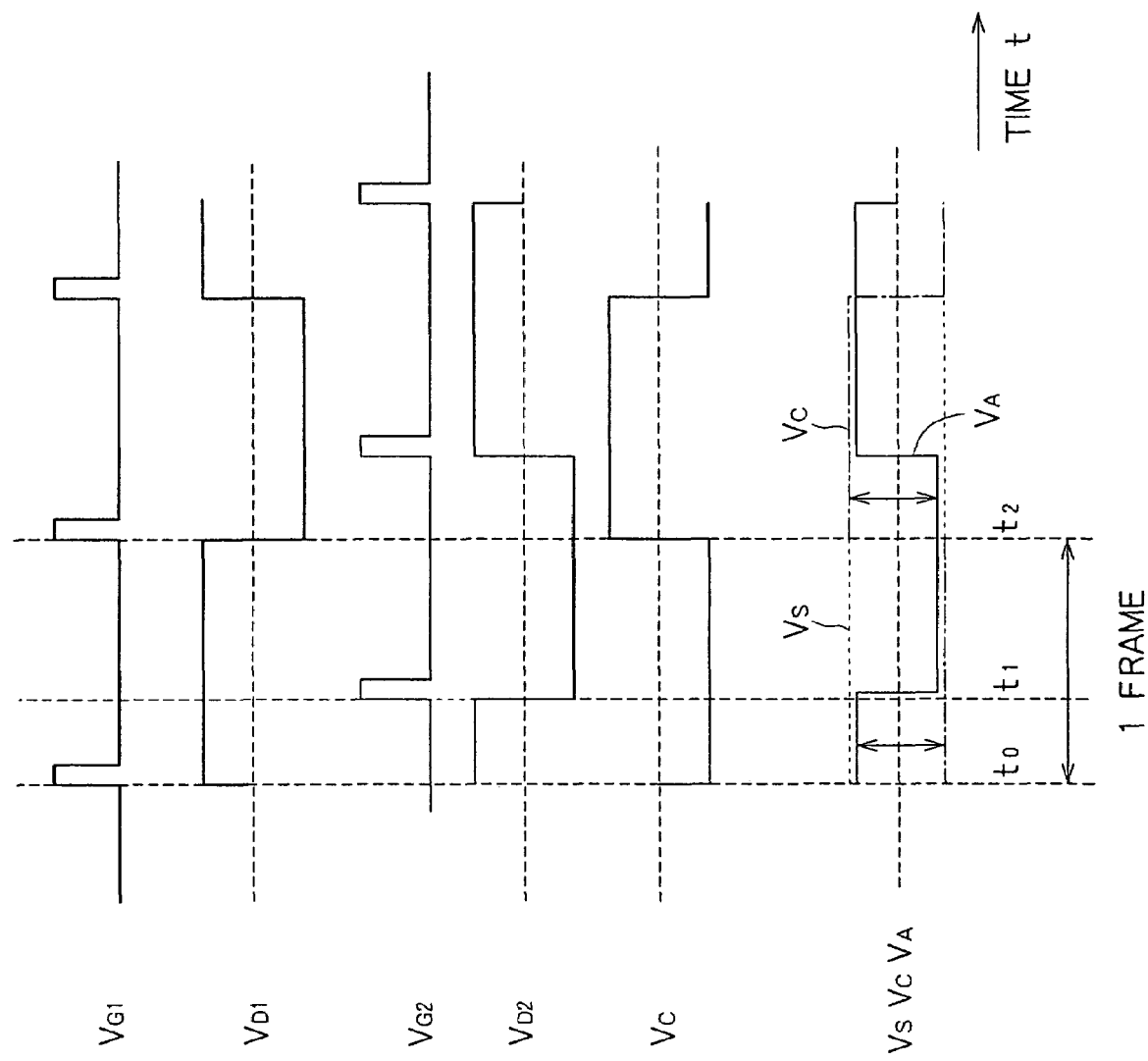
FIG. 5 is a diagram showing signal waveforms supplied to different electrodes and lines in the liquid crystal display panel according to the first embodiment.
Figure 6:
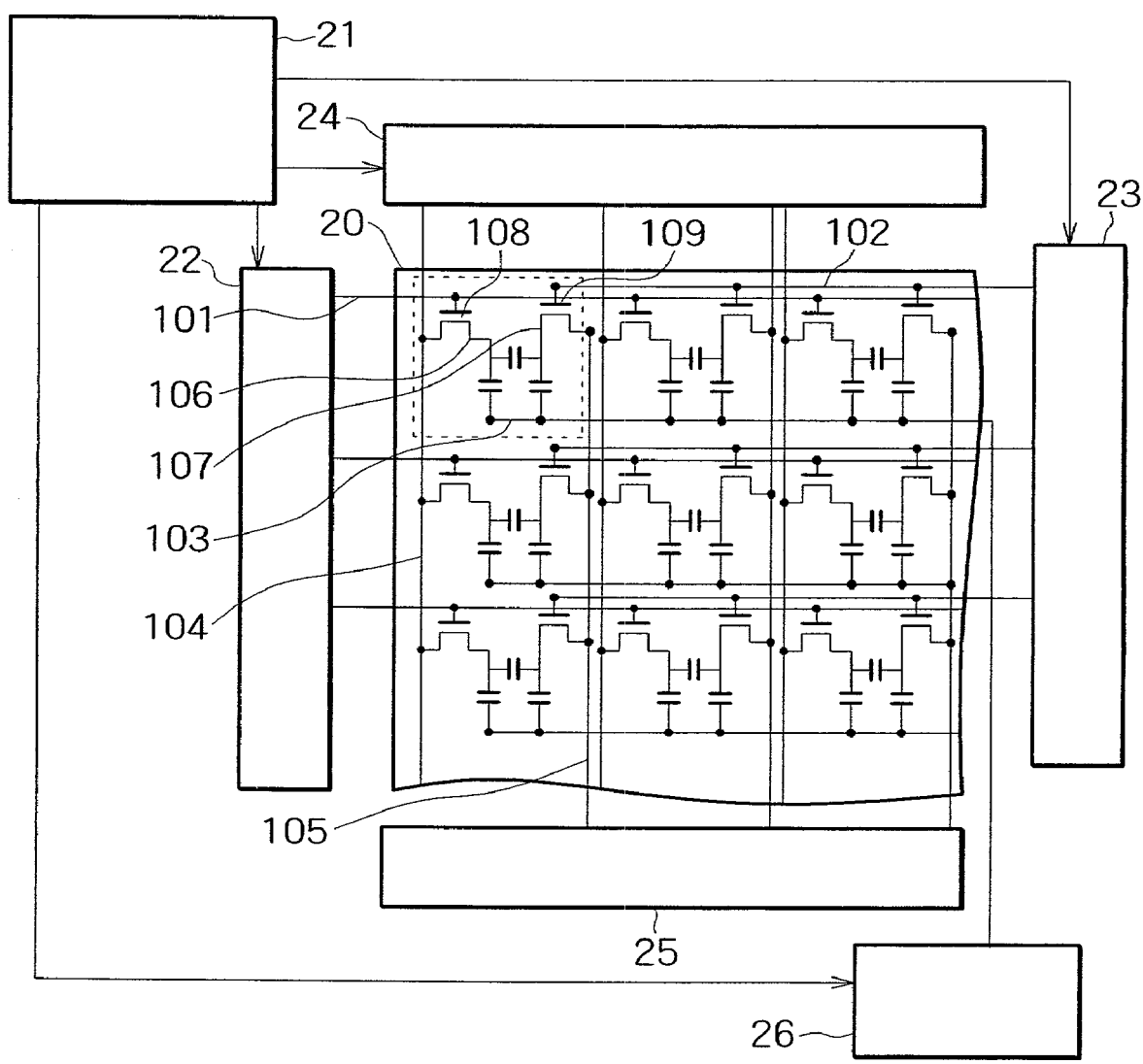
FIG. 6 is a diagram showing an overall structure in which the liquid crystal display panel is driven according to the first embodiment and a second embodiment.

The arrangement according to Embodiment 1 will be explained with reference to FIGS. 3, 4, 5, 6, 7A and 7B. FIG. 3 illustrates the electrode structure of a pixel portion in a liquid crystal display panel according to Embodiment 1. FIG. 4 is a cross-sectional view showing the pixel portion in the liquid crystal display panel according to Embodiment 1. FIG. 5 shows the signal waveforms of signals supplied to the different electrodes and lines shown in FIG. 3. FIG. 6 is a schematic diagram showing the overall structure of the liquid crystal display device having these pixel structures. For the purpose of this specification, the term "liquid crystal display panel" is used to refer to a device which includes a pair of substrates, a liquid crystal layer, electrodes disposed on the pair of substrates, and the like, as shown in FIGS. 1 and 4, and the term "liquid crystal display device" is used to refer to a system combining the liquid crystal display panel, a light source, and the like.

The liquid crystal display panel according to Embodiment 1 is provided with a display portion having a diagonal dimension measuring 14.1 inches, and a pair of transparent glass substrates, each having a 0.7-mm-thick wall. Scanning lines 101, 102 and a common electrode 103 are, first of all, formed on a glass substrate 110. A first insulating film 111 is then formed thereon using silicon nitride SiNx, and signal lines 104, 105, a pixel electrode 106, and a third electrode 107 are formed on the insulating film 111. Chrome molybdenum (CrMo) is used as the electrode material. Any material may be employed for the signal lines 104, 105 and the scanning lines 101, 102 as long as it has a low electrical resistance, and candidates include aluminum, copper, or silver, or an alloy of any of these metals. A second insulating film 112 is then formed on these electrodes, using silicon nitride (SiNx).

A first TFT 108, that is manufactured using amorphous silicon that functions as an active component, is disposed at a position near each intersection point of a first scanning line 101 and a first signal line 104, that are arranged in the form of a matrix, and a second TFT 109, that is manufactured using amorphous silicon that functions as an active component, is disposed at a position near each intersection point of a second scanning line 102 and a second signal line 105, that are arranged in the form of a matrix. A pixel is thus formed to correspond to an area enclosed by each of these lines arranged in matrix form. Though amorphous silicon is used as the active component according to Embodiment 1, a TFT formed by polysilicon may be used instead. The polysilicon TFT has a higher mobility by approximately two orders of magnitude greater than that of amorphous silicon, thus offering the following two advantages. The first advantage is that, as compared with the amorphous silicon TFT, it can make the channel width narrower, which contributes to making the TFT size smaller. In an arrangement in which two active components are formed within one pixel, as in Embodiment 1, the size of the active component contributes greatly to the aperture ratio, which makes the small size polysilicon TFT effective. The second advantage is that the polysilicon TFT permits high-speed switching. To utilize the features of the present invention, it is necessary to scan twice or a plurality of times within one frame period, depending on the electrode structure, which will be described later. To meet such requirements, the polysilicon TFT, which permits switching at high speeds and writing within a short period of time, is effective.

Referring to FIG. 3, the current electrode structure is provided with two TFTs, two scanning lines, and two signal lines to drive one pixel. That is, in each of the pixels making up the display portion, two thin-film transistors (TFTs) are formed within one pixel, the pixel electrode 106 is connected through the first TFT 108 to the first signal line 104 for supplying signals, and the first TFT 108 is scanned by a scanning signal supplied from the first scanning line 101.

The third electrode 107 for generating a strong electric field component is, on the other hand, connected through the second TFT 109 to the second signal line 105 for supplying signals, and the second TFT 109 is scanned by a scanning signal supplied from the second scanning line 102. The common electrode 103 is formed on the same layer as the scanning lines 101, 102 and the third electrode 107 is superposed by way of the first insulating film 111 above the common electrode 103.

A glass substrate 8, that opposes the glass substrate 110 on which TFTs are formed, is provided with a structure having both a stripe RGB color filter 12 and a black matrix 16, as seen in FIG. 4. An overcoat resin 13 is formed on the color filter 12 and the black matrix 16 for flattening. An epoxy resin or the like is used for the overcoat resin.

A polyimide alignment film 11 for aligning liquid crystal molecules is formed to a thickness of 100 nm on a surface of each of the glass substrates formed by the foregoing processes. A polyimide film is generally formed by coating the surface of the substrate with a precursor thereof, which is polyamic acid, using a printer, and then by calcining the substrate. The surface of the polyimide alignment film 11 formed in this manner is rubbed for proper orientation. The rubbing direction is a 15° tilt from the longitudinal direction of the pixel electrode 106.

Figure 7A:
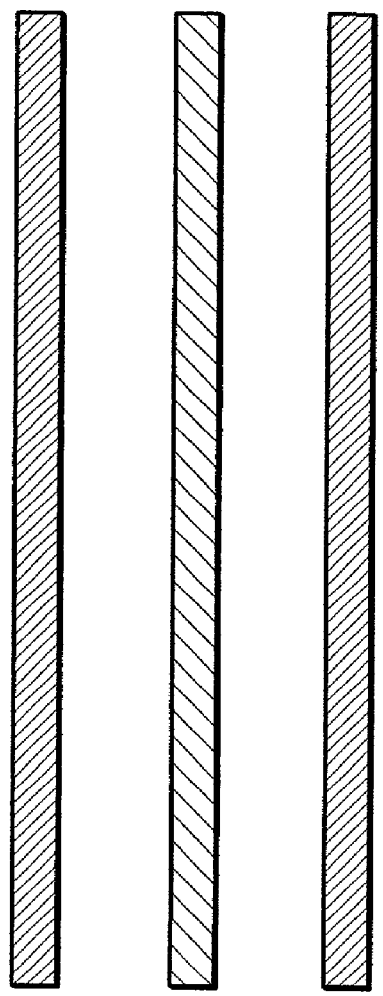
FIGS. 7A and 7B are diagrams illustrating different shapes of electrodes.
Figure 7B:
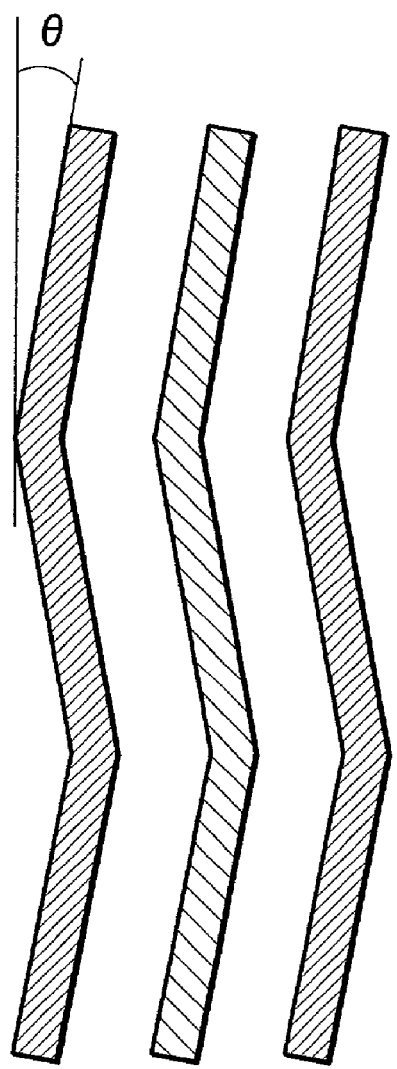

According to Embodiment 1, the electrodes disposed within a pixel (that is, the pixel electrode, the common electrode, and the third electrode) are formed in a comb-like shape, as seen in FIG. 7A. They may nonetheless be formed into a zigzag shape having an angle θ with respect to an electrode elongation direction as shown in FIG. 7B. Forming the electrodes into a zigzag shape creates regions having different directions of rotation of liquid crystal molecules when a voltage is applied, which effectively suppresses coloring. With zigzag electrodes, however, it is necessary to process for orientation as the initial alignment direction of liquid crystal molecules so that the longer axes of liquid crystal molecules coincide with a longitudinal direction of the pixel, for example, for a positive liquid crystal.

A thermosetting sealing medium is then applied to a peripheral edge portion of a display area of one of the paired substrates and the other opposing substrate is placed thereon. The sealing medium is applied so as to form a sealing-in port, through which the liquid crystal material is later introduced into the liquid crystal device. The paired substrates are bonded together, while being heated and pressed. Polymer beads, each having a diameter of 4 micrometers, are dispersed in the layer between the substrates, thus allowing a predetermined gap to be maintained between the substrates. The liquid crystal material is thereafter poured into the liquid crystal display device through the sealing-in port using a vacuum sealing method, and then the sealing-in port is sealed with an ultraviolet-curing resin or the like. A cyano-based liquid crystal having cyano groups in a molecular structure thereof (dielectric anisotropy is positive) is used for the liquid crystal material.

A polarizer 15 is affixed to the respective sides of the paired substrates in a crossed nicols arrangement to offer normally-closed characteristics (that give a black display with a low voltage and a white display with a high voltage).

Referring to FIG. 6, each of the lines is extended up to an end portion of the substrate; and, the first signal line 104, the second signal line 105, the first scanning line 101, the second scanning line 102, and the common electrode 103 are connected, respectively, to a first signal electrode driving circuit 24, a second signal electrode driving circuit 25, a first scanning electrode driving circuit 22, a second scanning electrode driving circuit 23, and a common electrode driving circuit 26. In addition, each of these driving circuits is controlled by a display control device 21. An equivalent circuit corresponding to the electrode structure in Embodiment 1 representing one pixel is shown in a display pixel portion 20, enclosed by broken lines in the drawing.

Figure 8:
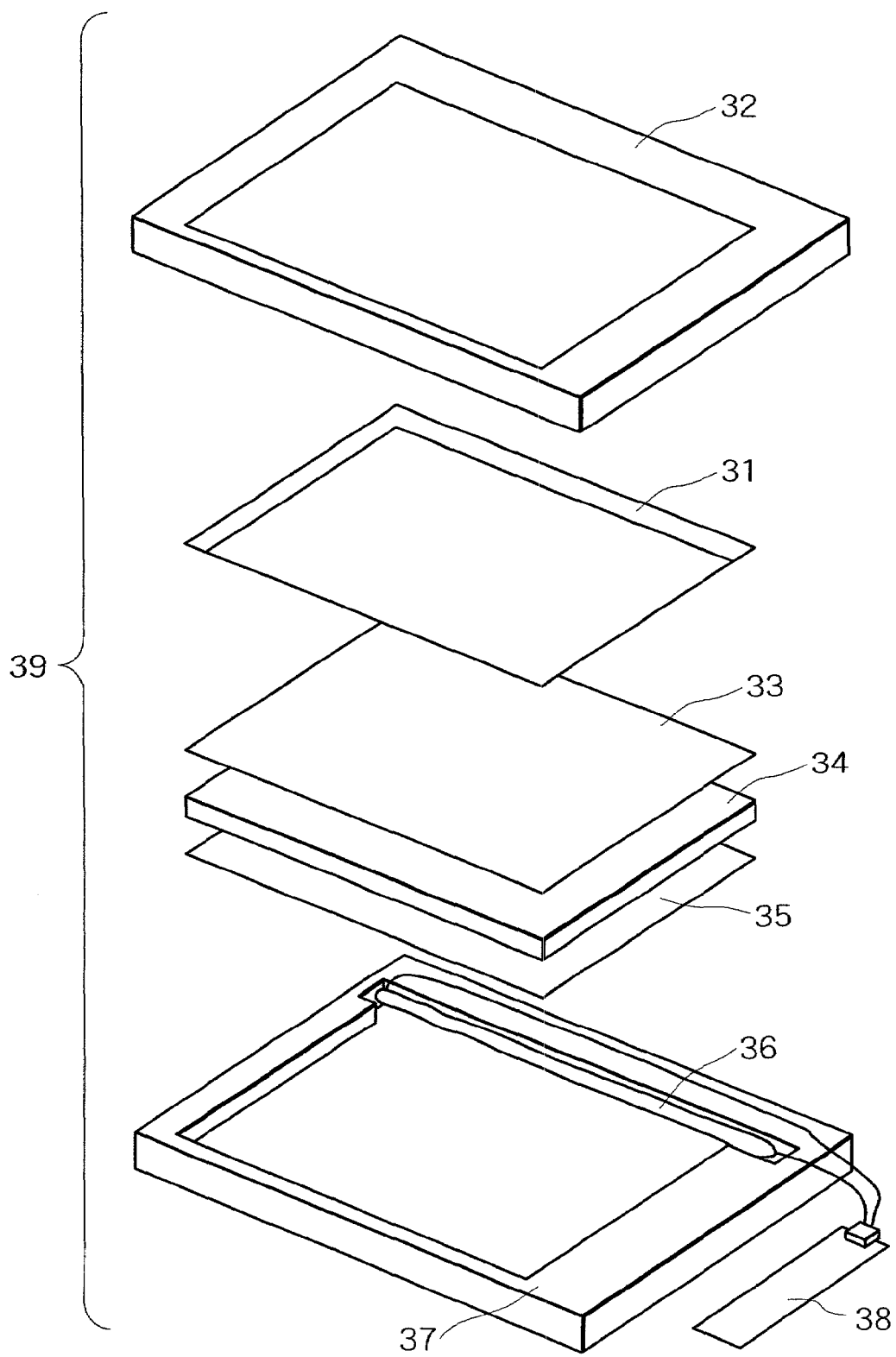
FIG. 8 is an exploded perspective view of a liquid crystal display device.

Then, as seen in FIG. 8, a shield case 32, a diffuser plate 33, a light guiding plate 34, a reflector plate 35, a backlight 36 serving as a light source, a lower case 37, and an inverter circuit 38 are assembled together to form a liquid crystal display device 39.

Application of signal waveform, as shown in FIG. 5 to the different lines and electrodes in the liquid crystal display device assembled in the foregoing processes allows the effects of the present invention to be obtained. The signal waveforms to be applied to different electrodes and lines will be explained.

Referring to FIG. 5, the signal waveform $V_{G1}$ is supplied to the first scanning line 101, the signal waveform $V_{D1}$ is supplied to the first signal line 104, the signal waveform $V_{G2}$ is supplied to the second scanning line 102, the signal waveform $V_{D2}$ is supplied to the second signal line 105, the signal waveform $V_C$ is applied to the common electrode 103, and the signal waveforms $V_S V_C V_A$ (for the pixel electrode $V_S$, the common electrode $V_C$, and for the third electrode $V_A$) repersents the waveforms applied to each of the electrodes disposed within the pixel (the pixel electrode 106, the common electrode 103, and the third electrode 107).

The first TFT is turned to an ON state at $t=t_0$ by the scanning signal fed from the first scanning line 101, thus causing the voltage from the first signal line 104 to be applied to the pixel electrode 106. A signal with a phase shifted from that of the first signal line 104 is supplied to the second signal line 105, and, at the same time, drive is provided so that the second TFT is turned to an ON state at $t=t_1$, causing the voltage from the second signal line 105 to be applied to the third electrode 107. The voltage $V_C$ at the common electrode 103 is driven so as to be synchronized with the first signal waveform $V_{D1}$ and to be opposite in phase with the same. As a result of such driving, a strong electric field is generated in the initial stage ($t_0 < t < t_1$) within one frame period, by a voltage difference $V_A - V_C$ produced between the third electrode 107 and the common electrode 103 (indicated by the arrow in the figure), in addition to a uniform horizontal electric field generated across the pixel electrode 106 and the common electrode 103. The liquid crystal molecules existing near the third electrode 107 are driven at high speeds by this strong electric field, while the remaining liquid crystal molecules existing between the common electrode 103 and the pixel electrode 106 are, in addition to being driven by the uniform horizontal electric field, dragged by the first liquid crystal molecules that are being driven by the strong electric field. This contributes to a higher response speed as a whole body of the liquid crystal molecules, as compared with speed available with the conventional IPS system. In the later stage ($t_1 < t < t_2$) within one frame period thereafter, since the voltage $V_A$ at the third electrode 107 becomes substantially equal to the voltage $V_C$ at the common electrode 103, an electric field as strong as that in the initial stage is not generated, and the liquid crystal molecules are driven only by the uniform horizontal electric field generated across the pixel electrode 106 and the common electrode 103.

Evaluations were next made in terms of response speed and image sticking using the liquid crystal display device obtained according to Embodiment 1 of the present invention. An oscilloscope that combines a photodiode therewith was used for the evaluation of the response speed.

A solid black pattern was first displayed on the entire screen, and then a white pattern corresponding to the maximum luminance was displayed. The oscilloscope was used to read the change in luminance during this period of time; and, with the amount of change from luminance $B_0$ before the change to luminance $B_{fin}$ after the change being regarded as 100%, the time at which a 90% change was completed was reported as the response time. It was confirmed that, in the liquid crystal display device according to Embodiment 1 of the present invention, the response time was shortened as compared with that in the conventional IPS, when the same liquid crystal material was used.

The evaluation of image sticking will be explained. An oscilloscope that combines a photodiode therewith was used for a quantitative evaluation of the image sticking. A window pattern with the maximum luminance was displayed on the screen for 30 minutes; then the entire display was switched to one with a luminance of 10% of the maximum, which represented a halftone display in which the image sticking was most conspicuous. The magnitude of fluctuations in luminance $\Delta B/B_{10\%}$ in luminance B at the image-sticking portion and peripheral halftone portion of the window was evaluated and reported as image-sticking strength. As display characteristics of liquid crystal display devices, the image-sticking phenomenon is considered to be acceptable if the image-sticking strength is 2% or less. The liquid crystal display device according to Embodiment 1 of the present invention clears this level of 2% or less in image-sticking strength. In addition, since Embodiment 1 does not share a structure with Embodiment 2, to be described later, in which a first electrode 106 and a third electrode 107 are superposed on each other, it is not necessary to form a through-hole required to dispose the first electrode and the third electrode on two layers different from each other.

The present invention is not limited to a pixel structure having two divisions within one pixel, as embodied in Embodiment 1. The pixel structure may have, for example, four divisions or even more than that. Especially with a liquid crystal display device having a low definition, the pitch per pixel is wide and the electrode spacing in the pixel structure having two divisions becomes wide, resulting in the driving voltage being increased. To obtain appropriate electrode spacing, therefore, it is necessary to change the number of divisions of the pixel according to the applicable definition.

Figure 9:
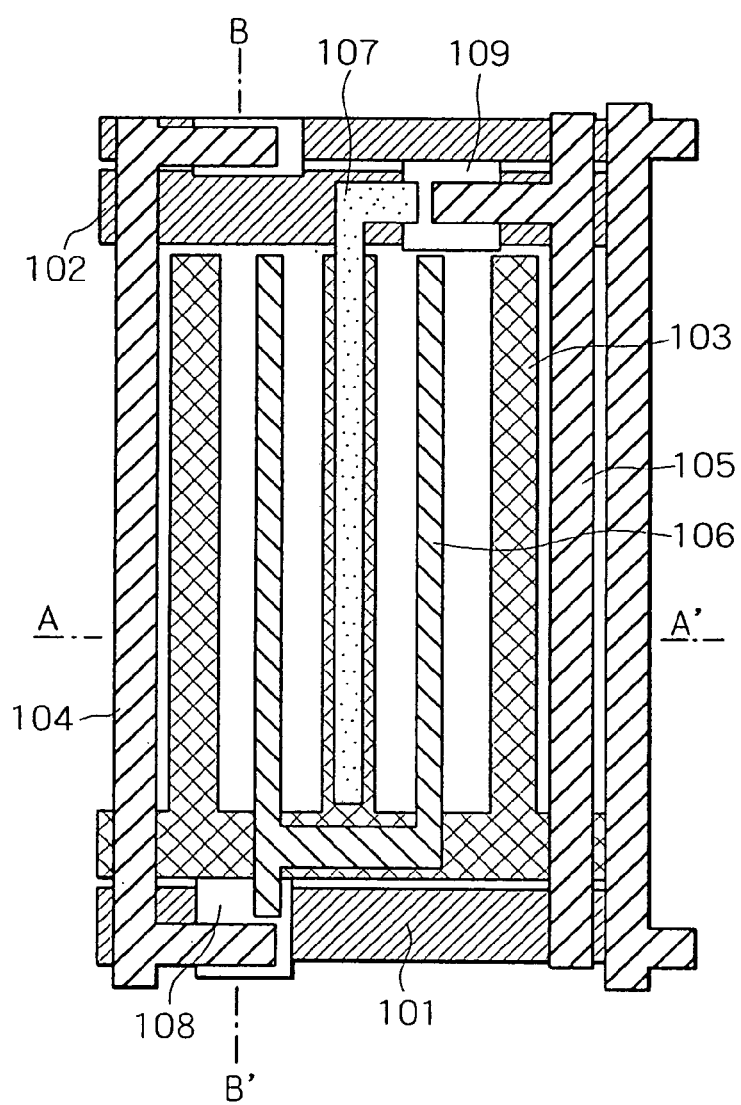
FIG. 9 is a cross-sectional view showing another pixel division structure according to the first embodiment.
Figure 9B:
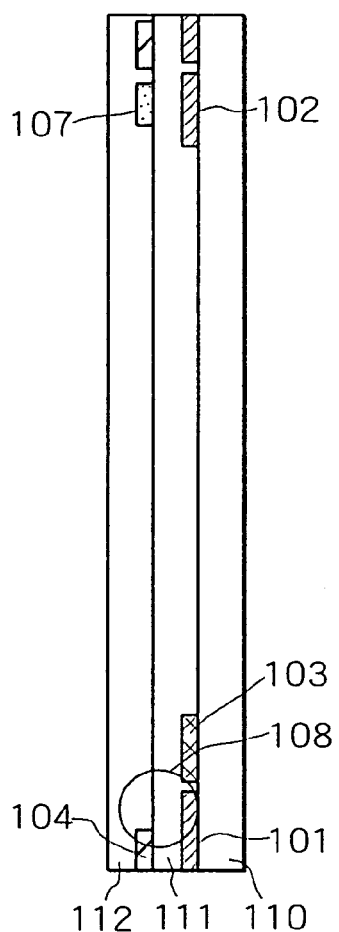
FIGS. 9A and 9B are sections taken along lines A–A' and B–B', respectively, in FIG. 9.
Figure 9A:
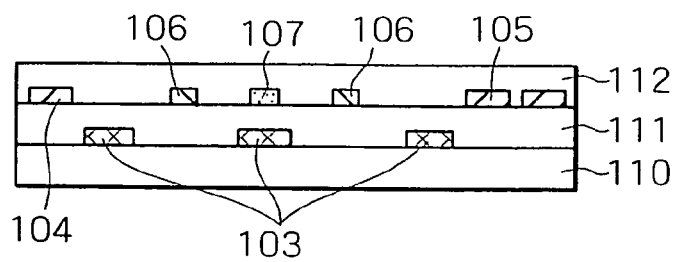

FIG. 9 shows a pixel structure having four divisions within a pixel. In this structure, a third electrode 107 is superposed on a common electrode 103. In particular, the third electrode 107 is superposed on the common electrode 103 at the center of the pixel in consideration of the following problem.

One of the critical problems to be solved in designing a pixel is to reduce noise from signal lines 104, 105 to electrodes within the pixel (for example, a first electrode 106 and the third electrode 107 that serve as pixel electrodes). This is because the noise from the signal lines 104, 105 particularly causes the voltage at the pixel electrodes to fluctuate, thus causing the luminance to fluctuate. Referring to FIG. 9, therefore, the third electrode 107 is disposed so as to be superposed above only the centrally disposed second electrode of the three second electrodes 103 (common electrodes) that extend in the direction of the signal lines 104, 105 within one pixel, thereby blocking noise from the signal lines 104, 105. That is, the center second electrode and the third electrode are used to generate a strong electric field, while shielding noise for the electrodes within the pixel by means of two second electrodes on both sides of the total of three second electrodes 103.

In such a pixel structure also, it is possible to sufficiently derive the effect of the present invention by generating a strong electric field in the initial stage within one frame period using the common electrode and the third electrode 107 at the center of the pixel.

Even with a structure having two or more divisions within a pixel, an arrangement can be made in which the third electrode is disposed so as not to be superposed on the two second electrodes disposed on both sides of a plurality of second electrodes, and a specific second electrode not located on both sides is superposed on the third electrode, which ensures that a similar effect of the present invention can be derived regardless of the number of divisions made within a pixel.

Embodiment 2

Figure 11:
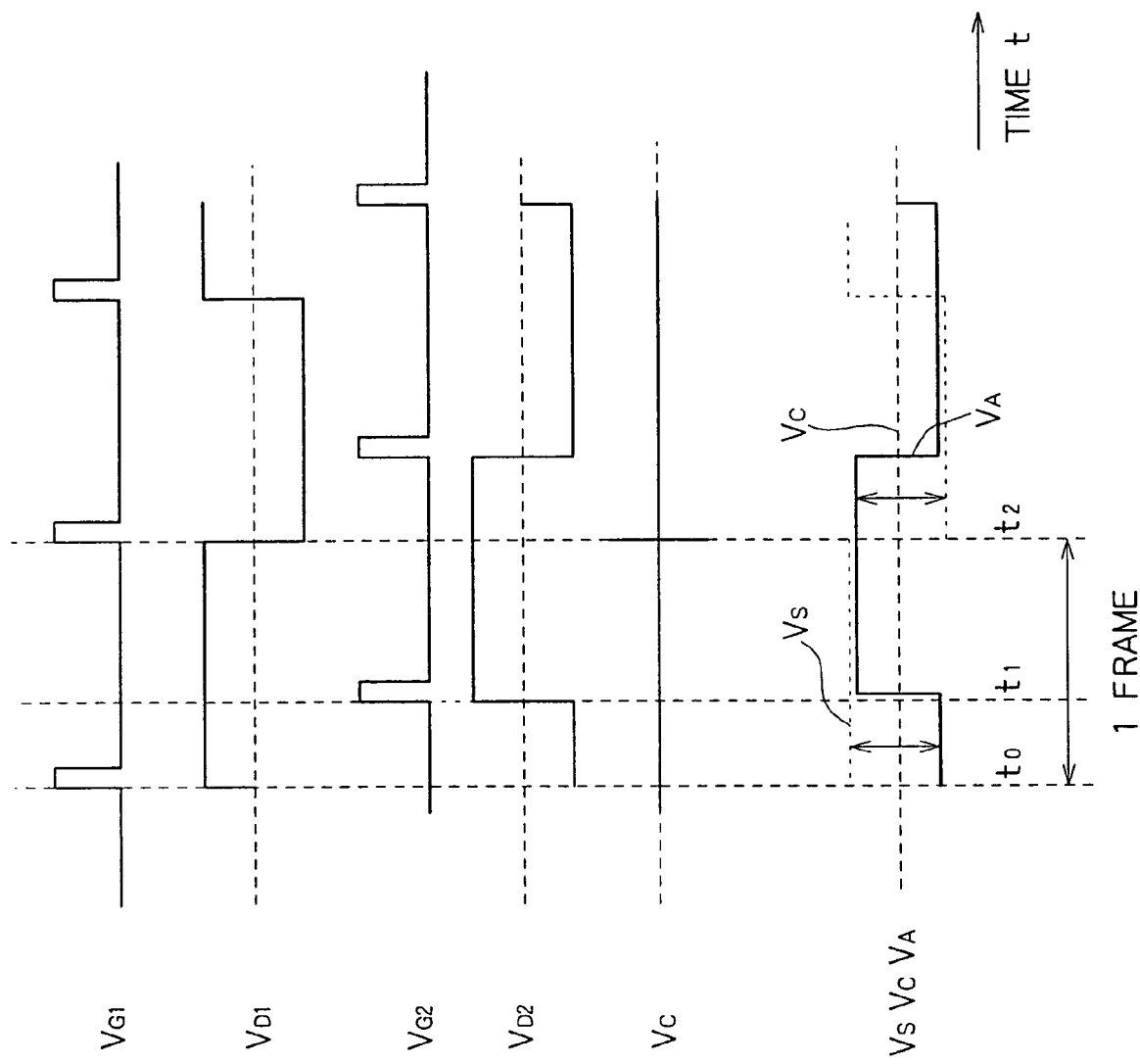
FIG. 11 is a diagram showing signal waveforms supplied to different electrodes and lines in the liquid crystal display panel according to the second embodiment.

The arrangement of a second embodiment according to the present invention will be explained with reference to FIGS. 10 and 11. FIG. 10 includes diagrams of the electrode structure of a pixel portion. FIG. 11 shows the signal waveforms supplied to different electrodes and lines disposed as shown in FIG. 10.

The arrangement of a liquid crystal display panel according to Embodiment 2 differs from that of the liquid crystal display device according to Embodiment 1 in that a third electrode 107 and a pixel electrode 106 are superposed on each other. Because of this configuration, the pixel electrode 106 must be disposed on a layer above the layer on which a first signal line 104 is disposed; and, as shown in FIG. 10B, the pixel electrode 106 is disposed on an even higher layer by way of a through-hole 113, being superposed on the third electrode 107. Since the third electrode 107 is superposed on the pixel electrode 106, signal waveforms supplied to different electrodes and lines also differ from those in Embodiment 1. Embodiment 1 is otherwise the same as in Embodiment 2, including a vertical structure (forming of alignment films, color filters, and the like) and an equivalent circuit arrangement of pixels.

FIG. 11 shows the signal waveforms supplied to different electrodes and lines according to Embodiment 2. The signal waveforms to be applied to different electrodes and lines will be explained.

In FIG. 11, a signal waveform $V_{G1}$ is supplied to a first scanning line 101, a signal waveform $V_{D1}$ is supplied to a first signal line 104, a signal waveform $V_{G2}$ is supplied to a second scanning line 105, a signal waveform $V_{D2}$ is supplied to a second signal line 105, a signal waveform $V_C$ is applied to a common electrode 103, and a signal waveforms $V_S V_C V_A$ (for the pixel electrode $V_S$, the common electrode $V_C$, and for the third electrode $V_A$) are applied to each of the electrodes within the pixel (the pixel electrode 106, the common electrode 103, and the third electrode 107).

The first TFT is turned to an ON state at $t=t_0$ by the scanning signal fed from the first scanning line 101, thus causing the voltage from the first signal line 104 to be applied to the pixel electrode 106. A signal with a phase shifted from that of the first signal line 104 is supplied to the second signal line 105; and, at the same time, drive is provided so that the second TFT is turned to an ON state at $t=t_1$, causing the voltage from the second signal line 105 to be applied to the third electrode 107. The voltage $V_C$ at the common electrode 103 is constant. In such driving, a strong electric field is generated in the initial stage ($t_0<t<t_1$) within one frame period by a voltage difference $V_S-V_A$ produced between the third electrode 107 and the pixel electrode 106 (indicated by the arrow in the figure), in addition to a uniform horizontal electric field generated across the pixel electrode 106 and the common electrode 103. The liquid crystal molecules existing near the third electrode 107 are driven at high speed by this strong electric field, while the remaining liquid crystal molecules existing between the common electrode 103 and the pixel electrode 106, in addition to being driven by the uniform horizontal electric field, are dragged by the first liquid crystal molecules that are driven by the strong electric field. This contributes to a higher response speed of a whole body of the liquid crystal molecules as compared with the speed attained by the conventional IPS system. In the middle stage ($t_1<t<t_2$) within one frame period thereafter, since the voltage $V_A$ at the third electrode 107 becomes substantially equal to the voltage $V_S$ at the pixel electrode 106, an electric field as strong as that in the initial stage is not generated, and the liquid crystal molecules are driven only by the uniform horizontal electric field generated across the pixel electrode 106 and the common electrode 103.

Evaluations were made in terms of response speed and image sticking using the liquid crystal display device obtained according to Embodiment 2 of the present invention. It was confirmed that, in the liquid crystal display device according to Embodiment 2 of the present invention, the response time was shortened as compared with that of the conventional IPS system, when the same liquid crystal material was used. Moreover, the liquid crystal display device according to Embodiment 2 of the present invention achieved an image-sticking strength of 2% or less.

As in Embodiment 1, Embodiment 2 is not limited to a pixel structure having two divisions within one pixel, either. Rather, the pixel structure may have four divisions or even more than that.

Figure 12:
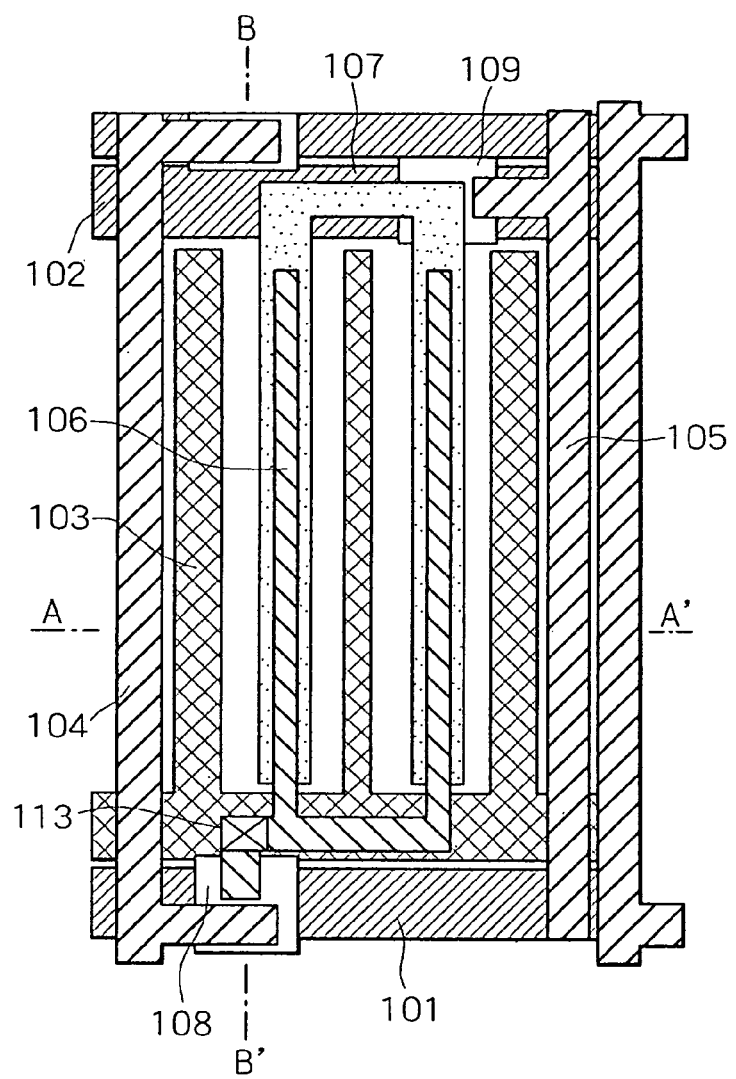
FIG. 12 is a cross-sectional view showing another pixel division structure according to the second embodiment.
Figure 12B:
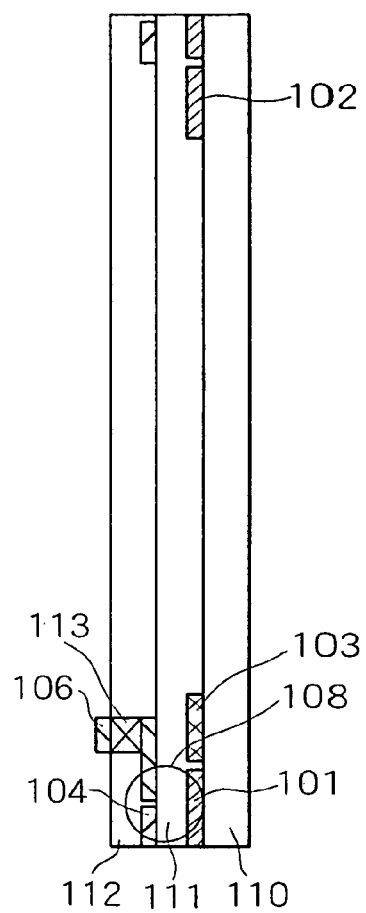
FIGS. 12A and 12B are sections taken along lines A–A' and B–B', respectively, in FIG. 12.
Figure 12A:
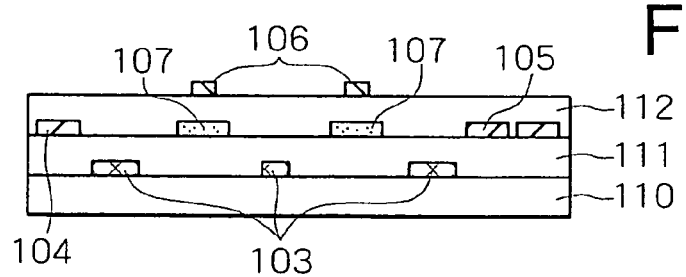

FIG. 12 shows a pixel structure having four divisions within a pixel. The structure is characterized in that the third electrode 107 is superposed on the pixel electrode 106. In such a pixel structure also, it is possible to sufficiently derive the effect of the present invention by generating strong electric field in the initial stage within one frame period using the pixel electrode 106 and the third electrode 107. With the pixel structure having four divisions according to Embodiment 2, there are two pairs of the first electrode and the third electrode superposed, which allows a strong electric field to be generated effectively through driving with even a lower voltage than with the four-division structure according to Embodiment 1.

In addition, in this pixel structure, too, the wide second electrode, serving as the common electrode 103 is disposed along the signal lines 104, 105, which effectively shields noise from the signal lines to the pixel electrode, thus eliminating the problem noted in the description of Embodiment 1.

Embodiment 3

Figure 13:
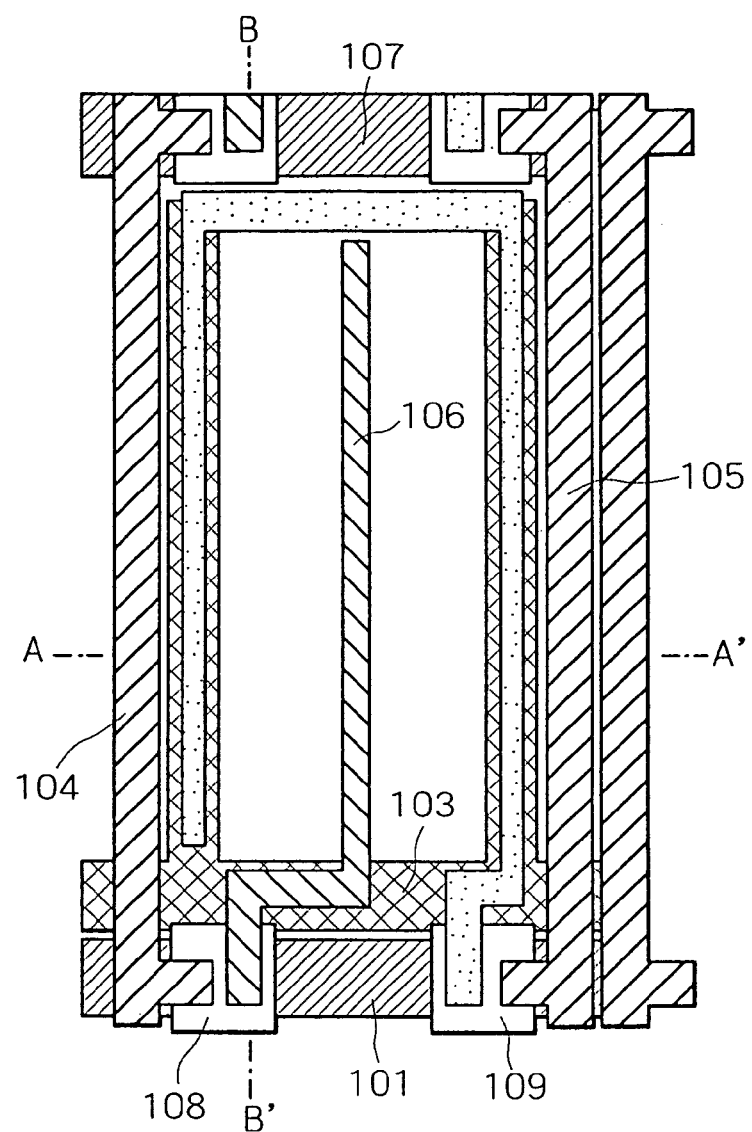
FIG. 13 is a cross-sectional view showing the electrode structure of a pixel portion in a liquid crystal display panel according to a third embodiment of the invention.
Figure 13B:
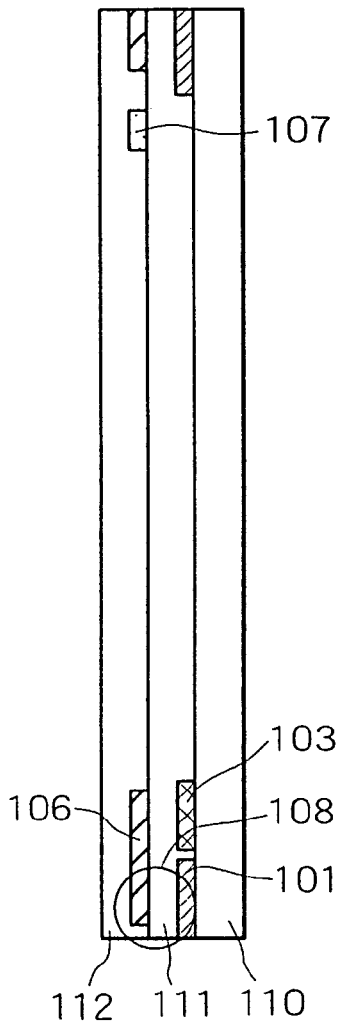
FIGS. 13A and 13B are sections taken along lines A–A' and B–B', respectively, in FIG. 13.
Figure 13A:
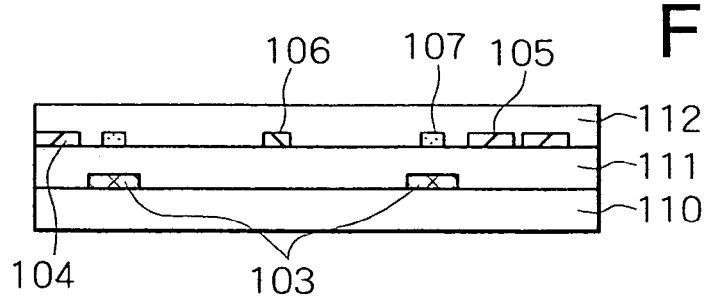
Figure 14:
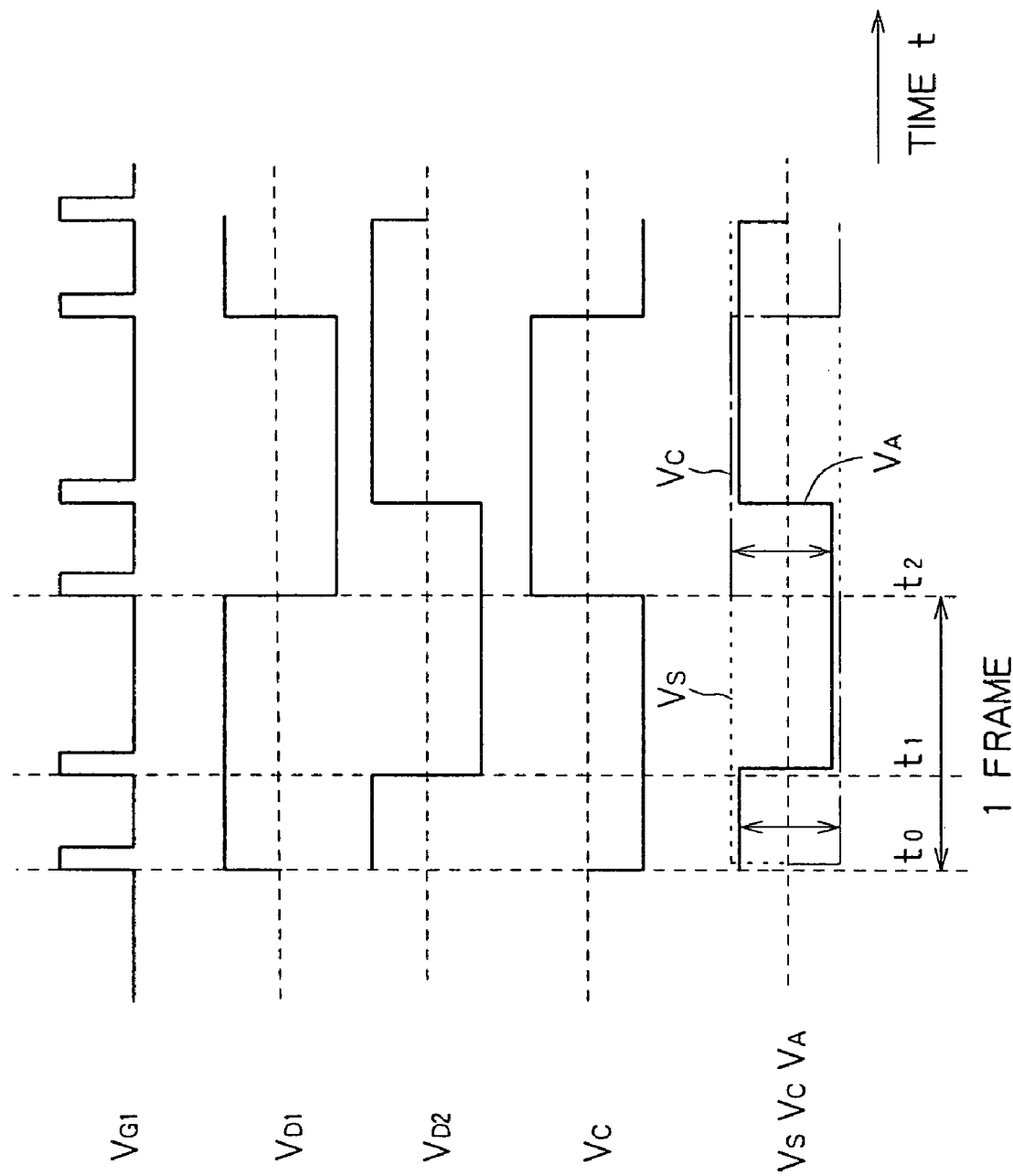
FIG. 14 is a diagram showing signal waveforms supplied to different electrodes and lines in the liquid crystal display panel according to the third embodiment.
Figure 15:
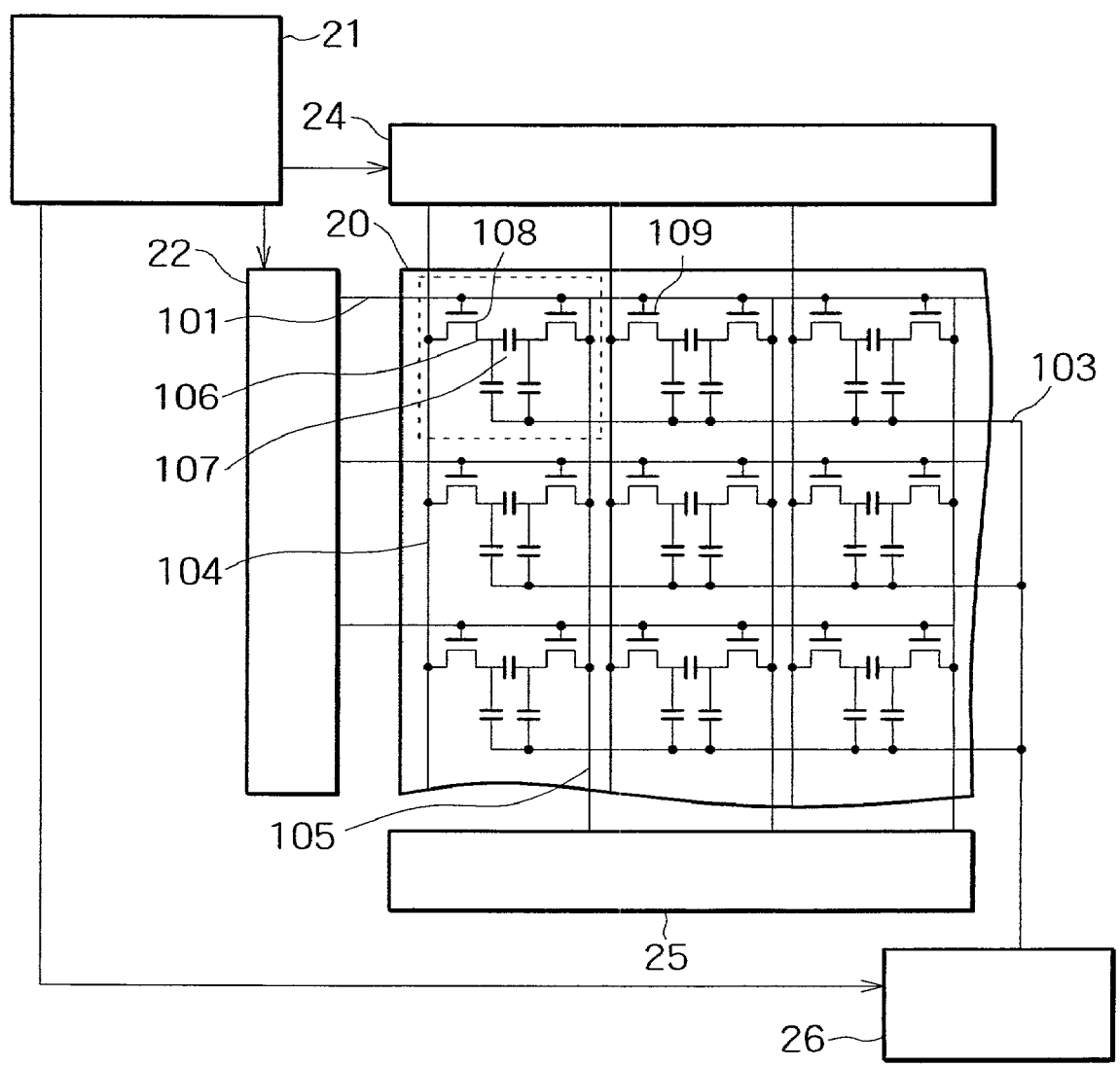
FIG. 15 is a diagram showing an overall structure in which the liquid crystal display panel is driven, according to the third embodiment and a fourth embodiment.

The arrangement of a third embodiment according to the present invention will be explained with reference to FIGS. 13, 14, and 15. FIG. 13 shows a view of the electrode structure of a pixel portion. FIG. 14 shows signal waveforms supplied to different electrodes and lines. FIG. 15 is a schematic diagram showing the overall structure of the liquid crystal display panel having these pixel structures.

The arrangement of the liquid crystal display panel according to Embodiment 3 differs from that of the liquid crystal display device according to Embodiment 1 in that two TFTs disposed within one pixel are driven by one scanning line. The reduction in the number of scanning lines by one from the arrangement according to Embodiment 1 yields the effect that a second scanning line driver is no longer necessary.

As shown in FIG. 13, the electrode structure according to Embodiment 3 is provided with two TFTs, one scanning line, and two signal lines in order to drive one pixel. That is, in pixels that make up a display portion, two thin-film transistors (TFTs) are formed within one pixel; a pixel electrode 106 is connected by way of a first TFT 108 to a first signal line 104 for supplying signals; a third electrode 107 required for generating a strong electric field component is connected by way of a second TFT 109 to a second signal line 105 for supplying signals; and the first TFT 108 and the second TFT 109 are both scanned by one scanning signal supplied from a first scanning line 101. A common electrode 103 is formed on the same layer as the scanning line 101; and, above the common electrode 103, the third electrode 107 is superposed by way of an insulating film 111.

Referring to FIG. 15, each of the lines is extended up to an end portion of the substrate; and, the first signal line 104, the second signal line 105, the first scanning line 101, and the common electrode 103 are connected, respectively, to a first signal electrode driving circuit 24, a second signal electrode driving circuit 25, a first scanning electrode driving circuit 22, and a common electrode driving circuit 26. In addition, each of these driving circuits is controlled by a display control device 21. An equivalent circuit corresponding to the electrode structure in Embodiment 3, representing one pixel, is shown in a display pixel portion 20 enclosed by broken lines in the drawings.

Application of signal waveforms as shown in FIG. 14 to the different lines and electrodes in a liquid crystal display device assembled in accordance with the foregoing processes allows the effects of the present invention to be obtained.

In FIG. 14, a signal waveform $V_{G1}$ is supplied to the first scanning line 101, a signal waveform $V_{D1}$ is supplied to the first signal line 104, a signal waveform $V_{D2}$ is supplied to the second signal line 105, a signal waveform $V_C$ is applied to the common electrode 103, and signal waveforms $V_S V_C V_A$ (for the pixel electrode $V_S$, the common electrode $V_C$, and for the third electrode $V_A$) are applied to each of the electrodes disposed within the pixel (the pixel electrode 106, the common electrode 103, and the third electrode 107). Noteworthy about Embodiment 3 is the fact that the scanning line 101 is scanned twice within one frame period.

Signals with different phases from each other are supplied to the first signal line 104 and the second signal line 105, and the scanning line 101 is scanned twice within one frame period. At each of the timings of $t=t_0$ and $t=t_1$, a scanning signal from the scanning line 101 turns both the first TFT 108 and the second TFT 109 to an ON state at the same time, causing a voltage from the first signal line 104 to be applied to the pixel electrode 106 and a voltage from the second signal line 105 to be applied to the third electrode 107. The voltage $V_C$ at the common electrode 103 is driven so as to be synchronized with the first signal waveform $V_{D1}$ and to be in reverse phase with the same. In such driving, a strong electric field is generated in the initial stage ($t_0<t<t_1$) within one frame period by a voltage difference $V_A-V_C$ produced between the third electrode 107 and the common electrode 103 (indicated by the arrow in the figure), in addition to a uniform horizontal electric field generated across the pixel electrode 106 and the common electrode 103. The liquid crystal molecules existing near the third electrode 107 are driven at high speed by this strong electric field, while the remaining liquid crystal molecules existing between the common electrode 103 and the pixel electrode 106, in addition to being driven by the uniform horizontal electric field, are dragged by the first liquid crystal molecules that are driven by the strong electric field. This contributes to a higher response speed of a whole body of the liquid crystal molecules as compared with the speed attained by the conventional IPS system. In the later stage ($t_1<t<t_2$) within one frame period thereafter, since the voltage $V_A$ at the third electrode 107 becomes substantially equal to the voltage $V_C$ at the common electrode 103, an electric field as strong as that in the initial stage is not generated, and the liquid crystal molecules are driven only by the uniform horizontal electric field generated across the pixel electrode 106 and the common electrode 103.

Evaluations were made in terms of response speed and image sticking using the liquid crystal display device obtained according to Embodiment 3 of the present invention. It was confirmed that, in the liquid crystal display device according to Embodiment 3 of the present invention, the response time was shortened as compared with that in the conventional IPS system, when the same liquid crystal material was used. Moreover, the liquid crystal display device according to Embodiment 3 of the present invention achieved an image-sticking strength of 2% or less.

As in Embodiment 1, a pixel structure having four divisions or more is also applicable to Embodiment 3.

Embodiment 4

Figures 16, 16A, 16B:
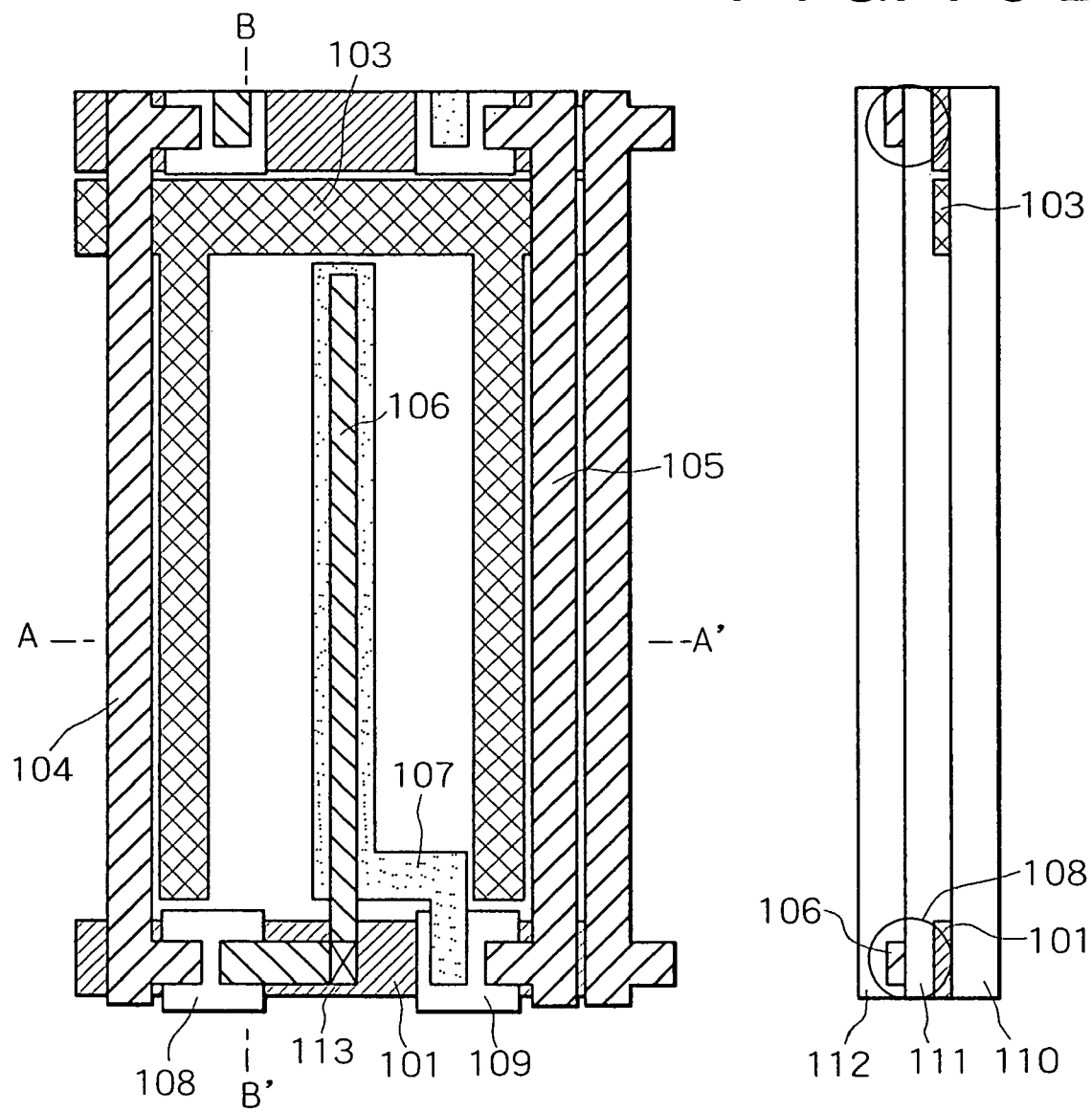
FIG. 16 is a cross-sectional view showing the electrode structure of a pixel portion in a liquid crystal display panel according to the fourth embodiment of the invention.
FIGS. 16A and 16B are sections taken along lines A–A' and B–B', respectively, in FIG. 16.
Figure 17:
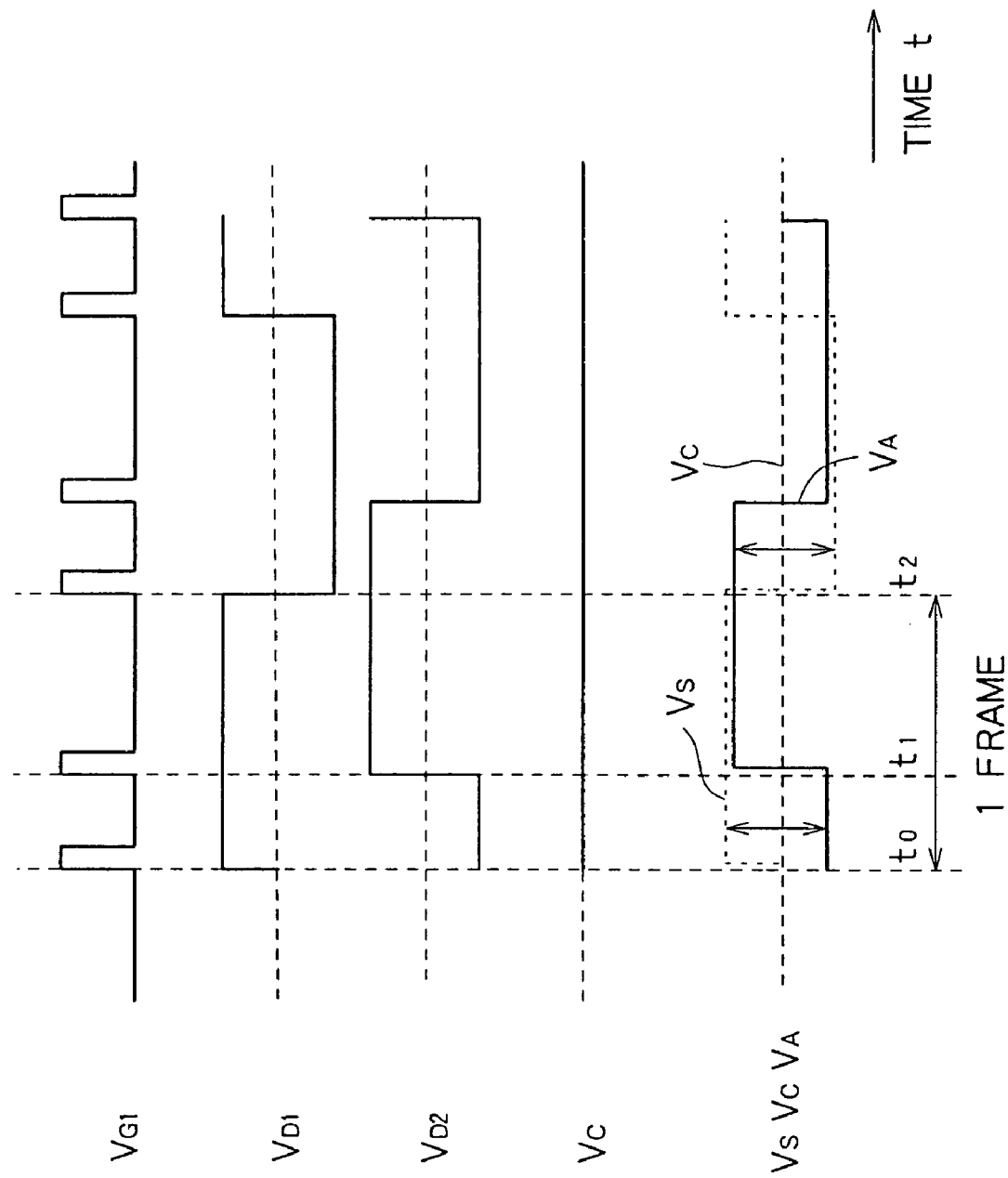
FIG. 17 is a diagram showing signal waveforms supplied to different electrodes in the liquid crystal display panel according to the fourth embodiment.

The arrangement of a fourth embodiment according to the present invention will be explained with reference to FIGS. 16 and 17. FIG. 16 is a view showing the electrode structure of a pixel portion. FIG. 17 shows signal waveforms supplied to different electrodes and lines.

The arrangement of the liquid crystal display panel according to Embodiment 4 differs from that of the liquid crystal display device according to Embodiment 3 in that a third electrode 107 and a pixel electrode 106 are superposed on each other. Because of this difference in arrangement, the pixel electrode 106 must be disposed on a layer above the layer on which a first signal line 104 is disposed; and, as shown in FIG. 16 and FIG. 16A, the pixel electrode 106 is disposed on an even higher layer by way of a through-hole 113, being superposed on the third electrode 107. Since the third electrode 107 is superposed on the pixel electrode 106, signal waveforms supplied to different electrodes and lines also differ from those in Embodiment 3. The equivalent circuit arrangement of pixels in this embodiment is the same as that in Embodiment 3.

FIG. 17 shows the signal waveforms supplied to different electrodes and lines according to Embodiment 4. The signal waveforms to be applied to different electrodes and lines will be explained.

In FIG. 17, a signal waveform $V_{G1}$ is supplied to the first scanning line 101, a signal waveform $V_{D1}$ is supplied to the first signal line 104, a signal waveform $V_{D2}$ is supplied to the second signal line 105, a signal waveform $V_C$ is applied to the common electrode 103, and signal waveforms $V_S V_C V_A$ (for the pixel electrode $V_S$, the common electrode $V_C$, and for the third electrode $V_A$) are applied to each of the electrodes disposed within the pixel (the pixel electrode 106, the common electrode 103, and the third electrode 107). Noteworthy about Embodiment 4 is the fact that the scanning line 101 is scanned twice within one frame period.

Signals with different phases from each other are supplied to the first signal line 104 and the second signal line 105, and the scanning line 101 is scanned twice within one frame period. At each of the timings of $t=t_0$ and $t=t_1$, a scanning signal from the scanning line 101 turns both the first TFT 108 and the second TFT 109 to an ON state at the same time, causing a voltage from the first signal line 104 to be applied to the pixel electrode 106 and a voltage from the second signal line 105 to be applied to the third electrode 107. The voltage $V_C$ at the common electrode 103 is constant. In such driving, a strong electric field is generated in the initial stage ($t_0<t<t_1$) within one frame period by a voltage difference $V_S-V_A$ produced between the third electrode 107 and the pixel electrode 106 (indicated by the arrow in the figure), in addition to a uniform horizontal electric field generated across the pixel electrode 106 and the common electrode 103. The liquid crystal molecules existing near the third electrode 107 are driven at high speed by this strong electric field, while the remaining liquid crystal molecules existing between the common electrode 103 and the pixel electrode 106, in addition to being driven by the uniform horizontal electric field, are dragged by the first liquid crystal molecules that are driven by the strong electric field. This contributes to a higher response speed of a whole body of the liquid crystal molecules as compared with the response speed of the conventional IPS system. In the later stage ($t_1<t<t_2$) within one frame period thereafter, since the voltage $V_A$ at the third electrode 107 becomes substantially equal to the voltage $V_S$ at the pixel electrode 106, an electric field as strong as that in the initial stage is not generated, and the liquid crystal molecules are driven only by the uniform horizontal electric field generated across the pixel electrode 106 and the common electrode 103.

Evaluations were made in terms of response speed and image sticking using the liquid crystal display device obtained according to Embodiment 4 of the present invention. It was confirmed that, in the liquid crystal display device according to Embodiment 4 of the present invention, the response time was shortened as compared with that of the conventional IPS system when the same liquid crystal material was used. Moreover, the liquid crystal display device according to Embodiment 4 of the present invention achieved an image-sticking strength of 2% or less.

As in Embodiments 1 and 3, a pixel structure having four divisions or more is also applicable to Embodiment 4.

Embodiment 5

Figure 18:
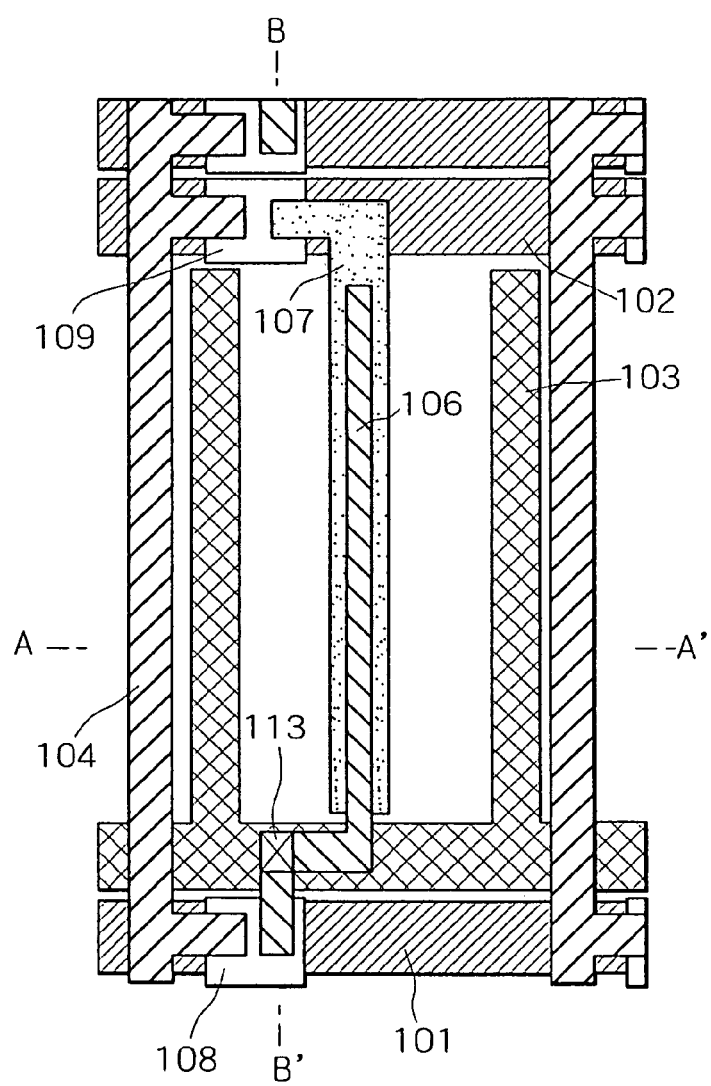
FIG. 18 is a cross-sectional view showing the electrode structure of a pixel portion in a liquid crystal display panel according to a fifth embodiment of the invention.
Figure 18B:
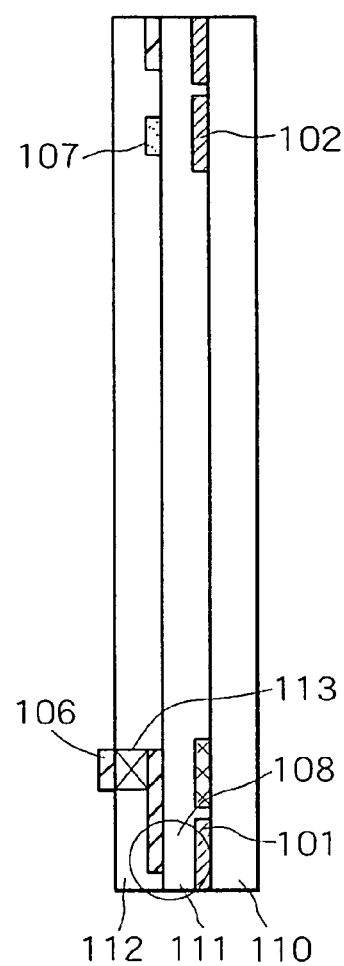
FIGS. 18A and 18B are sections taken along lines A–A' and B–B', respectively, in FIG. 19.
Figure 18A:
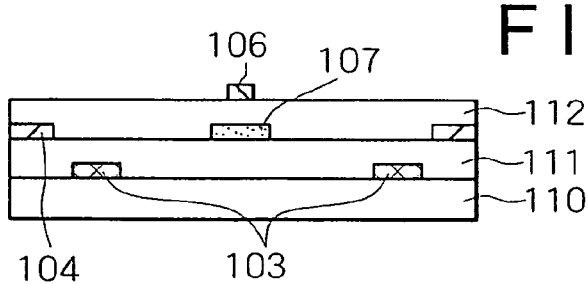
Figure 19:
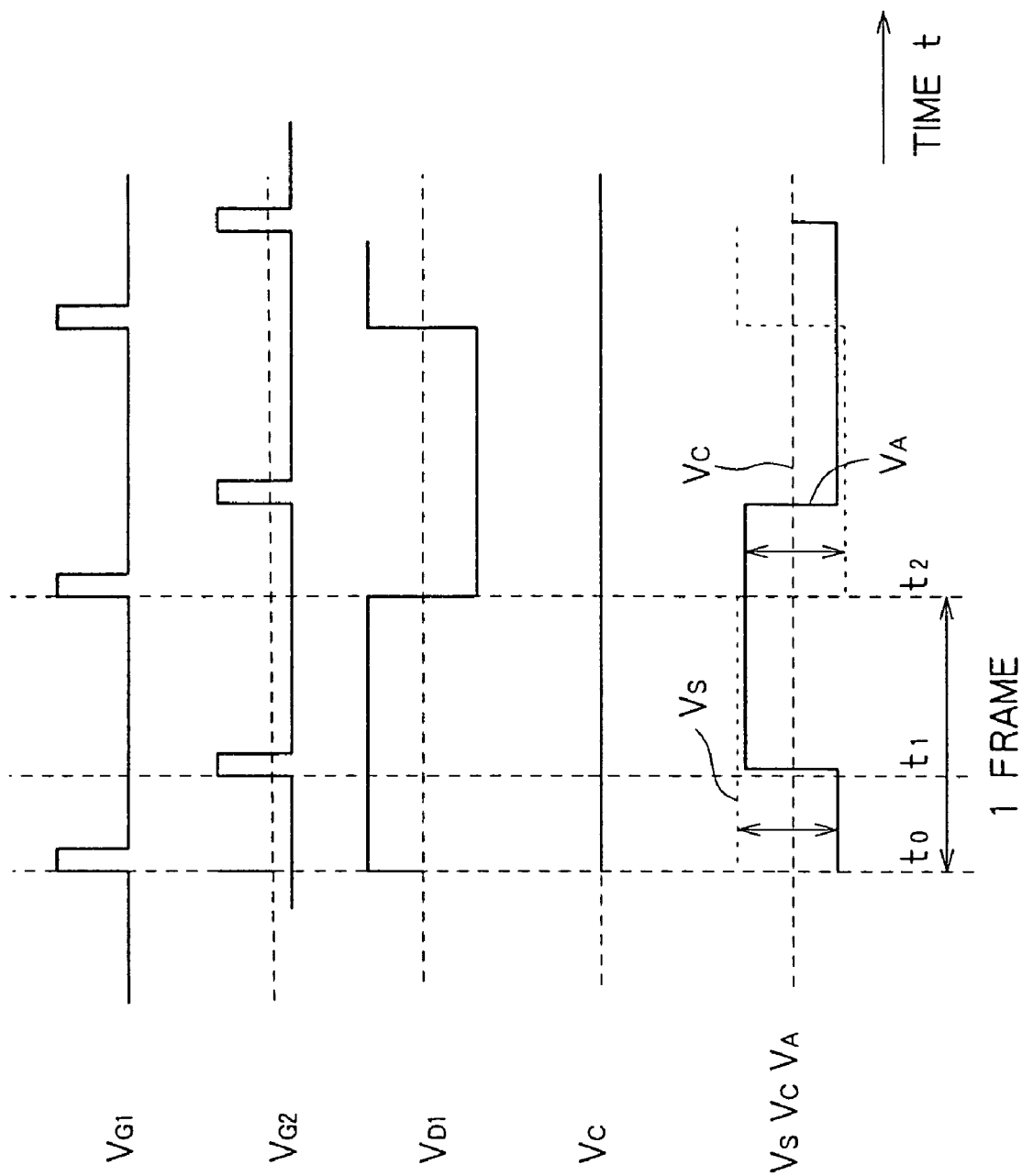
FIG. 19 is a diagram showing signal waveforms supplied to different electrodes in the liquid crystal display panel according to the fifth embodiment.
Figure 20:
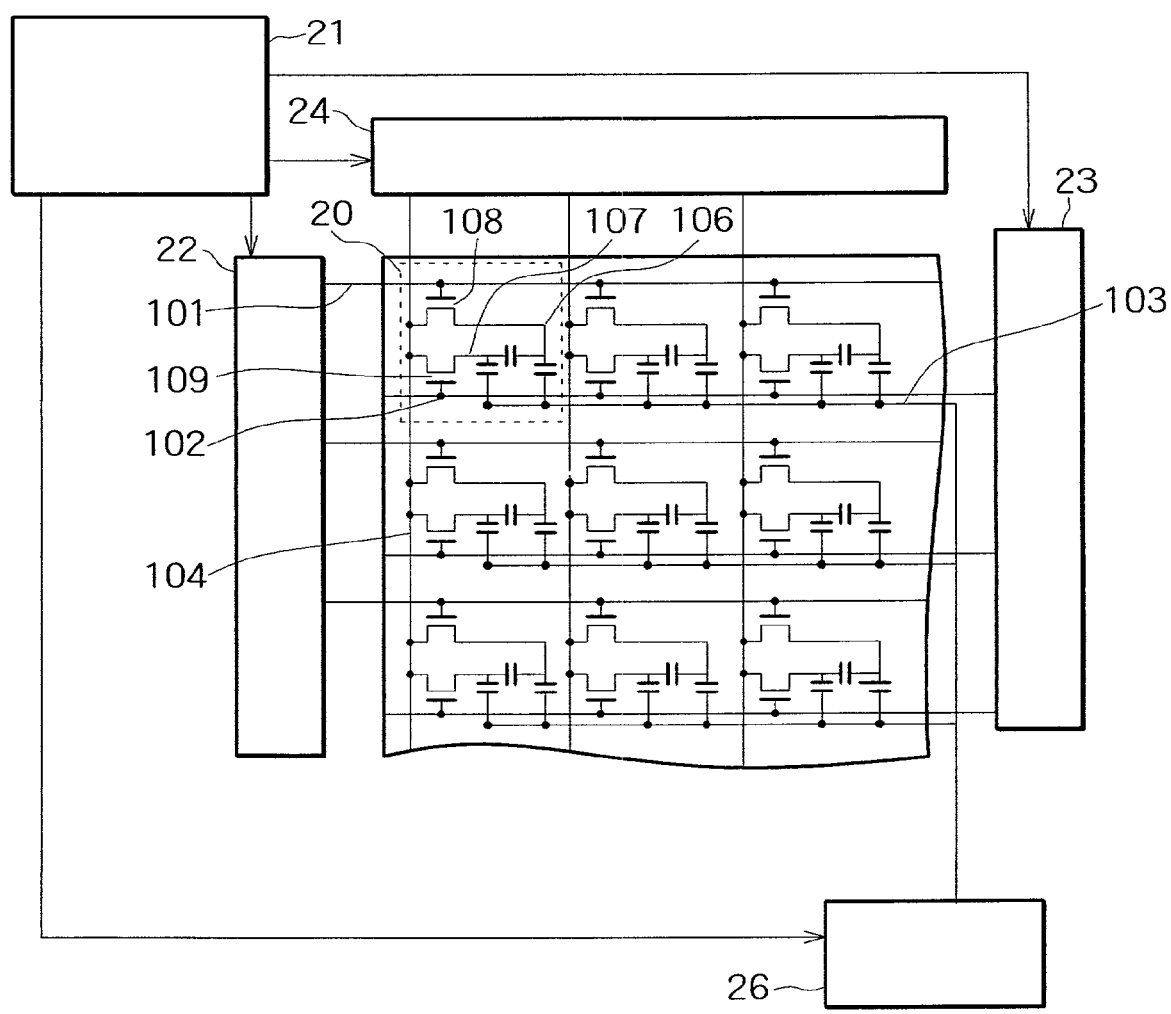
FIG. 20 is a diagram showing the overall structure in which the liquid crystal display panel is driven according to the fifth embodiment.

The arrangement of a fifth embodiment according to the present invention will be explained with reference to FIGS. 18, 19, and 20. FIG. 18 is a view showing the electrode structure of a pixel portion. FIG. 19 shows signal waveforms supplied to different electrodes and lines. FIG. 20 is a schematic diagram showing the overall structure of the liquid crystal display panel having these pixel structures.

The arrangement of the liquid crystal display panel according to Embodiment 5 differs from that of the liquid crystal display device according to Embodiment 2 in that the voltage applied to a pixel electrode 106 and a third electrode 107, disposed within one pixel, is supplied from a single signal line 104. The reduction in the number of signal lines by one from the arrangement according to Embodiment 2 yields the effect that a second scanning line driver is no longer necessary. The arrangement is also advantageous in terms of the aperture ratio as compared with Embodiment 2.

As shown in FIG. 18, the electrode structure according to Embodiment 5 is provided with two TFTs, two scanning lines, and one signal line in order to drive one pixel. That is, in each of the pixels that make up a display portion, two thin-film transistors (TFTs) are formed within one pixel, the pixel electrode 106 and the third electrode 107 are connected by way of a first TFT 108 and a second TFT 109, respectively, to the single first signal line 104, and the first TFT 108 and the second TFT 109 are scanned by scanning signals from a first scanning line 101 and a second scanning line 102, respectively. The pixel electrode 106 is formed on the top layer through a through-hole and is superposed on the third electrode 107 by way of an insulating film 112.

Referring to FIG. 20, each of the lines is extended up to an end portion of the substrate; and, the first signal line 104, the first scanning line 101, the second scanning line 102, and the common electrode 103 are connected, respectively, to a first signal electrode driving circuit 24, a first scanning electrode driving circuit 22, a second scanning electrode driving circuit 22, and a common electrode driving circuit 26. In addition, each of these driving circuits is controlled by a display control device 21. An equivalent circuit corresponding to the electrode structure in Embodiment 5 representing one pixel is shown in a display pixel portion 20 enclosed by broken lines in the drawing.

Application of signal waveforms as shown in FIG. 19 to the different lines and electrodes in a liquid crystal display device assembled in accordance with the foregoing processes allows the effects of the present invention to be obtained.

In FIG. 19, a signal waveform $V_{G1}$ is supplied to the first scanning line 101, a signal waveform $V_{G2}$ is supplied to the second scanning line 102, a signal waveform $V_{D1}$ is supplied to the signal line 104, a signal waveform $V_C$ is applied to the common electrode 103, and a signal waveforms $V_S V_C V_A$ (for the pixel electrode $V_S$, the common electrode $V_C$, and for the third electrode $V_A$) are applied to each of the electrodes disposed within the pixel (the pixel electrode 106, the common electrode 103, and the third electrode 107).

The first TFT is turned to an ON state at $t=t_0$ by the scanning signal fed from the first scanning line 101, thus causing the voltage from the signal line 104 to be applied to the pixel electrode 106. The second TFT is, on the other hand, turned to an ON state at $t=t_1$ by the scanning signal fed from the second scanning line 102, thus causing the voltage from the signal line to be applied to the third electrode 107. The voltage at the common electrode 103 is constant. In such driving, a strong electric field is generated in the initial stage ($t_0<t<t_1$) within one frame period by a voltage difference $V_S-V_A$ produced between the third electrode 107 and the pixel electrode 106 (indicated by the arrow in the figure), in addition to a uniform horizontal electric field generated across the pixel electrode 106 and the common electrode 103. The liquid crystal molecules existing near the third electrode 107 are driven at high speed by this strong electric field, the remaining liquid crystal molecules existing between the common electrode 103 and the pixel electrode 106, in addition to being driven by the uniform horizontal electric field, are dragged by the first liquid crystal molecules that are driven by the strong electric field. This contributes to a higher response speed of a whole body of the liquid crystal molecules as compared with that of the conventional IPS system. In the latter stage ($t_1<t<t_2$) within one frame period thereafter, since the voltage $V_A$ at the third electrode 107 becomes substantially equal to the voltage $V_S$ at the pixel electrode 106, an electric field as strong as that in the initial stage is not generated, and the liquid crystal molecules are driven only by the uniform horizontal electric field generated across the pixel electrode 106 and the common electrode 103.

Evaluations were made in terms of response speed and image sticking using the liquid crystal display device obtained according to Embodiment 5 of the present invention. It was confirmed that, in the liquid crystal display device according to Embodiment 5 of the present invention, the response time was shortened as compared with that attained in the conventional IPS system, when the same liquid crystal material was used. Moreover, the liquid crystal display device according to Embodiment 5 of the present invention achieved an image-sticking strength of 2% or less.

As in Embodiment 2, a pixel structure having four divisions or more is also applicable to Embodiment 5.

Embodiment 6

Figure 21:
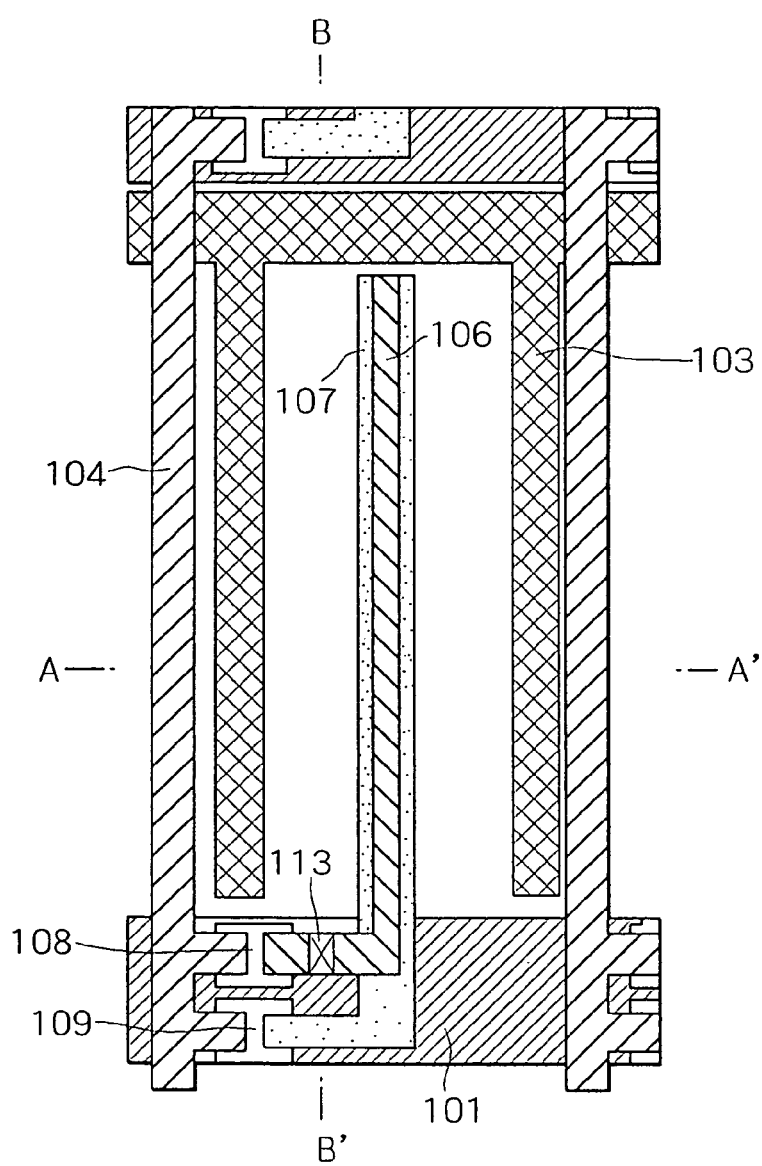
FIG. 21 is a cross-sectional view showing the electrode structure of a pixel portion in a liquid crystal display panel according to a sixth embodiment of the invention.
Figure 21B:
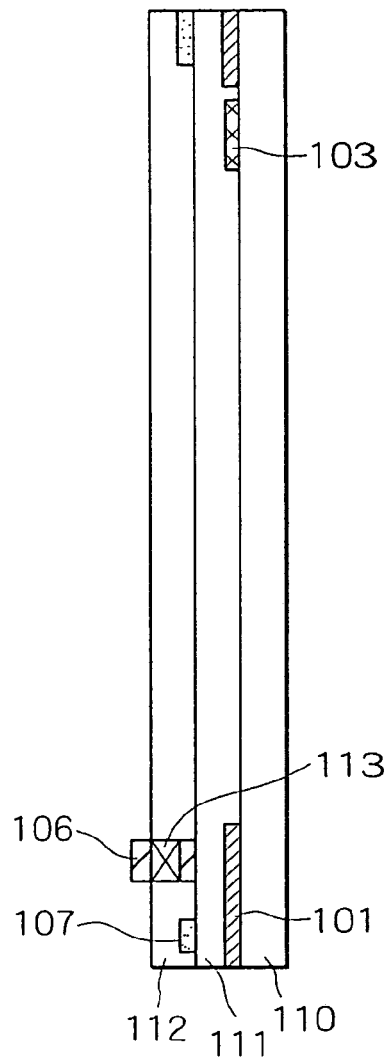
FIGS. 21A and 21B are sections taken along lines A–A' and B–B', respectively, in FIG. 21.
Figure 21A:
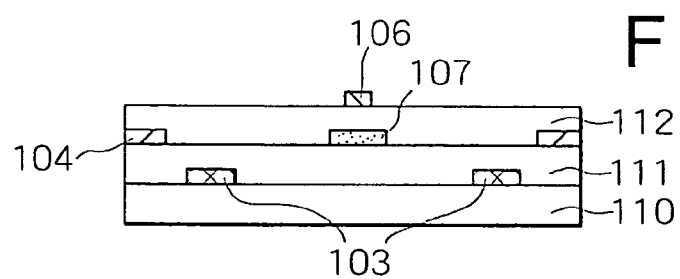
Figure 22:
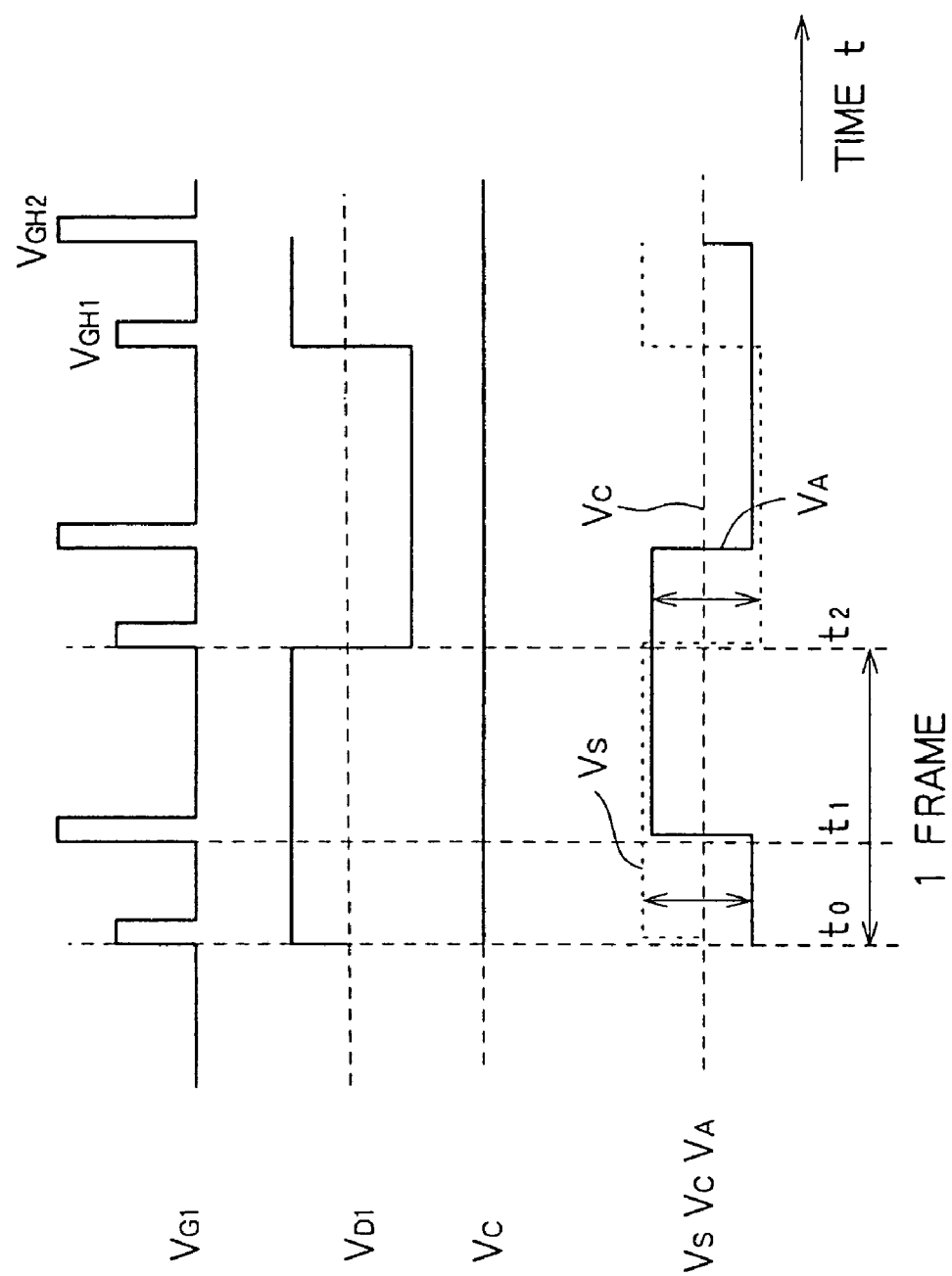
FIG. 22 is a diagram showing signal waveforms supplied to different electrodes in the liquid crystal display panel according to the sixth embodiment.
Figure 23:
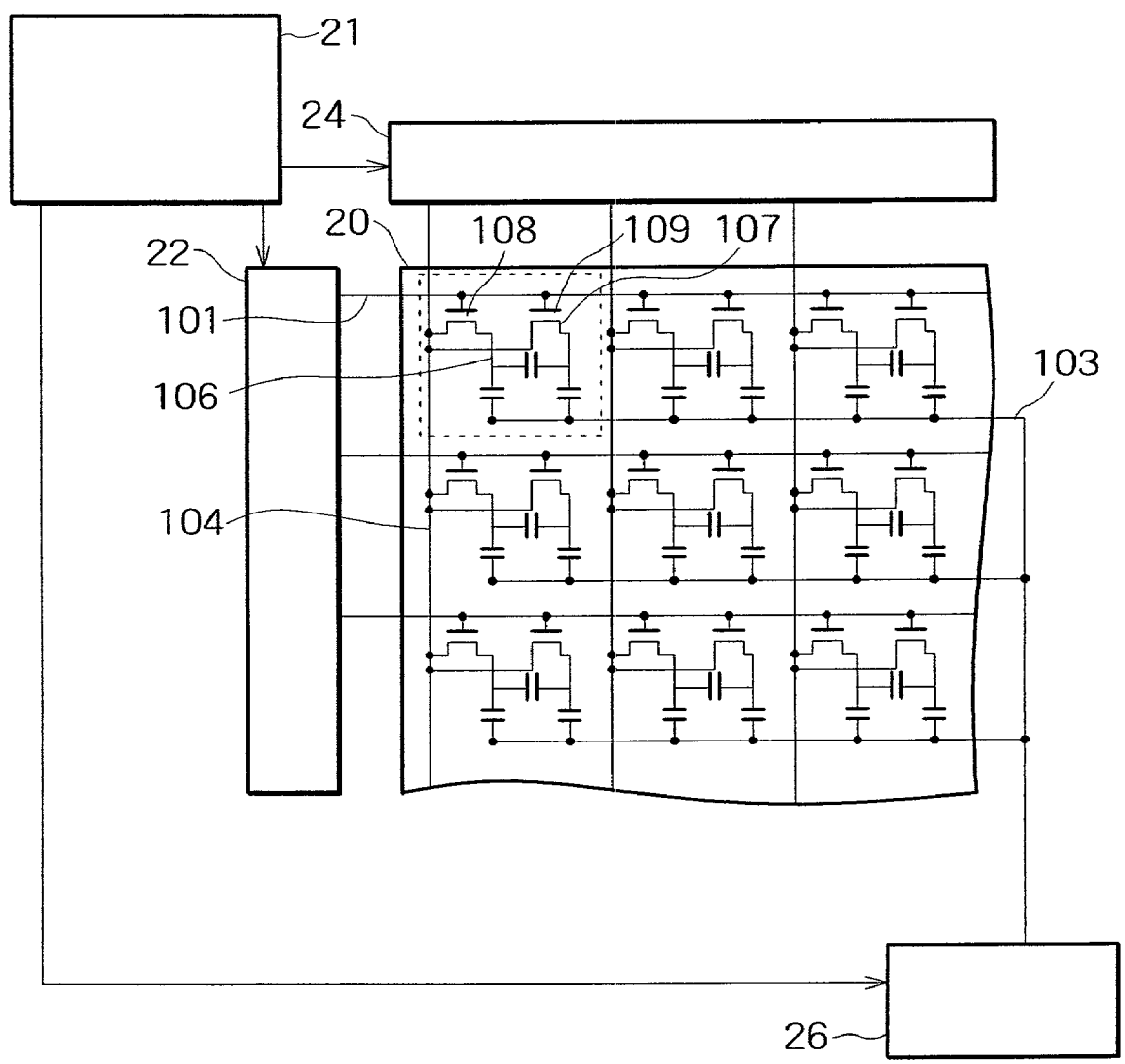
FIG. 23 is a diagram showing the overall structure in which the liquid crystal display panel is driven according to the sixth embodiment.

The arrangement of a sixth embodiment according to the present invention will be explained with reference to FIGS. 21, 22, and 23. FIG. 21 is a view showing the electrode structure of a pixel portion. FIG. 22 shows signal waveforms supplied to different electrodes and lines. FIG. 23 is a schematic diagram showing the overall structure of the liquid crystal display panel having these pixel structures.

The arrangement of the liquid crystal display panel according to Embodiment 6 differs from that of the liquid crystal display device according to Embodiment 5 in that two TFTs disposed within a single pixel are driven by a scanning signal fed from a single scanning line. The reduction in the number of scanning lines by one from the arrangement according to Embodiment 5 yields the effect that a second scanning line driver is no longer necessary. The arrangement is also advantageous in terms of the aperture ratio as compared with Embodiment 5.

As shown in FIG. 21, the electrode structure according to Embodiment 6 is provided with two TFTs, one scanning line, and one signal line in order to drive one pixel. That is, in each of the pixels that make up a display portion, two thin-film transistors (TFTs) are formed within one pixel, a pixel electrode 106 and a third electrode 107 are connected by way of a first TFT 108 and a second TFT 109, respectively, to a single first signal line 104, and the first TFT 108 and the second TFT 109 are scanned by a scanning signal from a single first scanning line 101. The pixel electrode 106 is formed on the top layer through a through-hole 113 and is superposed on the third electrode 107 by way of an insulating film 112.

Referring to FIG. 23, each of the lines is extended up to an end portion of the substrate; and, the first signal line 104, the first scanning line 101, and the common electrode 103 are connected, respectively, to a first signal electrode driving circuit 24, a first scanning electrode driving circuit 22, and a common electrode driving circuit 26. In addition, each of these driving circuits is controlled by a display control device 21. An equivalent circuit corresponding to the electrode structure in Embodiment 6 representing one pixel is shown in a display pixel portion 20 enclosed by broken lines in the drawing.

Application of signal waveforms as shown in FIG. 22 to the different lines and electrodes in a liquid crystal display device assembled in the foregoing processes allows the effects of the present invention to be obtained.

In FIG. 22, a signal waveform $V_{G1}$ is supplied to the first scanning line 101, a signal waveform $V_{D1}$ is supplied to the signal line 104, a signal waveform $V_C$ is applied to the common electrode 103, and a signal waveforms $V_S V_C V_A$ (for the pixel electrode $V_S$, the common electrode $V_C$, and for the third electrode $V_A$) are applied to each of the electrodes disposed within the pixel (the pixel electrode 106, the common electrode 103, and the third electrode 107). Particularly noteworthy about Embodiment 6 is the fact that the scanning signal is supplied so as to provide two selection periods within one frame period, and the two TFTs driven by these scanning signals have different threshold voltage characteristics from each other.

Referring to FIG. 22, scanning signals are supplied so as to scan twice within one frame period with respect to the signal waveform supplied to the signal line; and, at the same time, the second scanning voltage ($V_{GH2}$) is made greater than the first scanning voltage ($V_{GH1}$). The two TFTs disposed within a pixel have two different threshold voltages from each other, as noted earlier, the first TFT connected to the pixel electrode having a characteristic in that it turns to an ON state with a voltage of $V_{GH1}$ or more, and the second TFT connected to the third electrode having a characteristic in that it turns to an ON state only with a voltage of $V_{GH2}$ or more.

Figure 24:
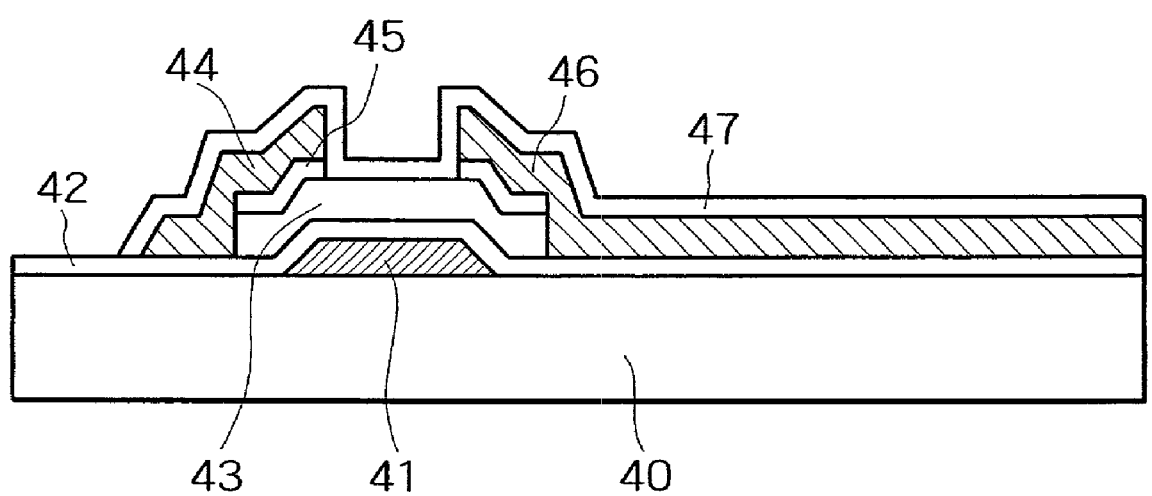
FIG. 24 is a cross-sectional view showing a TFT manufactured from amorphous silicon.

The threshold voltage of a TFT varies depending on the gate insulating film and the like that form part of the TFT. FIG. 24 is a cross-sectional view showing a reverse stagger type TFT fabricated from amorphous silicon. The switching characteristics of the TFT (threshold voltage and rise time) depend on the material used for the insulating film that forms part of the TFT, the film thickness, or the like. The threshold voltage, in particular, is greatly affected by the dielectric constant and the thickness of a gate insulating film 42 formed immediately on a scanning line 41 and the layer configuration. For example, SiN is used for the gate insulating film that forms part of the first TFT 108 and SiO2 is laminated to the SiN layer for the gate insulating film that forms part of the second TFT 109. In this arrangement, the second TFT 109 has a threshold voltage higher than that of the first TFT 108, making it possible to manufacture a TFT having different threshold characteristics that is suitable for Embodiment 6.

In such a configuration, the scanning voltage V GH1 is applied at a timing $t=t_0$ to turn only the first TFT 108 to an ON state, thus causing the signal voltage from the signal line 104 to be applied to the pixel electrode 106. Then, at a timing $t=t_1$, the scanning voltage $V_{GH2}$ is applied, which turns both the first TFT 108 and the second TFT 109 to an ON state at the same time, thus causing the signal voltage from the signal line 104 to be applied to the pixel electrode 106 and the third electrode 107. The voltage at the common electrode 103 remains constant.

In such driving, a strong electric field is generated in the initial stage ($t_0<t<t_1$) within one frame period by a voltage difference $V_S-V_A$ produced between the third electrode 107 and the pixel electrode 106 (indicated by the arrow in the figure), in addition to a uniform horizontal electric field generated across the pixel electrode 106 and the common electrode 103. The liquid crystal molecules existing near the third electrode 107 are driven at high speed by this strong electric field, while the remaining liquid crystal molecules existing between the common electrode 103 and the pixel electrode 106, in addition to being driven by the uniform horizontal electric field, are dragged by the first liquid crystal molecules that are driven by the strong electric field. This contributes to a higher response speed of a whole body of the liquid crystal molecules as compared with that of the conventional IPS system. In the middle stage ($t_1<t<t_2$) within one frame period thereafter, since the voltage at the third electrode 107 becomes substantially equal to the voltage at the pixel electrode 106, an electric field as strong as that in the initial stage is not generated, and the liquid crystal molecules are driven only by the uniform horizontal electric field generated across the pixel electrode and the common electrode.

Evaluations were made in terms of response speed and image sticking using the liquid crystal display device obtained according to Embodiment 6 of the present invention. It was confirmed that, in the liquid crystal display device according to Embodiment 6 of the present invention, the response time was shortened as compared with that attained in the conventional IPS system when the same liquid crystal material was used. Moreover, the liquid crystal display device according to Embodiment 6 of the present invention achieved an image-sticking strength of 2% or less.

As in Embodiments 2 and 5, a pixel structure having four divisions or more is also applicable to Embodiment 6.

Possible methods of manufacturing TFTs with different threshold voltages include, for example, changing the thickness of the gate insulating film and having multi-layered gate insulating films with the combination of materials used for different layers being changed for different TFTs (for example, changing the dielectric constant).

Embodiment 7

Figure 25:
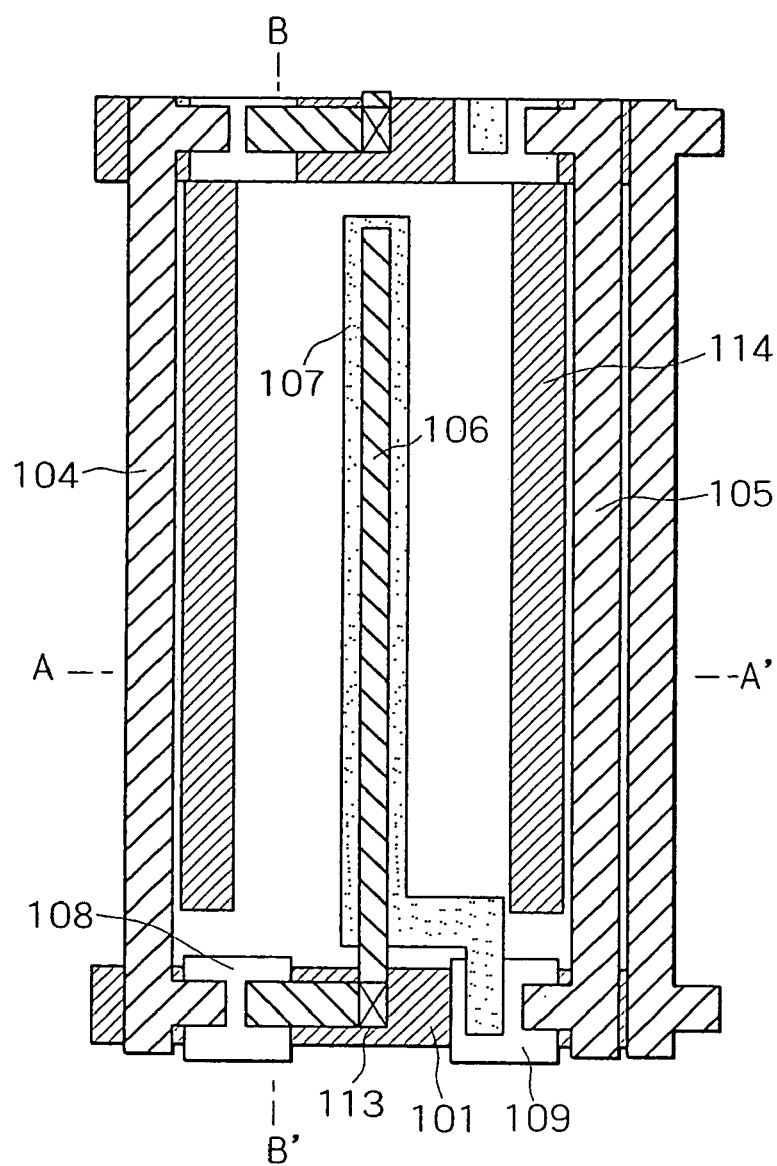
FIG. 25 is a cross-sectional view showing the electrode structure of a pixel portion in a liquid crystal display panel according to a seventh embodiment of the invention.
Figure 25B:
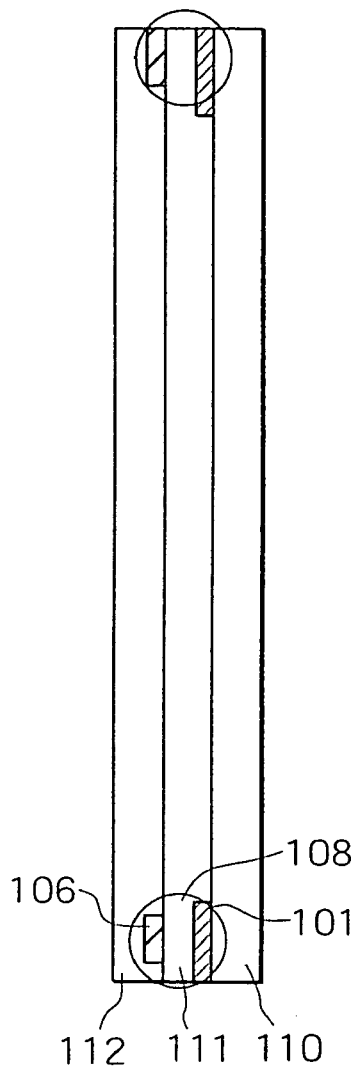
FIGS. 25A and 25B are sections taken along lines A–A' and B–B', respectively, in FIG. 25.
Figure 25A:
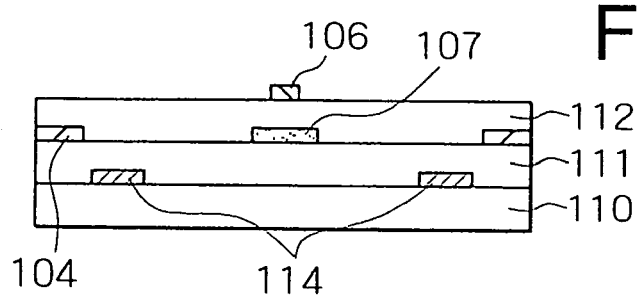
Figure 26:
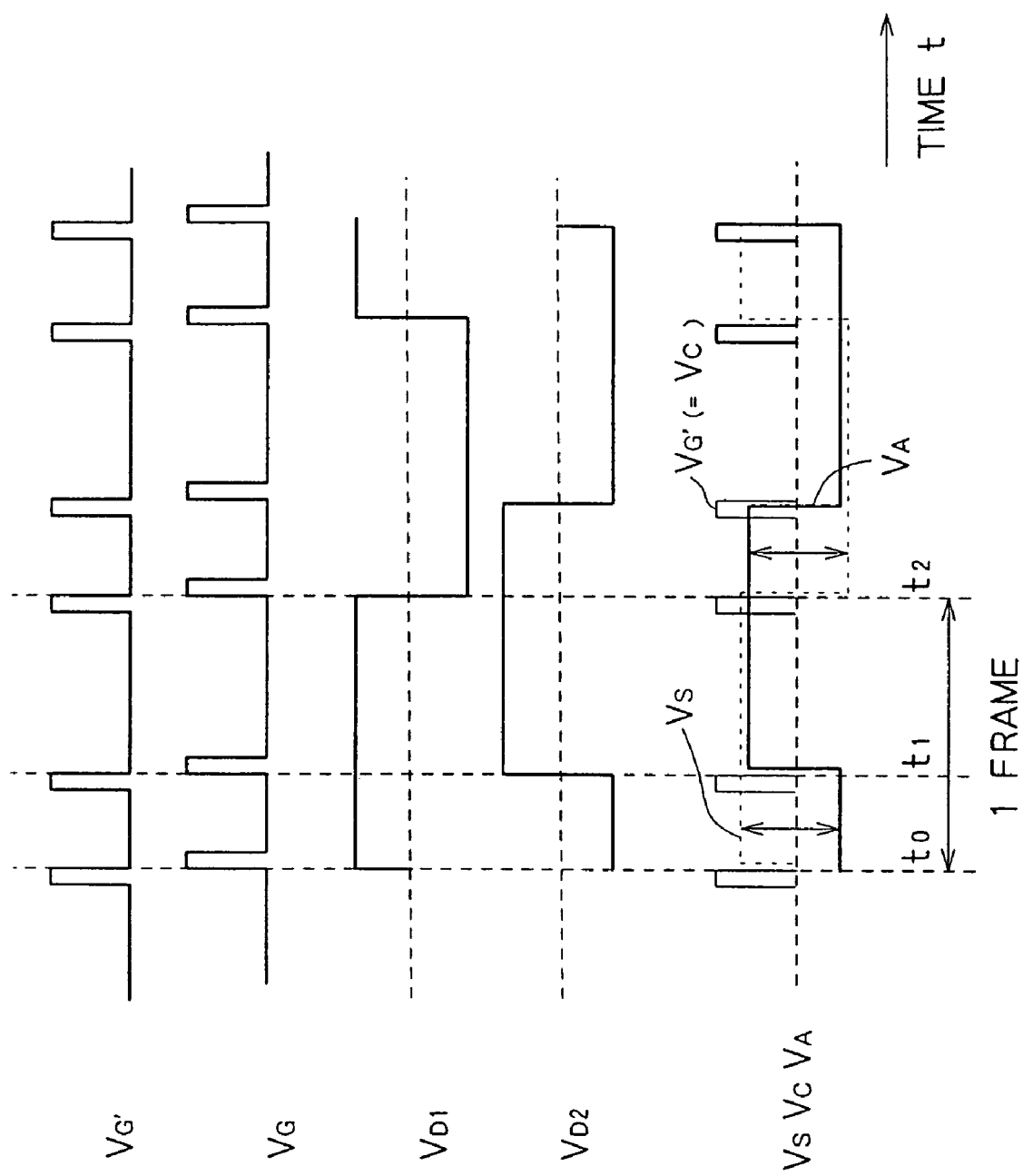
FIG. 26 is a diagram showing signal waveforms supplied to different electrodes in the liquid crystal display panel according to the seventh embodiment.

The arrangement of a seventh embodiment according to the present invention will be explained with reference to FIGS. 25 and 26. FIG. 25 is a view showing the electrode structure of a pixel portion. FIG. 26 shows the signal waveforms supplied to different electrodes and lines.

The arrangement of the liquid crystal display panel according to Embodiment 7 differs from that of the liquid crystal display device according to Embodiment 4 in that a scanning line for driving another pixel adjacent in a longitudinal direction to the current pixel is used as a substitute for a common electrode within the current pixel.

The future requirement for a liquid crystal display device is a high aperture ratio to meet the need for lower power consumption. Increasing the aperture ratio allows the utilization ratio of the backlight to be enhanced, which results in the power consumption being lowered. In an ordinary IPS liquid crystal display device, there are only two types of electrodes disposed within a pixel for driving liquid crystal molecules, namely the pixel electrode and the common electrode. In Embodiment 7, on the contrary, a third electrode is disposed in addition to these electrodes, which is a major source of concern over a possible reduction in the aperture ratio. To deal with this situation, it is necessary to take such measures as using a transparent conductive film, such as ITO, as the material for the electrodes and employing a special electrode structure. In Embodiment 7, accordingly, the common electrode is connected to the scanning line for driving another pixel adjacent in the longitudinal direction to the current pixel, which eliminates the need for separately providing a common electrode disposed within the current pixel as in Embodiment 4, providing a possibility of an increased aperture ratio.

FIG. 26 shows the signal waveforms supplied to different electrodes and lines in Embodiment 7. The same description applies as that for Embodiment 4, except that the signal from the scanning line for the adjacent pixel is used for the common electrode.

Evaluations were made in terms of response speed and image sticking using the liquid crystal display device obtained according to Embodiment 7 of the present invention. It was confirmed that, in the liquid crystal display device according to Embodiment 7 of the present invention, the response time was shortened as compared with that of the conventional IPS system, when the same liquid crystal material was used. Moreover, the liquid crystal display device according to Embodiment 7 of the present invention achieved an image-sticking strength of 2% or less.

As in Embodiments 1, 3, and 4, a pixel structure having four divisions or more is also applicable to Embodiment 7.

Embodiment 8

Figure 27:
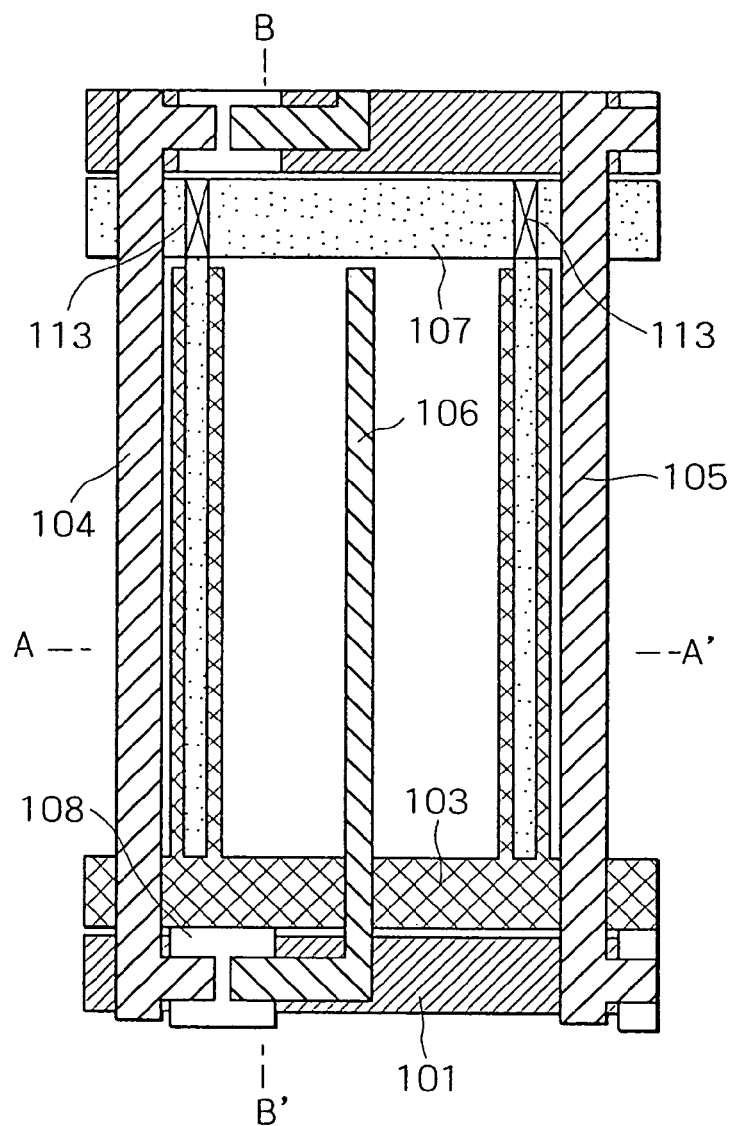
FIG. 27 is a cross-sectional view showing the electrode structure of a pixel portion in a liquid crystal display panel according to an eighth embodiment of the invention.
Figure 27B:
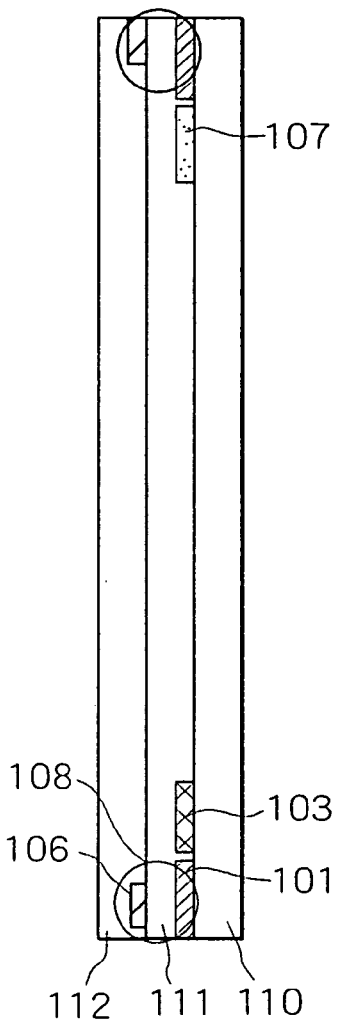
FIGS. 27A and 27B are sections taken along lines A–A' and B–B', respectively, in FIG. 27.
Figure 27A:
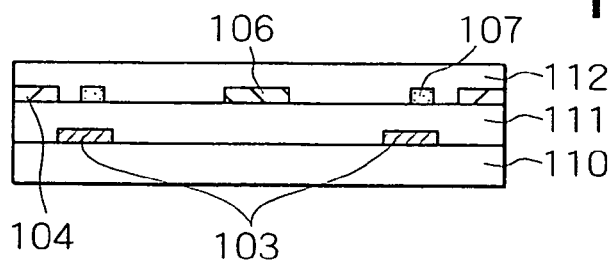
Figure 28:
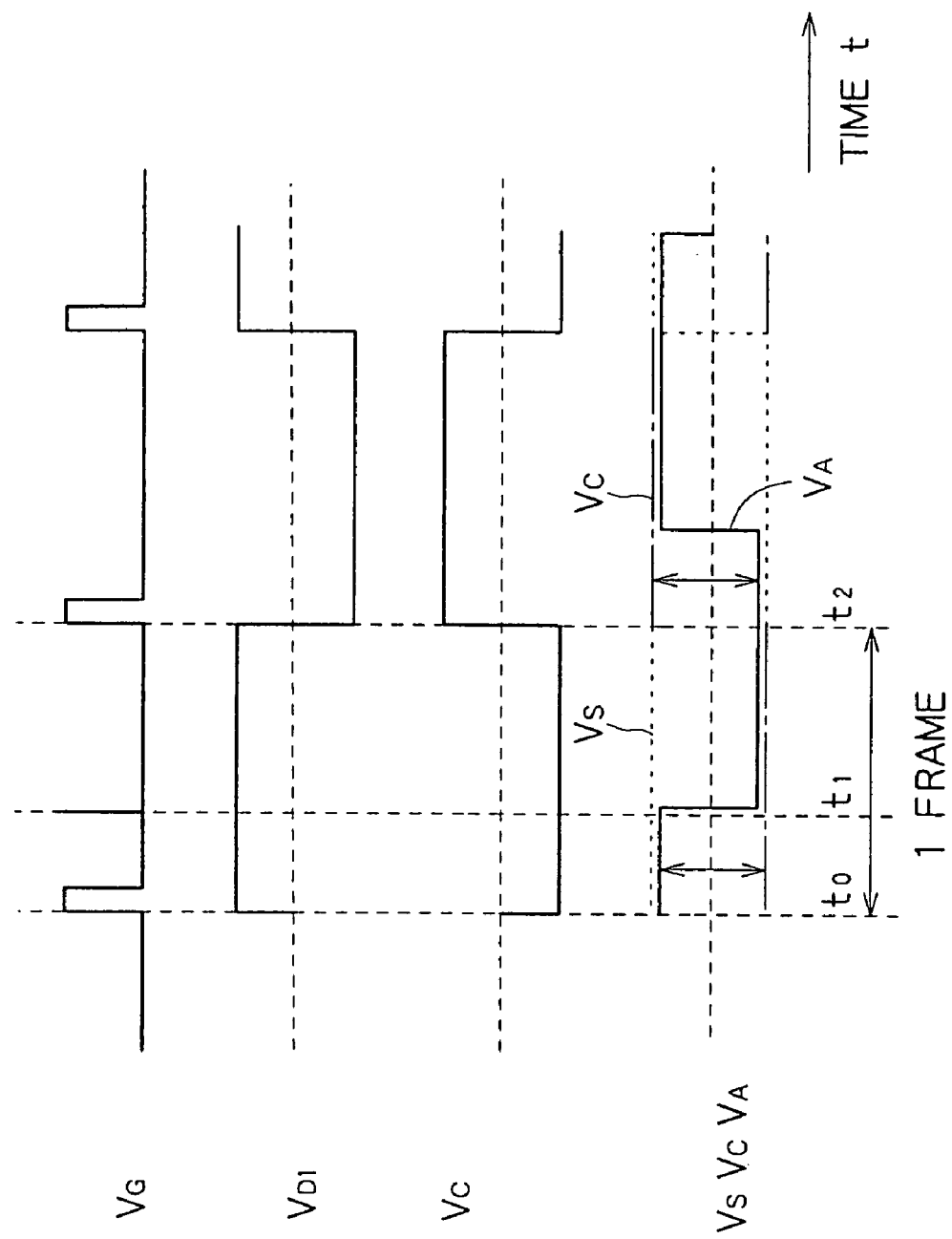
FIG. 28 is a diagram showing signal waveforms supplied to different electrodes in the liquid crystal display panel according to the eighth embodiment.
Figure 29:
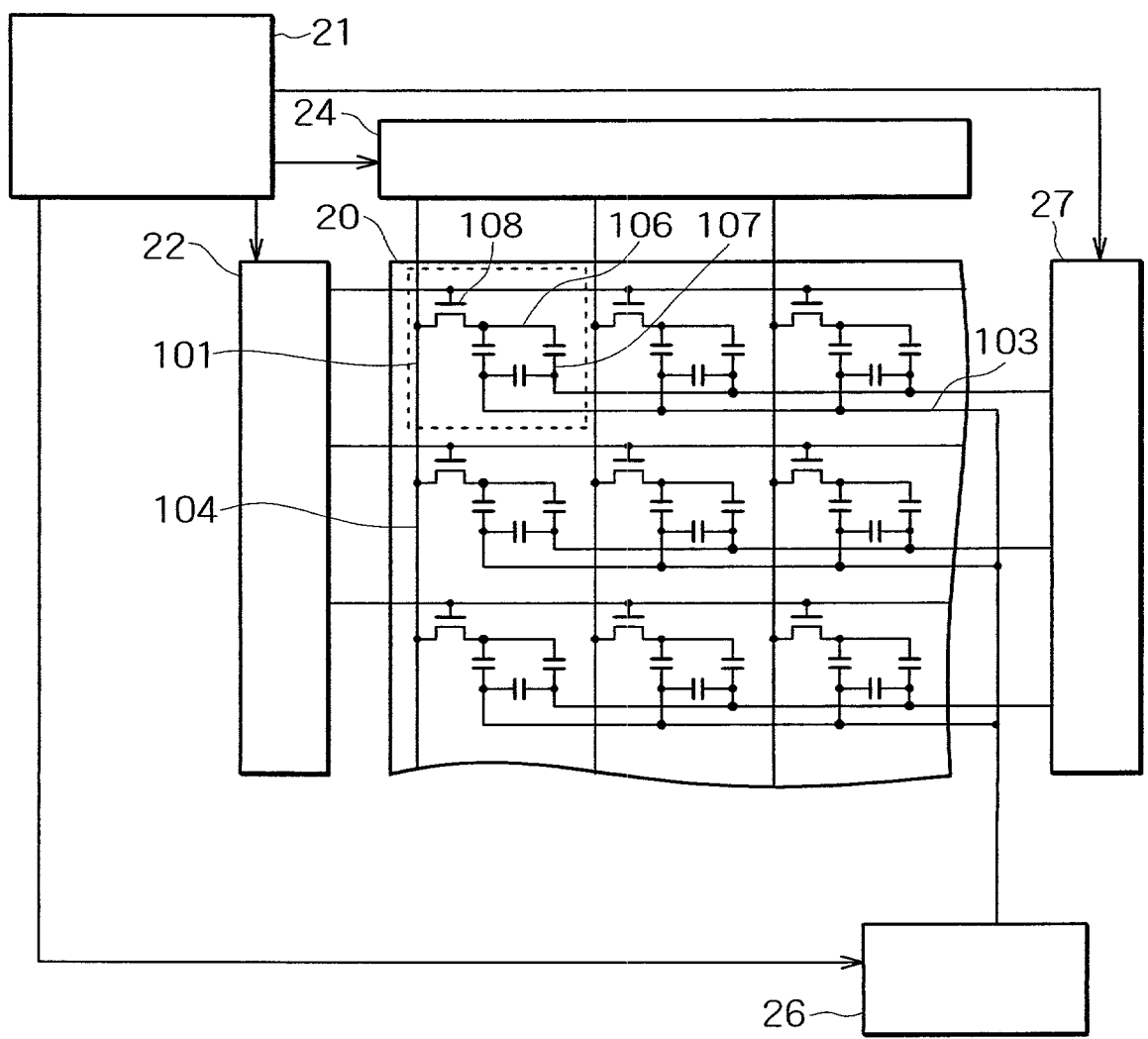
FIG. 29 is a diagram showing the overall structure in which the liquid crystal display panel is driven according to the eighth embodiment.
Figure 32:
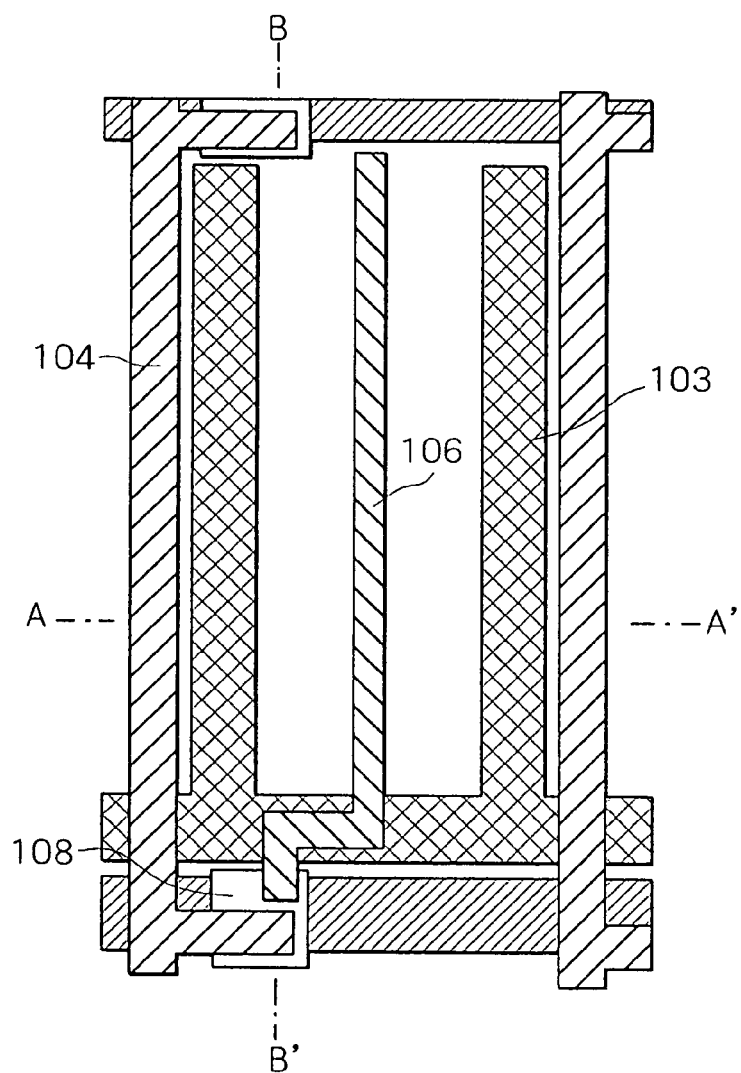
FIG. 32 is a cross-sectional view showing the electrode structure of a pixel portion according to the conventional IPS system.
Figure 32B:
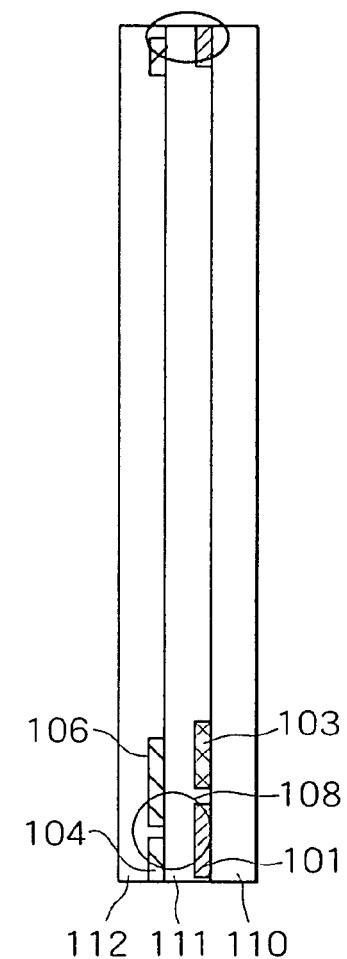
FIGS. 32A and 32B are sections taken along lines A–A' and B–B', respectively, in FIG. 32.
Figure 32A:
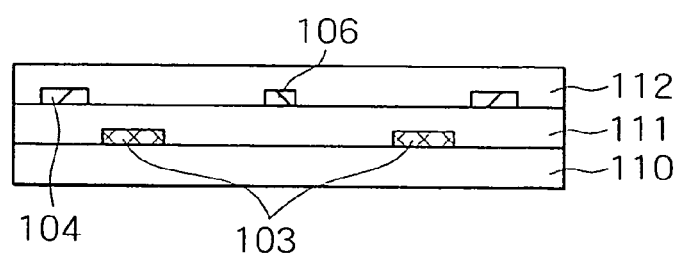
Figure 33:
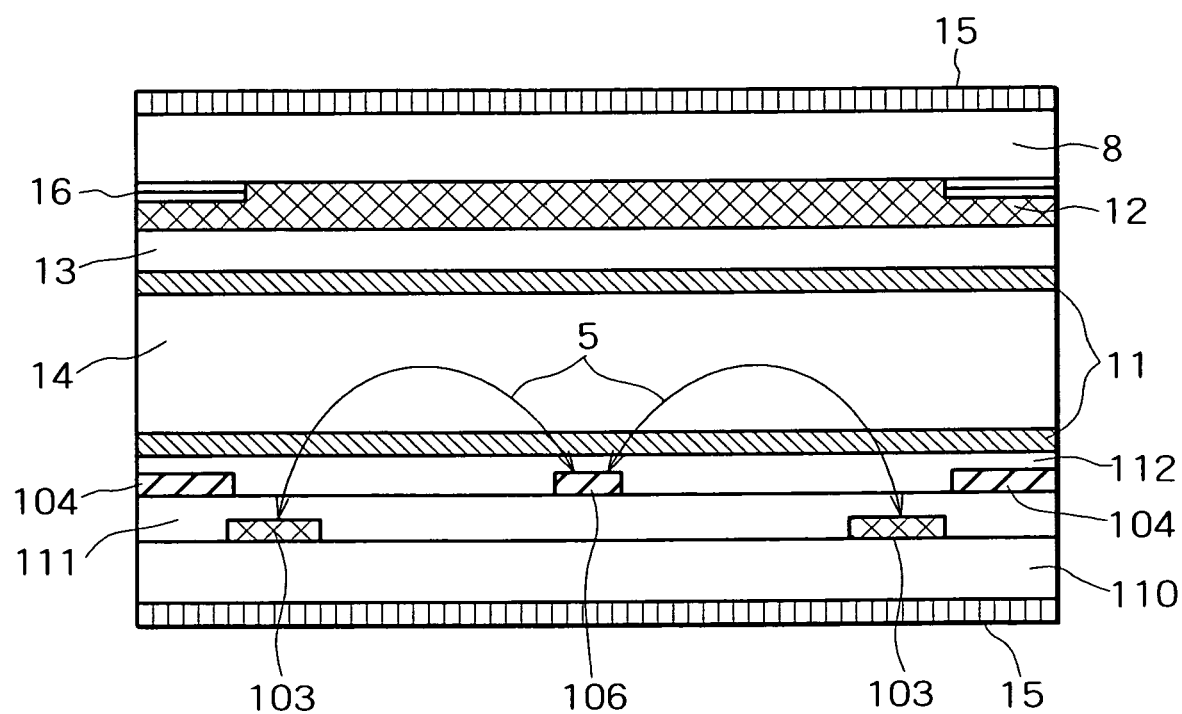
FIG. 33 is a cross-sectional view showing a pixel portion according to the conventional IPS system.
Figure 34:
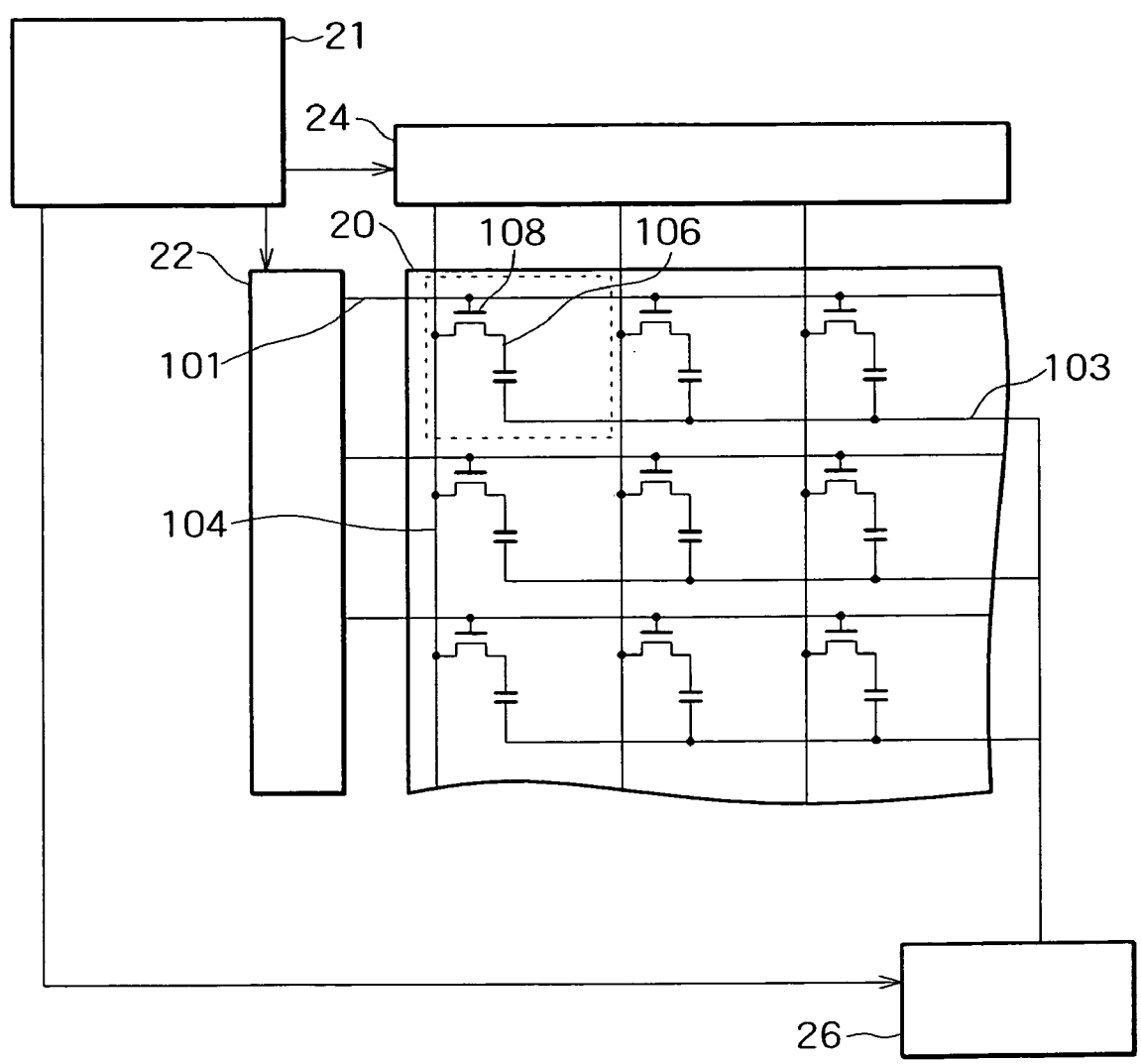
FIG. 34 is a diagram of the overall system for driving the liquid crystal display device according to the conventional IPS system.

The arrangement of an eighth embodiment according to the present invention will be explained with reference to FIGS. 27, 28, and 29. FIG. 27 is a view showing the electrode structure of a pixel portion. FIG. 28 shows the signal waveforms supplied to different electrodes and lines. FIG. 29 is a schematic diagram showing the overall structure of the liquid crystal display panel having these pixel structures.

According to Embodiment 8, a pixel electrode is connected via the only TFT disposed within a pixel to a signal line, and the TFT is controlled by a signal fed from a scanning line 101. A dedicated driving circuit is directly connected to each of a common electrode 103 and a third electrode 107, and the third electrode 107 is disposed so as to superpose the common electrode 103 thereon through a through-hole 113.

FIG. 28 shows the signal waveforms supplied to different electrodes and lines in Embodiment 8. In such driving, a strong electric field is generated in the initial stage ($t_0 < t < t_1$) within one frame period by a voltage difference $V_A - V_C$ produced between the third electrode 107 and the common electrode 103 (indicated by the arrow in the figure), in addition to a uniform horizontal electric field generated across the pixel electrode 106 and the common electrode 103. The liquid crystal molecules existing near the third electrode 107 are driven at high speed by this strong electric field, while the remaining liquid crystal molecules existing between the common electrode 103 and the pixel electrode 106, in addition to being driven by the uniform horizontal electric field, are dragged by the first liquid crystal molecules that are driven by the strong electric field. This contributes to a higher response speed of a whole body of the liquid crystal molecules as compared with that of the conventional IPS system. In the latter stage ($t_1 < t < t_2$) within one frame period thereafter, since the voltage $V_A$ at the third electrode 107 becomes substantially equal to the voltage $V_C$ at the common electrode 103, an electric field as strong as that in the initial stage is not generated, and the liquid crystal molecules are driven only by the uniform horizontal electric field generated across the pixel electrode 106 and the common electrode 103. In this manner, a second electrode is connected to a common line, while the third electrode is connected to a line to which a predetermined voltage can be applied.

Referring further to FIG. 29, the liquid crystal display panel according to Embodiment 8 is provided with a scanning line disposed so as to intersect a signal line 104 and which is connected to an active component 108, and the liquid crystal display panel is formed with a display area by disposing a plurality of pixels, each pixel 20 being formed to correspond to an area enclosed by the signal line and the scanning line. In addition, outside the display area, there are a signal driving circuit 24 connected to the signal lines, a scanning driving circuit 22 connected to the scanning lines, a common electrode driving circuit 26 connected to the common line, and a third electrode driving circuit 27 connected to lines to which a predetermined voltage can be applied. The liquid crystal display panel is further provided with a display control circuit 21 connected to the signal driving circuit 24, the scanning driving circuit 22, the common electrode driving circuit 26, and the third electrode driving circuit 27.

Evaluations were made in terms of response speed and image sticking using the liquid crystal display device obtained according to Embodiment 8 of the present invention. It was confirmed that, in the liquid crystal display device according to Embodiment 8 of the present invention, the response time was shortened as compared with that of the conventional IPS system when the same liquid crystal material was used. Moreover, the liquid crystal display device according to Embodiment 8 of the present invention achieved an image-sticking strength of 2% or less.

As in other Embodiments, a pixel structure having four divisions or more is also applicable to Embodiment 8.

Embodiment 9

The arrangement of a ninth embodiment according to the present invention will be explained with reference to FIG. 30. FIG. 30 is a view showing the electrode structure of a pixel portion.

The arrangement of the liquid crystal display panel according to Embodiment 9 differs from that of the liquid crystal display device according to Embodiment 6 in that a common electrode within a pixel is disposed on a side closer to a liquid crystal layer than other electrodes and lines, being superposed on a signal line by way of an insulating film. Since the common electrode and the signal line are superposed on each other, a capacitor is formed across these electrodes. The greater the capacitor, the greater the load imposed on driving. To minimize the capacity as much as feasible, an insulating film is formed with a small capacity, such as an organic film (a low-capacity organic insulating film 115).

As described in the explanation for Embodiment 7, there will be a growing demand for an increased aperture ratio for liquid crystal display devices in the future; and, in Embodiment 9, the aperture ratio is increased by superposing the common electrode. This represents one of the means for suppressing a reduction in the aperture ratio as a result of a third electrode being formed. Moreover, as the common electrode is superposed, as explained in the foregoing description, there is no voltage applied to that part of the liquid crystal corresponding to the area of superposition, thus eliminating transmission of light occurring as a result of rotation of the liquid crystal molecules. According to this electrode structure, therefore, a black matrix formed in a direction in which the signal line is extended is no longer required in a light blocking black matrix formed on the opposing substrate, and the combination with such an opposing substrate even further improves the aperture ratio.

Application of the same signal waveforms as those of Embodiment 6 to the different lines and electrodes in a liquid crystal display device assembled in the foregoing processes allows the effects of the present invention to be obtained.

Evaluations were made in terms of response speed and image sticking using the liquid crystal display device obtained according to Embodiment 9 of the present invention. It was confirmed that, in the liquid crystal display device according to Embodiment 9 of the present invention, the response time was shortened as compared with the conventional IPS. Moreover, the liquid crystal display device according to Embodiment 9 of the present invention achieved an image-sticking strength of 2% or less.

As in Embodiments 2, 5, and 6, a pixel structure having four divisions or more is also applicable to Embodiment 9.

Embodiment 10

The arrangement of a tenth embodiment according to the present invention will be explained with reference to FIG. 31. FIG. 31 is a view showing the electrode structure of a pixel portion. The arrangement according to Embodiment 9 is shown here, in which the common electrode is also superposed on a scanning line. In such an arrangement, the superposition of the common electrode allows the aperture ratio to be even further increased; and, as described in the explanation of Embodiment 9, no voltage is applied to the liquid crystal at the superposed portion, which means that no light is transmitted as a result of liquid crystal molecules being driven, thus eliminating the need for a light blocking black matrix formed on the opposing substrate in directions in which the scanning line and the signal line are extended. Accordingly, the aperture ratio can be even further improved in combination with an opposing substrate on which the black matrix is not formed in the signal line direction and the scanning line direction.

Embodiment 11

The arrangement of an eleventh embodiment according to the present invention will be explained. The arrangement according to Embodiment 11 differs from that according to Embodiment 1 in the liquid crystal material being used. Embodiment 11 employs a fluorinated liquid crystal having fluorine atoms in a molecular structure thereof. As compared with the cyano-based liquid crystal, the fluorinated liquid crystal has a smaller dielectric anisotropy and a lower viscosity.

Since a strong electric field is temporarily generated at end portions of the first electrode and the third electrode to drive the liquid crystal according to the present invention, it is easier to employ a liquid crystal material having a lower dielectric constant as compared with the conventional IPS system. Generally speaking, a liquid crystal material has a low viscosity when it has a small dielectric anisotropy. Accordingly, it can be expected that such a material exhibits a high-speed response when an electric field with an identical strength is applied. Since the fluorinated liquid crystal has a smaller dielectric anisotropy and a lower viscosity than the cyano-based liquid crystal, as described earlier, a higher response speed can be expected from the use of the fluorinated liquid crystal. Moreover, since such a fluorinated liquid crystal has a low dielectric constant, there is little chance that ionic impurities will be trapped or that the display performance will be degraded as a result of a drop in the retention ratio caused by such impurities being trapped.

According to the present invention, it is therefore possible to use a liquid crystal with a low dielectric constant. A liquid crystal having a low dielectric constant generally has a low viscosity, making it right for applications in environments requiring a high-speed response. In addition, a material having a low dielectric constant can not easily trap impurity ions therein, and so it is considered that there is no chance of uneven display caused by ions or the like.

Embodiment 12

The arrangement of a twelfth embodiment according to the present invention will be explained. The arrangement according to Embodiment 12 differs from that according to Embodiment 5 in the alignment process being employed. While Embodiment 5 uses a rubbing method, Embodiment 12 employs an alignment process through optical alignment.

In particular, since a third electrode and a common electrode are superposed on each other, a large step difference is produced at an electrode end portion. During a rubbing process, in which the surface of the alignment film is rubbed with a cloth, such an electrode step difference results in an initial alignment direction of liquid crystal molecules being deviated as a result of fillings of a rubbing cloth not being rubbed in a required direction on the electrode end portion. This serves as a cause for light leakage or the like, resulting in a reduced contrast or other display failures. In a technique that employs an optical alignment film for controlling the initial alignment direction of liquid crystal molecules through illumination of light, however, it can be expected that an alignment failure will not occur in such a stepped portion, thus suppressing a reduced contrast or otherwise degraded display quality.

According to each of these preferred embodiments of the present invention, it is possible to obtain a high quality liquid crystal display panel and a liquid crystal display device that realizes a high response speed and suppresses the image-sticking phenomenon.

It is possible to provide a liquid crystal display panel and a liquid crystal display device that are right for high-speed response according to the present invention.

What is claimed is:

1. A liquid crystal display panel comprising:
   a pair of substrates;
   a liquid crystal layer disposed between said pair of substrates;
   a plurality of signal lines formed on one of said pair of substrates;

a plurality of scanning lines formed on one of said pair of substrates to so as to extend in a direction which intersect said plurality of signal lines;

a pixel formed in an area delimited by adjacent signal lines and adjacent scanning lines; and a first electrode, a second electrode, and a third electrode extending in a predetermined direction provided in said pixel, wherein control is provided to produce a display by controlling alignment direction of liquid crystal molecules of said liquid crystal layer in accordance with change of an electric field occurring between at least two of said first, second and third electrodes based upon changing at least a voltage applied to said first electrode, said second electrode, or said third electrode at an initial stage and a middle stage within one frame period.

2. A liquid crystal display panel according to claim 1, wherein, with a voltage difference existing between each pair of said first electrode, second electrode, and third electrode, a relationship between at least two voltage differences differs between the initial stage and the middle stage within one frame period.

3. A liquid crystal display panel according to claim 2, wherein said third electrode is disposed at a position closer to said first electrode between said first electrode and said second electrode.

4. A liquid crystal display panel according to claim 1, wherein said first electrode and said third electrode are disposed on layers different from each other by way of an insulating film.

5. A liquid crystal display panel according to claim 4, wherein said first electrode and said third electrode are disposed so that at least parts thereof are superposed each other by way of said insulating film.

6. A liquid crystal display panel according to claim 4, wherein either said first electrode or said third electrode, whichever is disposed on a lower layer with respect to the other one, is composed of a transparent conductive film.

7. A liquid crystal display panel according to claim 1, wherein switching from said initial stage to said middle stage within one frame period is done within a period of time half one frame period.

8. A liquid crystal display panel according to claim 1, wherein, assuming that a voltage difference between said first electrode and said third electrode is $\Delta V_1$, spacing between said first electrode and said third electrode is $d_L$, a voltage difference between said second electrode and said third electrode is $\Delta V_2$, and spacing between said second electrode and said third electrode is $d_H$, the panel is driven so that (Equation 1) is satisfied in the initial stage within one frame period and (Equation 2) is satisfied in the middle stage within one frame period $$\Delta V_2/d_H < \Delta V_1/d_L \quad \text{(Equation 1)}$$

$$\Delta V_2/d_H > \Delta V_1/d_L \quad \text{(Equation 2)}.$$

9. A liquid crystal display panel according to claim 8, wherein the panel is driven so that said voltage difference $\Delta V1$, said distance $d_L$, said voltage difference $\Delta V2$, and said distance $d_H$ satisfy (Equation 1) in the initial stage within one frame period and, within a period of time half one frame period, satisfy (Equation 2).

10. A liquid crystal display panel comprising:

a pair of substrates;

a liquid crystal layer disposed between said pair of substrates; and a first electrode, a second electrode, and a third electrode extending in a predetermined direction provided on one of said pair of substrates, wherein control is provided to produce a display by changing at least a voltage applied to said first electrode, said second electrode, or said third electrode at an initial stage and a middle stage within one frame period; and wherein either said first electrode or said second electrode is connected by way of a first active component to a first signal line;

either said first electrode or said second electrode, whichever is not connected to said first active component, is connected to a common line; and said third electrode is connected by way of a second active component to a second signal line.

11. A liquid crystal display panel according to claim 10, further comprising:

a first scanning line disposed so as to intersect said first signal line and connected to said first active component; and a second scanning line disposed so as to intersect said second signal line and connected to said second active component, wherein a pixel is formed to correspond to an area enclosed by said first signal line, said first scanning line, said second signal line, and said second scanning line and a display area is formed by disposing a plurality of said pixels.

12. A liquid crystal display panel according to claim 11 further comprising; outside said display area, a first signal driving circuit connected to said first signal line;

a second signal driving circuit connected to said second signal line;

a first scanning driving circuit connected to said first scanning line;

a second scanning driving circuit connected to said second scanning line; and a common line driving circuit connected to said common line.

13. A liquid crystal display panel according to claim 12 further comprising: outside said display area, a display control circuit connected to said first signal driving circuit, said second signal driving circuit, said first scanning driving circuit, said second scanning driving circuit, and said common line driving circuit.

14. A liquid crystal display panel according to claim 10 further comprising:

scanning lines disposed so as to intersect said first signal line and said second signal line, and connected to said first active component and said second active component, wherein a pixel is formed to correspond to an area enclosed by said first signal line, said scanning lines, and said second signal line, and a display area is formed by disposing a plurality of said pixels.

15. A liquid crystal display panel according to claim 14, wherein each of the scanning lines corresponding to said pixel is scanned twice within one frame period.

16. A liquid crystal display panel according to claim 15 further comprising: outside said display area, a first signal driving circuit connected to said first signal line;

a second signal driving circuit connected to said second signal line;

a scanning driving circuit connected to said scanning lines; and a common line driving circuit connected to said common line.

17. A liquid crystal display panel according to claim 16, further comprising, outside said display area, a display control circuit connected to said first signal driving circuit, said second signal driving circuit, said scanning driving circuit, and said common line driving circuit.

18. A liquid crystal display panel comprising:
a pair of substrates;
a liquid crystal layer disposed between said pair of substrates; and
a first electrode, a second electrode, and a third electrode extending in a predetermined direction provided on one of said pair of substrates,
wherein control is provided to produce a display by changing at least a voltage applied to said first electrode, said second electrode, or said third electrode at an initial stage and a middle stage within one frame period; and wherein either said first electrode or said second electrode is connected by way of a first active component, and said third electrode is connected by way of a second active component, to a signal line; and
either said first electrode or said second electrode, whichever is not connected to said first active component, is connected to a common line.

19. A liquid crystal display panel according to claim 18 further comprising:
a scanning line disposed so as to intersect said signal line and connected to said first active component and said second active component,
wherein a pixel is formed to correspond to an area enclosed by said signal line and said scanning line, and a display area is formed by disposing a plurality of said pixels.

20. A liquid crystal display panel according to claim 19, wherein each of the scanning lines corresponding to said pixel is scanned twice within one frame period.

21. A liquid crystal display panel according to claim 20, wherein said two scanning sequences are carried out with two different scanning voltage values.

22. A liquid crystal display panel according to claim 20, wherein said first active component and said second active component have threshold characteristics different from each other.

23. A liquid crystal display panel according to claim 19 further comprising:
outside said display area;
a signal driving circuit connected to said signal line;
a scanning driving circuit connected to said scanning line; and
a common line driving circuit connected to said common line.

24. A liquid crystal display panel according to claim 23, further comprising, outside said display area, a display control circuit connected to said signal driving circuit and said scanning driving circuit.

25. A liquid crystal display panel according to claim 18, further comprising:
a first scanning line disposed so as to intersect said signal line and connected to said first active component; and
a second scanning line disposed so as to intersect said signal line and connected to said second active component,
wherein a pixel is formed to correspond to an area enclosed by said signal line, said first scanning line, and said second scanning line and a display area is formed by disposing a plurality of said pixels.

26. A liquid crystal display panel according to claim 25 further comprising: outside said display area,
a signal driving circuit connected to said signal line;
a first scanning driving circuit connected to said first scanning line;
a second scanning driving circuit connected to said second scanning line; and
a common line driving circuit connected to said common line.

27. A liquid crystal display panel according to claim 26 further comprising, outside said display area, a display control circuit connected to said signal driving circuit, said first scanning driving circuit, said second scanning driving circuit, and said common line driving circuit.

28. A liquid crystal display panel comprising:
a pair of substrates;
a liquid crystal layer disposed between said pair of substrates; and
a first electrode, a second electrode, and a third electrode extending in a predetermined direction provided on one of said pair of substrates,
wherein control is provided to produce a display by changing at least a voltage applied to said first electrode, said second electrode, or said third electrode at an initial stage and a middle stage within one frame period; and
wherein either said first electrode or said second electrode is connected by way of a first active component to a first signal line;
said third electrode is connected by way of a second active component to a second signal line;
a scanning line is provided that intersects said first signal line and said second signal line to be connected to said first active component and said second active component;
a pixel is formed to correspond to an area enclosed by said first signal line, said scanning line, and said second signal line and a display area is formed by disposing a plurality of said pixels; and
either said first electrode or said second electrode, whichever is not connected to said first active component, is connected to a scanning line adjacent to the scanning line to which said first active component and said second active component are connected.

29. A liquid crystal display panel according to claim 28, wherein each of the scanning lines corresponding to said pixel is scanned twice within one frame period.

30. A liquid crystal display panel according to claim 29 further comprising: outside said display area,
a first signal driving circuit connected to said first signal line;
a second signal driving circuit connected to said second signal line; and
a scanning driving circuit connected to said scanning lines and a common line.

31. A liquid crystal display panel according to claim 30 further comprising, outside said display area, a display control circuit connected to said first signal driving circuit, said second signal driving circuit, and said scanning driving circuit.

32. A liquid crystal display panel comprising:
a pair of substrates;
a liquid crystal layer disposed between said pair of substrates;

a plurality of signal lines formed on one of said pair of substrates;

a plurality of scanning lines formed on one of said pair of substrates to so as to extend in a direction which intersect said plurality of signal lines;

a pixel formed in an area delimited by adjacent signal lines and adjacent scanning lines; and a first electrode, a second electrode, and a third electrode extending in a predetermined direction provided in said pixel;

wherein control is provided to produce a display by controlling alignment direction of liquid crystal molecules of said liquid crystal layer in accordance with change of an electric field occurring between at least two of said first, second and third electrodes based upon changing at least a voltage applied to said first electrode, said second electrode, or said third electrode at an initial stage and a middle stage within one frame period; and wherein either said first electrode or said second electrode is connected by way of an active component to one of said signal lines;

either said first electrode or said second electrode, whichever is not connected to said active component, is connected to a common line; and said third electrode is connected to a line, to which a predetermined voltage can be applied.

33. A liquid crystal display panel according to claim 32 further comprising one of said scanning lines connected to said active component, wherein a display area is formed by disposing a plurality of said pixels.

34. A liquid crystal display panel according to claim 33, further comprising: outside said display area, a signal driving circuit connected to at least one of said signal lines;

a scanning driving circuit connected to at least one of said scanning lines;

a common line driving circuit connected to said common line; and a third electrode driving circuit connected to a line, to which a predetermined voltage can be applied.

35. A liquid crystal display panel according to claim 34 further comprising, outside said display area, a display control circuit connected to said signal driving circuit, said scanning driving circuit, said common line driving circuit, and said third electrode driving circuit.

36. A liquid crystal display panel comprising:

a pair of substrates;

a liquid crystal layer disposed between said pair of substrates;

on one of said pair of substrates, a plurality of first signal lines, a plurality of second signal lines, a plurality of first scanning lines disposed so as to intersect said plurality of first signal lines and said plurality of second signal lines, and a plurality of second scanning lines disposed so as to intersect said plurality of first signal lines and said plurality of second signal lines;

a first active component disposed at a position corresponding to a point near an intersection point of each of said plurality of first signal lines and said plurality of first scanning lines;

a second active component disposed at a position corresponding to a point near an intersection point of each of said plurality of second signal lines and said plurality of second scanning lines;

a first electrode connected to said first active component and extending in a predetermined direction, a second electrode extending in the same direction as said first electrode; and a third electrode connected to said second active component and disposed so as to extend in the same direction as said first electrode at a position closer to said first electrode between said first electrode and said second electrode are provided, wherein a voltage is applied to each of the electrodes so that the voltage difference between said first electrode and said second electrode differs from the voltage difference between said second electrode and said third electrode in a beginning of one frame period, and a voltage is applied to each of the electrodes so that the voltage difference between said first electrode and said second electrode substantially equals the voltage difference between said second electrode and said third electrode in a middle of one frame period.

37. A liquid crystal display panel comprising:

a pair of substrates;

a liquid crystal layer disposed between said pair of substrates;

on one of said pair of substrates, a plurality of first signal lines, a plurality of second signal lines, and a plurality of scanning lines disposed so as to intersect said plurality of first signal lines and said plurality of second signal lines;

a first active component disposed at a position corresponding to a point near an intersection point of each of said plurality of first signal lines and said plurality of scanning lines;

a second active component disposed at a position corresponding to a point near an intersection point of each of said plurality of second signal lines and said plurality of scanning lines;

a first electrode connected to said first active component and extending in a predetermined direction;

a second electrode extending in the same direction as said first electrode; and a third electrode connected to said second active component and disposed so as to extend in the same direction as said first electrode at a position closer to said first electrode between said first electrode and said second electrode are provided, wherein a voltage is applied to each of the electrodes so that the voltage difference between said first electrode and said second electrode differs from the voltage difference between said second electrode and said third electrode in a beginning of one frame period, and a voltage is applied to each of the electrodes so that the voltage difference between said first electrode and said second electrode substantially equals the voltage difference between said second electrode and said third electrode in a middle of one frame period.

38. A liquid crystal display panel according to claim 36 or 37, wherein said first electrode and said third electrode are disposed so that at least parts thereof are superposed each other by way of an insulating film.

39. A liquid crystal display panel according to claim 37, wherein said second electrode is connected to a common line extending in the same direction as said plurality of scanning lines.

40. A liquid crystal display panel according to claim 37, wherein said second electrode is connected to a scanning line adjacent to the scanning lines, to which said first active component and said second active component are connected.

41. A liquid crystal display panel comprising:
a pair of substrates;
a liquid crystal layer disposed between said pair of substrates;
on one of said pair of substrates,
a plurality of signal lines,
a plurality of first scanning lines disposed so as to intersect said plurality of signal lines, and
a plurality of second scanning lines disposed so as to intersect said plurality of signal lines;
a first active component disposed at a position corresponding to a point near an intersection point of each of said plurality of signal lines and said plurality of first scanning lines;
a second active component disposed at a position corresponding to a point near an intersection point of each of said plurality of signal lines and said plurality of second scanning lines;
a first electrode connected to said first active component and extending in a predetermined direction;
a second electrode extending in the same direction as said first electrode; and
a third electrode connected to said second active component and disposed so as to extend in the same direction as said first electrode at a position closer to said first electrode between said first electrode and said second electrode,
wherein a voltage is applied to each of the electrodes so that the voltage difference between said first electrode and said second electrode differs from the voltage difference between said second electrode and said third electrode in a beginning of one frame period, and a voltage is applied to each of the electrodes so that the voltage difference between said first electrode and said second electrode substantially equals the voltage difference between said second electrode and said third electrode in a middle of one frame period.

42. A liquid crystal display panel comprising:
a pair of substrates;
a liquid crystal layer disposed between said pair of substrates;
on one of said pair of substrates,
a plurality of signal lines, and
a plurality of scanning lines disposed so as to intersect said plurality of signal lines;
a first active component disposed at a position corresponding to a point near an intersection point of each of said plurality of signal lines and said plurality of scanning lines;
a second active component having threshold voltage characteristics different from those of said first active component;
a first electrode connected to said first active component and extending in a predetermined direction;
a second electrode extending in the same direction as said first electrode; and
a third electrode connected to said second active component and disposed so as to extend in the same direction as said first electrode at a position closer to said first electrode between said first electrode and said second electrode,
wherein a voltage is applied to each of the electrodes so that the voltage difference between said first electrode and said second electrode differs from the voltage difference between said second electrode and said third electrode in a beginning of one frame period, and a voltage is applied to each of the electrodes so that the voltage difference between said first electrode and said second electrode substantially equals the voltage difference between said second electrode and said third electrode in a middle of one frame period.

43. A liquid crystal display panel according to claim 41 or 42, wherein said first electrode and said third electrode are disposed so that at least parts thereof are superposed each other by way of an insulating film.

44. A liquid crystal display panel including a pair of substrates, at least one of which is transparent, and a liquid crystal layer sandwiched between said pair of substrates, in which one of said pair of substrates is provided with a plurality of signal lines, a plurality of scanning lines extending so as to intersect said signal lines, a pixel formed in an area delimited by adjacent signal lines and adjacent scanning lines, a first electrode, a second electrode, a third electrode, and an active component, and a display is produced by controlling alignment direction of liquid crystal molecules of said liquid crystal layer in accordance with a change of electric field occurring between at least two of said first, second and third electrodes by applying a voltage across said first electrode and said second electrode which are disposed in said pixel, said panel comprising:
said third electrode being disposed in said pixel between said first electrode and said second electrode so as to be closer to either said first electrode or said second electrode,
wherein said panel is driven so that a voltage difference $\Delta V1$ between either said first electrode or said second electrode, whichever is disposed so as to be closer to said third electrode, and said third electrode becomes smaller over time within one frame period than in an initial stage within one frame period.

45. A liquid crystal display panel according to claim 44, wherein the panel is driven so that said voltage difference $\Delta V1$ becomes smaller within a period of time half one frame period.

46. A liquid crystal display panel according to claim 44 or 45, wherein said voltage difference $\Delta V1$, a spacing $d_L$ between either said first electrode or said second electrode, whichever is closer to said third electrode, and said third electrode, a voltage difference $\Delta V2$ between either said first electrode or said second electrode, whichever is farther from said third electrode, and said third electrode, and a spacing $d_H$ between said electrode disposed farther from said third electrode, and said third electrode satisfy (Equation 1) in an initial stage within one frame period and (Equation 2) within one frame period $$V2/d_H < V1/d_L \qquad \text{(Equation 1)}$$

$$V2/d_H > V1/d_L \qquad \text{(Equation 2).}$$

47. A liquid crystal display panel according to claim 46, wherein the panel is driven so that said voltage difference $\Delta V1$, said spacing $d_L$, said voltage difference $\Delta V2$, and said spacing $d_H$ satisfy (Equation 1) in an initial stage within one frame period and (Equation 2) within a period of time half one frame period.

48. A liquid crystal display panel according to any of claim 44 or 45, wherein at least parts of either said first electrode or said second electrode, whichever is disposed to be closer to said third electrode, and said third electrode are superposed each other within a pixel display area by way of an insulating film.

49. A liquid crystal display panel according to claim 48, wherein, of said two electrodes superposed each other, the width of the electrode disposed on a side closer to said liquid crystal layer is narrower than the width of the electrode disposed on a side farther from said liquid crystal layer.

50. A liquid crystal display panel according to any of claim 44 or 45, wherein said first electrode, said second electrode, and said third electrode are formed in a zigzag shape.

51. A liquid crystal display panel comprising:
a pair of substrates, at least one of which is transparent;
a liquid crystal layer disposed between said pair of substrates;
a plurality of signal lines formed on one of said pair of substrates;
a plurality of scanning lines formed on one of said pair of substrates to so as to extend in a direction which intersect said plurality of signal lines;
a pixel formed in an area delimited by adjacent signal lines and adjacent scanning lines; and
wherein one of said pair of substrates is provided with a display area composed of a plurality of said pixels,
a first electrode, a second electrode, and a third electrode extending in a predetermined direction are disposed in said pixel, and the panel is controlled to produce a display by controlling alignment direction of liquid crystal molecules of said liquid crystal layer in accordance with change of an electric field occurring between at least two of said first, second and third electrodes based upon by varying a voltage applied to each of said first electrode, said second electrode, and said third electrode between an initial stage and a middle stage within one frame period.

52. A liquid crystal display panel according to claim 51, wherein the voltage is applied to said first electrode, said second electrode, and said third electrode independently of each other and, with a voltage difference between each pair of said first electrode, said second electrode, and said third electrode, a relationship between two voltage differences differs between an initial stage and a middle stage within one frame period.

53. A liquid crystal display panel according to claim 52, wherein said third electrode is disposed at a position closer to said first electrode between said first electrode and said second electrode; and
a voltage difference between said first electrode and said third electrode differs from a voltage difference between said second electrode and said third electrode between an initial stage and a middle stage within one frame period.

54. A liquid crystal display panel according to any one of claims 51 to 53, wherein either said first electrode or said second electrode is connected by way of a first active component to a first signal line of said signal lines,
either said first electrode or said second electrode, whichever is not connected to said first active component, is connected to a common line, and
said third electrode is connected by way of a second active component to a second signal line of said signal lines.

55. A liquid crystal display panel according to claim 54 comprising:
a first scanning line of said scanning lines disposed so as to intersect said first signal line and connected to said first active component; and
a second scanning line of said scanning lines disposed so as to intersect said second signal line and connected to said second active component,
wherein said pixel is formed to correspond an area enclosed by said first signal, said first scanning line, said second signal line, and said second scanning line, and a display area is formed by disposing a plurality of said pixels.

56. A liquid crystal display device comprising:
a liquid crystal display panel comprising a pair of substrates, a liquid crystal layer disposed between said pair of substrates, a plurality of signal lines formed on one of said pair of substrates, a plurality of scanning lines formed on one of said pair of substrates to so as to extend in a direction which intersect said plurality of signal lines, a pixel formed in an area delimited by adjacent signal lines and adjacent scanning lines, and a first electrode, a second electrode, and a third electrode disposed in said pixel and extending in a predetermined direction, the panel being controlled to produce a display by controlling alignment direction of liquid crystal molecules of said liquid crystal layer in accordance with change of an electric field occurring between at least two of said first, second and third electrodes based upon by changing a voltage applied to each of said first electrode, said second electrode, and said third electrode between an initial stage and a middle stage within one frame period; and
a light source.

57. A liquid crystal display device according to claim 56 further comprising an inverter circuit that controls said light source.

58. A liquid crystal television comprising:
a liquid crystal display panel comprising a pair of substrates, a liquid crystal layer disposed between said pair of substrates, a plurality of signal lines formed on one of said pair of substrates, a plurality of scanning lines formed on one of said pair of substrates to so as to extend in a direction which intersect said plurality of signal lines, a pixel formed in an area delimited by adjacent signal lines and adjacent scanning lines, and a first electrode, a second electrode, and a third electrode disposed in said pixel and extending in a predetermined direction, the panel being controlled to produce a display by controlling alignment direction of liquid crystal molecules of said liquid crystal layer in accordance with change of an electric field occurring between at least two of said first, second and third electrodes based upon by changing a voltage applied to each of said first electrode, said second electrode, and said third electrode between an initial stage and a middle stage within one frame period;
a light source;
an inverter circuit that controls said light source; and
a tuner.

59. A liquid crystal television according to claim 58, wherein said third electrode is disposed at a position closer to said first electrode between said first electrode and said second electrode, and
with a voltage difference existing between each pair of said first electrode, second electrode, and third electrode, a relationship between two voltage differences differs between the initial stage and the middle stage within one frame period.

* * * * *